(12) United States Patent
Mann et al.

(10) Patent No.: US 11,726,640 B2
(45) Date of Patent: Aug. 15, 2023

(54) DIGITAL PROCESSING SYSTEMS AND METHODS FOR GRANULAR PERMISSION SYSTEM FOR ELECTRONIC DOCUMENTS IN COLLABORATIVE WORK SYSTEMS

(71) Applicant: MONDAY.COM LTD., Tel Aviv (IL)

(72) Inventors: Roy Mann, Tel Aviv (IL); Ron Zionpour, Kfar Sirkin (IL); Tal Haramati, Tel Aviv (IL); Amir Bardugo, Lapid (IL)

(73) Assignee: MONDAY.COM LTD., Tel Aviv (IL)

( * ) Notice: Subject to any disclaimer, the term of this patent is extended or adjusted under 35 U.S.C. 154(b) by 0 days.

(21) Appl. No.: 17/565,853

(22) Filed: Dec. 30, 2021

(65) Prior Publication Data

US 2022/0222361 A1   Jul. 14, 2022

Related U.S. Application Data

(63) Continuation of application No. PCT/IB2021/062440, filed on Dec. 29, 2021, which
(Continued)

(51) Int. Cl.
*G06F 21/62* (2013.01)
*G06F 3/0484* (2022.01)
(Continued)

(52) U.S. Cl.
CPC .......... *G06F 3/0484* (2013.01); *G06F 3/0481* (2013.01); *G06F 3/0483* (2013.01);
(Continued)

(58) Field of Classification Search
CPC ........................ G06F 21/6218; H04N 1/448
(Continued)

(56) References Cited

U.S. PATENT DOCUMENTS

| 4,972,314 A | 11/1990 | Getzinger et al. |
| 5,220,657 A | 6/1993 | Bly et al. |

(Continued)

FOREIGN PATENT DOCUMENTS

| CA | 2 828 011 A1 | 9/2012 |
| CN | 103064833 A | 4/2013 |

(Continued)

OTHER PUBLICATIONS

Kollmann, Franz. "Realizing fine-granular Read andWrite Rights on Tree Structured Documents." In The Second International Conference on Availability, Reliability and Security (ARES'07), pp. 517-523. IEEE, 2007. (Year: 2007).*

(Continued)

*Primary Examiner* — Luu T Pham
*Assistant Examiner* — Walter J Malinowski
(74) *Attorney, Agent, or Firm* — Finnegan, Henderson, Farabow, Garrett & Dunner LLP

(57) ABSTRACT

Systems, methods, and computer-readable media for shared electronic documents are disclosed. The systems and methods may involve enabling access to an electronic word processing document including blocks of text, wherein each block of text has an associated address; accessing at least one data structure containing block-based permissions for each block of text, and wherein the permissions include at least one permission to view an associated block of text; receiving from an entity a request to access the electronic word processing document; performing a lookup in the at least one data structure to determine that the entity lacks permission to view at least one specific block within the electronic word processing document; and causing to be rendered on a display associated with the entity, the electronic word processing document with the at least one specific block omitted from the display.

24 Claims, 28 Drawing Sheets

Related U.S. Application Data is a continuation-in-part of application No. PCT/IB2021/000297, filed on Apr. 28, 2021, and a continuation-in-part of application No. PCT/IB2021/000090, filed on Feb. 11, 2021, which is a continuation-in-part of application No. PCT/IB2021/000024, filed on Jan. 14, 2021.

(60) Provisional application No. 63/273,453, filed on Oct. 29, 2021, provisional application No. 63/273,448, filed on Oct. 29, 2021, provisional application No. 63/233,925, filed on Aug. 17, 2021.

(51) Int. Cl.

| | | |
|---|---|---|
| *G06F 40/166* | (2020.01) | |
| *G06F 40/169* | (2020.01) | |
| *H04M 1/72436* | (2021.01) | |
| *G06K 7/14* | (2006.01) | |
| *H04L 51/046* | (2022.01) | |
| *H04L 51/10* | (2022.01) | |
| *G06F 40/134* | (2020.01) | |
| *H04N 1/44* | (2006.01) | |
| *G06F 40/109* | (2020.01) | |
| *G06F 3/04817* | (2022.01) | |
| *G06T 13/00* | (2011.01) | |
| *G06F 40/186* | (2020.01) | |
| *G06F 40/30* | (2020.01) | |
| *G06F 40/197* | (2020.01) | |
| *G06F 40/117* | (2020.01) | |
| *G06F 40/106* | (2020.01) | |
| *G06Q 10/10* | (2023.01) | |
| *G06F 16/176* | (2019.01) | |
| *H04L 9/40* | (2022.01) | |
| *H04L 65/401* | (2022.01) | |
| *G06F 40/103* | (2020.01) | |
| *G06F 3/0485* | (2022.01) | |
| *G06F 3/0481* | (2022.01) | |
| *G06F 3/04847* | (2022.01) | |
| *G06F 11/14* | (2006.01) | |
| *G06F 16/18* | (2019.01) | |
| *G06F 3/0486* | (2013.01) | |
| *G06F 40/114* | (2020.01) | |
| *G06F 3/0483* | (2013.01) | |
| *G06F 3/04842* | (2022.01) | |

(52) U.S. Cl.
CPC .......... *G06F 3/0485* (2013.01); *G06F 3/0486* (2013.01); *G06F 3/04817* (2013.01); *G06F 3/04847* (2013.01); *G06F 11/1469* (2013.01); *G06F 16/176* (2019.01); *G06F 16/1774* (2019.01); *G06F 16/1873* (2019.01); *G06F 21/629* (2013.01); *G06F 21/6209* (2013.01); *G06F 21/6218* (2013.01); *G06F 40/103* (2020.01); *G06F 40/106* (2020.01); *G06F 40/109* (2020.01); *G06F 40/114* (2020.01); *G06F 40/117* (2020.01); *G06F 40/134* (2020.01); *G06F 40/166* (2020.01); *G06F 40/169* (2020.01); *G06F 40/186* (2020.01); *G06F 40/197* (2020.01); *G06F 40/30* (2020.01); *G06K 7/1443* (2013.01); *G06Q 10/103* (2013.01); *G06T 13/00* (2013.01); *H04L 51/046* (2013.01); *H04L 51/10* (2013.01); *H04L 63/101* (2013.01); *H04L 63/102* (2013.01); *H04L 65/4015* (2013.01); *H04M 1/72436* (2021.01); *H04N 1/448* (2013.01); *G06F 3/04842* (2013.01); *G06F 2201/84* (2013.01)

(58) Field of Classification Search
USPC ........................................................ 726/28
See application file for complete search history.

(56) References Cited

U.S. PATENT DOCUMENTS

| | | |
|---|---|---|
| 5,479,602 A | 12/1995 | Baecker et al. |
| 5,517,663 A | 5/1996 | Kahn |
| 5,632,009 A * | 5/1997 | Rao ................. G06F 40/18 |
| | | 715/201 |
| 5,682,469 A | 10/1997 | Linnett |
| 5,696,702 A | 12/1997 | Skinner et al. |
| 5,726,701 A | 3/1998 | Needham |
| 5,787,411 A | 7/1998 | Groff et al. |
| 5,880,742 A | 3/1999 | Rao et al. |
| 5,933,145 A | 8/1999 | Meek |
| 6,016,438 A | 1/2000 | Wakayama |
| 6,016,553 A | 1/2000 | Schneider et al. |
| 6,023,695 A | 2/2000 | Osborn et al. |
| 6,034,681 A | 3/2000 | Miller et al. |
| 6,049,622 A | 4/2000 | Robb et al. |
| 6,108,573 A | 8/2000 | Debbins et al. |
| 6,111,573 A | 8/2000 | McComb et al. |
| 6,167,405 A | 12/2000 | Rosensteel, Jr. et al. |
| 6,169,534 B1 | 1/2001 | Raffel et al. |
| 6,182,127 B1 | 1/2001 | Cronin, III et al. |
| 6,185,582 B1 | 2/2001 | Zellweger et al. |
| 6,195,794 B1 * | 2/2001 | Buxton ................. G06F 8/60 |
| | | 717/177 |
| 6,266,067 B1 | 7/2001 | Owen et al. |
| 6,275,809 B1 | 8/2001 | Tamaki et al. |
| 6,330,022 B1 | 12/2001 | Seligmann |
| 6,377,965 B1 | 4/2002 | Hachamovitch et al. |
| 6,385,617 B1 | 5/2002 | Malik |
| 6,460,043 B1 | 10/2002 | Tabbara et al. |
| 6,496,832 B2 | 12/2002 | Chi et al. |
| 6,509,912 B1 | 1/2003 | Moran et al. |
| 6,510,459 B2 | 1/2003 | Cronin, III et al. |
| 6,522,347 B1 | 2/2003 | Tsuji et al. |
| 6,527,556 B1 | 3/2003 | Koskinen |
| 6,567,830 B1 * | 5/2003 | Madduri ............. G06F 40/169 |
| | | 715/235 |
| 6,606,740 B1 | 8/2003 | Lynn et al. |
| 6,636,242 B2 | 10/2003 | Bowman-Amuah |
| 6,647,370 B1 | 11/2003 | Fu et al. |
| 6,661,431 B1 | 12/2003 | Stuart et al. |
| 6,988,248 B1 | 1/2006 | Tang et al. |
| 7,027,997 B1 | 4/2006 | Robinson et al. |
| 7,034,860 B2 | 4/2006 | Lia et al. |
| 7,043,529 B1 | 5/2006 | Simonoff |
| 7,054,891 B2 | 5/2006 | Cole |
| 7,237,188 B1 | 6/2007 | Leung |
| 7,249,042 B1 | 7/2007 | Doerr et al. |
| 7,272,637 B1 | 9/2007 | Himmelstein |
| 7,274,375 B1 | 9/2007 | David |
| 7,379,934 B1 | 5/2008 | Forman et al. |
| 7,383,320 B1 | 6/2008 | Silberstein et al. |
| 7,389,473 B1 | 6/2008 | Sawicki et al. |
| 7,415,664 B2 | 8/2008 | Aureglia et al. |
| 7,417,644 B2 | 8/2008 | Cooper et al. |
| 7,461,077 B1 | 12/2008 | Greenwood |
| 7,489,976 B2 | 2/2009 | Adra |
| 7,617,443 B2 | 11/2009 | Mills et al. |
| 7,685,152 B2 | 3/2010 | Chivukula et al. |
| 7,707,514 B2 | 4/2010 | Forstall et al. |
| 7,710,290 B2 | 5/2010 | Johnson |
| 7,770,100 B2 | 8/2010 | Chamberlain et al. |
| 7,827,476 B1 | 11/2010 | Roberts et al. |
| 7,827,615 B1 | 11/2010 | Allababidi et al. |
| 7,916,157 B1 | 3/2011 | Kelley et al. |
| 7,921,360 B1 | 4/2011 | Sundermeyer et al. |
| 7,954,043 B2 * | 5/2011 | Bera .................. G06F 21/6227 |
| | | 715/277 |
| 7,954,064 B2 | 5/2011 | Forstall et al. |
| 8,046,703 B2 | 10/2011 | Busch et al. |
| 8,078,955 B1 | 12/2011 | Gupta |

(56) References Cited

U.S. PATENT DOCUMENTS

| | | | |
|---|---|---|---|
| 8,082,274 B2 | 12/2011 | Steinglass et al. | |
| 8,108,241 B2 | 1/2012 | Shukoor | |
| 8,136,031 B2 | 3/2012 | Massand | |
| 8,151,213 B2 | 4/2012 | Weitzman et al. | |
| 8,223,172 B1 | 7/2012 | Miller et al. | |
| 8,286,072 B2 | 10/2012 | Chamberlain et al. | |
| 8,365,095 B2 | 1/2013 | Bansal et al. | |
| 8,375,327 B2 | 2/2013 | Lorch et al. | |
| 8,386,960 B1 | 2/2013 | Eismann et al. | |
| 8,407,217 B1 | 3/2013 | Zhang | |
| 8,413,261 B2 | 4/2013 | Nemoy et al. | |
| 8,423,909 B2 | 4/2013 | Zabielski | |
| 8,543,566 B2 | 9/2013 | Weissman et al. | |
| 8,548,997 B1 | 10/2013 | Wu | |
| 8,560,942 B2 | 10/2013 | Fortes et al. | |
| 8,566,732 B2 | 10/2013 | Louch et al. | |
| 8,572,173 B2 | 10/2013 | Briere et al. | |
| 8,578,399 B2 | 11/2013 | Khen et al. | |
| 8,601,383 B2 | 12/2013 | Folting et al. | |
| 8,620,703 B1 | 12/2013 | Kapoor et al. | |
| 8,621,652 B2 * | 12/2013 | Slater, Jr. | G06F 21/6209 726/28 |
| 8,677,448 B1 * | 3/2014 | Kauffman | G06F 16/122 726/1 |
| 8,738,414 B1 | 5/2014 | Nagar et al. | |
| 8,812,471 B2 | 8/2014 | Akita | |
| 8,819,042 B2 | 8/2014 | Samudrala et al. | |
| 8,825,758 B2 | 9/2014 | Bailor et al. | |
| 8,838,533 B2 | 9/2014 | Kwiatkowski et al. | |
| 8,862,979 B2 | 10/2014 | Hawking | |
| 8,863,022 B2 | 10/2014 | Rhodes et al. | |
| 8,869,027 B2 | 10/2014 | Louch et al. | |
| 8,937,627 B1 | 1/2015 | Otero et al. | |
| 8,938,465 B2 | 1/2015 | Messer | |
| 8,954,871 B2 | 2/2015 | Louch et al. | |
| 9,007,405 B1 | 4/2015 | Eldar et al. | |
| 9,015,716 B2 | 4/2015 | Fletcher et al. | |
| 9,026,897 B2 | 5/2015 | Zarras | |
| 9,043,362 B2 | 5/2015 | Weissman et al. | |
| 9,063,958 B2 | 6/2015 | Müller et al. | |
| 9,129,234 B2 | 9/2015 | Campbell et al. | |
| 9,159,246 B2 | 10/2015 | Rodriguez et al. | |
| 9,172,738 B1 | 10/2015 | daCosta | |
| 9,183,303 B1 | 11/2015 | Goel et al. | |
| 9,223,770 B1 | 12/2015 | Ledet | |
| 9,239,719 B1 | 1/2016 | Feinstein et al. | |
| 9,244,917 B1 | 1/2016 | Sharma et al. | |
| 9,253,130 B2 | 2/2016 | Zaveri | |
| 9,286,246 B2 | 3/2016 | Saito et al. | |
| 9,286,475 B2 | 3/2016 | Li et al. | |
| 9,292,587 B2 | 3/2016 | Kann et al. | |
| 9,336,502 B2 | 5/2016 | Mohammad et al. | |
| 9,342,579 B2 | 5/2016 | Cao et al. | |
| 9,361,287 B1 | 6/2016 | Simon et al. | |
| 9,390,059 B1 | 7/2016 | Gur et al. | |
| 9,424,287 B2 | 8/2016 | Schroth | |
| 9,424,333 B1 | 8/2016 | Bisignani et al. | |
| 9,424,545 B1 | 8/2016 | Lee | |
| 9,430,458 B2 | 8/2016 | Rhee et al. | |
| 9,449,031 B2 | 9/2016 | Barrus et al. | |
| 9,495,386 B2 | 11/2016 | Tapley et al. | |
| 9,558,172 B2 | 1/2017 | Rampson et al. | |
| 9,613,086 B1 | 4/2017 | Sherman | |
| 9,635,091 B1 | 4/2017 | Laukkanen et al. | |
| 9,679,456 B2 | 6/2017 | East | |
| 9,727,376 B1 | 8/2017 | Bills et al. | |
| 9,760,271 B2 | 9/2017 | Persaud | |
| 9,794,256 B2 | 10/2017 | Kiang et al. | |
| 9,798,829 B1 | 10/2017 | Baisley | |
| 9,811,676 B1 | 11/2017 | Gauvin | |
| 9,866,561 B2 | 1/2018 | Psenka et al. | |
| 9,870,136 B2 | 1/2018 | Pourshahid | |
| 10,043,296 B2 | 8/2018 | Li | |
| 10,067,928 B1 | 9/2018 | Krappe | |
| 10,078,668 B1 | 9/2018 | Woodrow et al. | |
| 10,169,306 B2 | 1/2019 | O'Shaughnessy et al. | |
| 10,176,154 B2 | 1/2019 | Ben-Aharon et al. | |
| 10,235,441 B1 | 3/2019 | Makhlin et al. | |
| 10,255,609 B2 | 4/2019 | Kinkead et al. | |
| 10,282,405 B1 | 5/2019 | Silk et al. | |
| 10,282,406 B2 | 5/2019 | Bissantz | |
| 10,311,080 B2 | 6/2019 | Folting et al. | |
| 10,318,624 B1 | 6/2019 | Rosner et al. | |
| 10,327,712 B2 | 6/2019 | Beymer et al. | |
| 10,347,017 B2 | 7/2019 | Ruble et al. | |
| 10,372,706 B2 | 8/2019 | Chavan et al. | |
| 10,380,140 B2 | 8/2019 | Sherman | |
| 10,423,758 B2 | 9/2019 | Kido et al. | |
| 10,445,702 B1 | 10/2019 | Hunt | |
| 10,452,360 B1 | 10/2019 | Burman et al. | |
| 10,453,118 B2 | 10/2019 | Smith et al. | |
| 10,474,317 B2 | 11/2019 | Ramanathan et al. | |
| 10,489,391 B1 | 11/2019 | Tomlin | |
| 10,489,462 B1 | 11/2019 | Rogynskyy et al. | |
| 10,496,737 B1 | 12/2019 | Sayre et al. | |
| 10,505,825 B1 | 12/2019 | Bettaiah et al. | |
| 10,528,599 B1 | 1/2020 | Pandis et al. | |
| 10,534,507 B1 | 1/2020 | Laukkanen et al. | |
| 10,540,152 B1 | 1/2020 | Krishnaswamy et al. | |
| 10,540,434 B2 | 1/2020 | Migeon et al. | |
| 10,546,001 B1 | 1/2020 | Nguyen et al. | |
| 10,564,622 B1 | 2/2020 | Dean et al. | |
| 10,573,407 B2 | 2/2020 | Ginsburg | |
| 10,579,724 B2 | 3/2020 | Campbell et al. | |
| 10,628,002 B1 | 4/2020 | Kang et al. | |
| 10,698,594 B2 | 6/2020 | Sanches et al. | |
| 10,706,061 B2 | 7/2020 | Sherman et al. | |
| 10,719,220 B2 | 7/2020 | Ouellet et al. | |
| 10,733,256 B2 * | 8/2020 | Fickenscher | G06F 16/248 |
| 10,740,117 B2 | 8/2020 | Ording et al. | |
| 10,747,950 B2 | 8/2020 | Dang et al. | |
| 10,748,312 B2 | 8/2020 | Ruble et al. | |
| 10,754,688 B2 | 8/2020 | Powell | |
| 10,761,691 B2 | 9/2020 | Anzures et al. | |
| 10,795,555 B2 | 10/2020 | Burke et al. | |
| 10,817,660 B2 | 10/2020 | Rampson et al. | |
| D910,077 S | 2/2021 | Naroshevitch et al. | |
| 10,963,578 B2 | 3/2021 | More et al. | |
| 11,010,371 B1 | 5/2021 | Slomka et al. | |
| 11,042,363 B1 | 6/2021 | Krishnaswamy et al. | |
| 11,042,699 B1 | 6/2021 | Sayre et al. | |
| 11,048,714 B2 | 6/2021 | Sherman et al. | |
| 11,243,688 B1 | 2/2022 | Remy et al. | |
| 2001/0008998 A1 | 7/2001 | Tamaki et al. | |
| 2001/0032248 A1 | 10/2001 | Krafchin | |
| 2001/0039551 A1 * | 11/2001 | Saito | G06F 21/6218 715/205 |
| 2002/0002459 A1 | 1/2002 | Lewis et al. | |
| 2002/0065849 A1 | 5/2002 | Ferguson et al. | |
| 2002/0065880 A1 * | 5/2002 | Hasegawa | H04H 20/82 707/999.01 |
| 2002/0069207 A1 | 6/2002 | Alexander et al. | |
| 2002/0075309 A1 | 6/2002 | Michelman et al. | |
| 2002/0082892 A1 | 6/2002 | Raffel et al. | |
| 2002/0138528 A1 | 9/2002 | Gong et al. | |
| 2003/0033196 A1 | 2/2003 | Tomlin | |
| 2003/0041113 A1 * | 2/2003 | Larsen | G06Q 10/107 709/206 |
| 2003/0051377 A1 | 3/2003 | Chirafesi, Jr. | |
| 2003/0058277 A1 | 3/2003 | Bowman-Amuah | |
| 2003/0065662 A1 | 4/2003 | Cosic | |
| 2003/0093408 A1 | 5/2003 | Brown et al. | |
| 2003/0101416 A1 | 5/2003 | McInnes et al. | |
| 2003/0135558 A1 | 7/2003 | Bellotti et al. | |
| 2003/0137536 A1 | 7/2003 | Hugh | |
| 2003/0187864 A1 | 10/2003 | McGoveran | |
| 2003/0200215 A1 | 10/2003 | Chen et al. | |
| 2003/0204490 A1 | 10/2003 | Kasriel | |
| 2004/0032432 A1 | 2/2004 | Baynger | |
| 2004/0098284 A1 | 5/2004 | Petito et al. | |
| 2004/0133441 A1 | 7/2004 | Brady et al. | |
| 2004/0138939 A1 | 7/2004 | Theiler | |
| 2004/0139400 A1 | 7/2004 | Allam et al. | |
| 2004/0162833 A1 | 8/2004 | Jones et al. | |

(56) References Cited

U.S. PATENT DOCUMENTS

| | | |
|---|---|---|
| 2004/0172592 A1 | 9/2004 | Collie et al. |
| 2004/0212615 A1 | 10/2004 | Uthe |
| 2004/0215443 A1 | 10/2004 | Hatton |
| 2004/0230940 A1 | 11/2004 | Cooper et al. |
| 2004/0268227 A1 | 12/2004 | Brid |
| 2005/0034058 A1 | 2/2005 | Mills et al. |
| 2005/0034064 A1 | 2/2005 | Meyers et al. |
| 2005/0039001 A1 | 2/2005 | Hudis et al. |
| 2005/0039033 A1 | 2/2005 | Meyers et al. |
| 2005/0044486 A1 | 2/2005 | Kotler et al. |
| 2005/0063615 A1* | 3/2005 | Siegel ............... G06F 16/9535 707/E17.109 |
| 2005/0066306 A1 | 3/2005 | Diab |
| 2005/0086360 A1 | 4/2005 | Mamou et al. |
| 2005/0091314 A1 | 4/2005 | Blagsvedt et al. |
| 2005/0091596 A1 | 4/2005 | Anthony et al. |
| 2005/0096973 A1 | 5/2005 | Heyse et al. |
| 2005/0114305 A1 | 5/2005 | Haynes et al. |
| 2005/0125395 A1 | 6/2005 | Boettiger |
| 2005/0165600 A1 | 7/2005 | Kasravi et al. |
| 2005/0171881 A1 | 8/2005 | Ghassemieh et al. |
| 2005/0216830 A1 | 9/2005 | Turner et al. |
| 2005/0228250 A1 | 10/2005 | Bitter et al. |
| 2005/0251021 A1 | 11/2005 | Kaufman et al. |
| 2005/0257204 A1 | 11/2005 | Bryant et al. |
| 2005/0278297 A1 | 12/2005 | Nelson |
| 2005/0289342 A1 | 12/2005 | Needham et al. |
| 2005/0289453 A1 | 12/2005 | Segal et al. |
| 2006/0009960 A1 | 1/2006 | Valencot et al. |
| 2006/0013462 A1 | 1/2006 | Sadikali |
| 2006/0015499 A1* | 1/2006 | Clissold ............... G06F 16/10 707/999.009 |
| 2006/0015806 A1* | 1/2006 | Wallace ............... G06F 40/18 715/764 |
| 2006/0031148 A1 | 2/2006 | O'Dell et al. |
| 2006/0036568 A1 | 2/2006 | Moore et al. |
| 2006/0047811 A1 | 3/2006 | Lau et al. |
| 2006/0053096 A1 | 3/2006 | Subramanian et al. |
| 2006/0053194 A1 | 3/2006 | Schneider et al. |
| 2006/0069604 A1 | 3/2006 | Leukart et al. |
| 2006/0069635 A1 | 3/2006 | Ram et al. |
| 2006/0080594 A1 | 4/2006 | Chavoustie et al. |
| 2006/0090169 A1 | 4/2006 | Daniels et al. |
| 2006/0106642 A1 | 5/2006 | Reicher et al. |
| 2006/0107196 A1 | 5/2006 | Thanu et al. |
| 2006/0111953 A1 | 5/2006 | Setya |
| 2006/0129415 A1 | 6/2006 | Thukral et al. |
| 2006/0136828 A1 | 6/2006 | Asano |
| 2006/0173908 A1 | 8/2006 | Browning et al. |
| 2006/0190313 A1 | 8/2006 | Lu |
| 2006/0224542 A1 | 10/2006 | Yalamanchi |
| 2006/0224568 A1 | 10/2006 | Debrito |
| 2006/0224946 A1 | 10/2006 | Barrett et al. |
| 2006/0236246 A1 | 10/2006 | Bono et al. |
| 2006/0250369 A1 | 11/2006 | Keim |
| 2006/0253205 A1 | 11/2006 | Gardiner |
| 2006/0271574 A1 | 11/2006 | Villaron et al. |
| 2006/0287998 A1 | 12/2006 | Folting et al. |
| 2006/0294451 A1 | 12/2006 | Kelkar et al. |
| 2007/0027932 A1 | 2/2007 | Thibeault |
| 2007/0033531 A1 | 2/2007 | Marsh |
| 2007/0050322 A1 | 3/2007 | Vigesaa et al. |
| 2007/0050379 A1 | 3/2007 | Day et al. |
| 2007/0073899 A1 | 3/2007 | Judge et al. |
| 2007/0092048 A1 | 4/2007 | Chelstrom et al. |
| 2007/0094607 A1 | 4/2007 | Morgan et al. |
| 2007/0101291 A1 | 5/2007 | Forstall et al. |
| 2007/0106754 A1 | 5/2007 | Moore |
| 2007/0118527 A1 | 5/2007 | Winje et al. |
| 2007/0118813 A1 | 5/2007 | Forstall et al. |
| 2007/0143169 A1 | 6/2007 | Grant et al. |
| 2007/0168861 A1 | 7/2007 | Bell et al. |
| 2007/0174228 A1 | 7/2007 | Folting et al. |
| 2007/0174760 A1* | 7/2007 | Chamberlain ........ G06F 40/103 707/999.102 |
| 2007/0186173 A1 | 8/2007 | Both et al. |
| 2007/0220119 A1 | 9/2007 | Himmelstein |
| 2007/0256043 A1 | 11/2007 | Peters et al. |
| 2007/0282522 A1 | 12/2007 | Geelen |
| 2007/0282627 A1 | 12/2007 | Greenstein et al. |
| 2007/0283259 A1 | 12/2007 | Barry et al. |
| 2007/0294235 A1 | 12/2007 | Millett |
| 2007/0299795 A1 | 12/2007 | Macbeth et al. |
| 2007/0300174 A1 | 12/2007 | Macbeth et al. |
| 2007/0300185 A1 | 12/2007 | Macbeth et al. |
| 2008/0004929 A9 | 1/2008 | Raffel et al. |
| 2008/0005235 A1 | 1/2008 | Hegde et al. |
| 2008/0033777 A1 | 2/2008 | Shukoor |
| 2008/0034307 A1 | 2/2008 | Cisler et al. |
| 2008/0034314 A1 | 2/2008 | Louch et al. |
| 2008/0052291 A1 | 2/2008 | Bender |
| 2008/0059312 A1 | 3/2008 | Gern et al. |
| 2008/0059539 A1 | 3/2008 | Chin et al. |
| 2008/0065460 A1 | 3/2008 | Raynor |
| 2008/0077530 A1 | 3/2008 | Banas et al. |
| 2008/0097748 A1 | 4/2008 | Haley et al. |
| 2008/0104091 A1 | 5/2008 | Chin |
| 2008/0126389 A1 | 5/2008 | Mush et al. |
| 2008/0133736 A1 | 6/2008 | Wensley et al. |
| 2008/0148140 A1 | 6/2008 | Nakano |
| 2008/0155547 A1 | 6/2008 | Weber et al. |
| 2008/0163075 A1 | 7/2008 | Beck et al. |
| 2008/0183593 A1 | 7/2008 | Dierks |
| 2008/0195948 A1 | 8/2008 | Bauer |
| 2008/0209318 A1 | 8/2008 | Allsop et al. |
| 2008/0216022 A1 | 9/2008 | Lorch et al. |
| 2008/0222192 A1 | 9/2008 | Hughes |
| 2008/0256014 A1 | 10/2008 | Gould et al. |
| 2008/0256429 A1 | 10/2008 | Penner et al. |
| 2008/0270597 A1 | 10/2008 | Tenenti |
| 2008/0282189 A1 | 11/2008 | Hofmann et al. |
| 2008/0295038 A1 | 11/2008 | Helfman et al. |
| 2008/0301237 A1 | 12/2008 | Parsons |
| 2009/0006171 A1 | 1/2009 | Blatchley et al. |
| 2009/0006283 A1 | 1/2009 | Labrie et al. |
| 2009/0013244 A1 | 1/2009 | Cudich et al. |
| 2009/0019383 A1 | 1/2009 | Riley et al. |
| 2009/0024944 A1 | 1/2009 | Louch et al. |
| 2009/0044090 A1 | 2/2009 | Gur et al. |
| 2009/0048896 A1 | 2/2009 | Anandan |
| 2009/0049372 A1* | 2/2009 | Goldberg ............. G06F 16/283 715/227 |
| 2009/0077164 A1 | 3/2009 | Phillips et al. |
| 2009/0077217 A1 | 3/2009 | McFarland et al. |
| 2009/0083140 A1 | 3/2009 | Phan |
| 2009/0094514 A1 | 4/2009 | Dargahi et al. |
| 2009/0113310 A1 | 4/2009 | Appleyard et al. |
| 2009/0132470 A1 | 5/2009 | Vignet |
| 2009/0150813 A1 | 6/2009 | Chang et al. |
| 2009/0174680 A1 | 7/2009 | Anzures et al. |
| 2009/0192787 A1 | 7/2009 | Roon |
| 2009/0198715 A1 | 8/2009 | Barbarek |
| 2009/0248710 A1 | 10/2009 | McCormack et al. |
| 2009/0271696 A1 | 10/2009 | Bailor et al. |
| 2009/0276692 A1 | 11/2009 | Rosner |
| 2009/0313201 A1 | 12/2009 | Huelsman et al. |
| 2009/0313537 A1 | 12/2009 | Fu et al. |
| 2009/0313570 A1 | 12/2009 | Po et al. |
| 2009/0319623 A1* | 12/2009 | Srinivasan ........... G06Q 10/107 709/206 |
| 2009/0319882 A1 | 12/2009 | Morrison et al. |
| 2009/0327240 A1 | 12/2009 | Meehan et al. |
| 2009/0327851 A1* | 12/2009 | Raposo ................ G06F 40/18 715/213 |
| 2009/0327875 A1 | 12/2009 | Kinkoh |
| 2010/0017699 A1 | 1/2010 | Farrell et al. |
| 2010/0070845 A1 | 3/2010 | Facemire et al. |
| 2010/0070895 A1 | 3/2010 | Messer |
| 2010/0083164 A1 | 4/2010 | Martin et al. |
| 2010/0088636 A1 | 4/2010 | Yerkes et al. |
| 2010/0095219 A1 | 4/2010 | Stachowiak et al. |
| 2010/0095298 A1 | 4/2010 | Seshadrinathan et al. |
| 2010/0100427 A1 | 4/2010 | McKeown et al. |
| 2010/0100463 A1 | 4/2010 | Molotsi et al. |

(56) References Cited

U.S. PATENT DOCUMENTS

| | | |
|---|---|---|
| 2010/0114926 A1 | 5/2010 | Agrawal et al. |
| 2010/0149005 A1 | 6/2010 | Yoon et al. |
| 2010/0174678 A1 | 7/2010 | Massand |
| 2010/0228752 A1 | 9/2010 | Folting et al. |
| 2010/0241477 A1 | 9/2010 | Nylander et al. |
| 2010/0241948 A1 | 9/2010 | Andeen et al. |
| 2010/0241972 A1 | 9/2010 | Spataro et al. |
| 2010/0241990 A1 | 9/2010 | Gabriel et al. |
| 2010/0251090 A1 | 9/2010 | Chamberlain et al. |
| 2010/0257015 A1 | 10/2010 | Molander |
| 2010/0262625 A1 | 10/2010 | Pittenger |
| 2010/0287163 A1 | 11/2010 | Sridhar et al. |
| 2010/0287221 A1 | 11/2010 | Battepati et al. |
| 2010/0313119 A1 | 12/2010 | Baldwin et al. |
| 2010/0324964 A1 | 12/2010 | Callanan et al. |
| 2010/0332973 A1 | 12/2010 | Kloiber et al. |
| 2011/0010340 A1 | 1/2011 | Hung et al. |
| 2011/0016432 A1 | 1/2011 | Helfman |
| 2011/0028138 A1 | 2/2011 | Davies-Moore et al. |
| 2011/0047484 A1 | 2/2011 | Mount et al. |
| 2011/0055177 A1 | 3/2011 | Chakra et al. |
| 2011/0066933 A1 | 3/2011 | Ludwig |
| 2011/0071869 A1 | 3/2011 | O'Brien et al. |
| 2011/0106636 A1 | 5/2011 | Spear et al. |
| 2011/0119352 A1 | 5/2011 | Perov et al. |
| 2011/0179371 A1 | 7/2011 | Kopycinski et al. |
| 2011/0205231 A1 | 8/2011 | Hartley et al. |
| 2011/0208324 A1 | 8/2011 | Fukatsu |
| 2011/0208732 A1 | 8/2011 | Melton et al. |
| 2011/0209150 A1 | 8/2011 | Hammond et al. |
| 2011/0219321 A1 | 9/2011 | Gonzalez et al. |
| 2011/0225525 A1 | 9/2011 | Chasman et al. |
| 2011/0231273 A1* | 9/2011 | Buchheit ............ G06Q 30/0645 186/59 |
| 2011/0289397 A1 | 11/2011 | Eastmond et al. |
| 2011/0289439 A1 | 11/2011 | Jugel |
| 2011/0298618 A1 | 12/2011 | Stahl et al. |
| 2011/0302003 A1 | 12/2011 | Shirish et al. |
| 2012/0029962 A1 | 2/2012 | Podgurny et al. |
| 2012/0035974 A1 | 2/2012 | Seybold |
| 2012/0036462 A1 | 2/2012 | Schwartz et al. |
| 2012/0066587 A1* | 3/2012 | Zhou ..................... G06F 40/137 715/234 |
| 2012/0072821 A1 | 3/2012 | Bowling |
| 2012/0079408 A1 | 3/2012 | Rohwer |
| 2012/0081762 A1* | 4/2012 | Yamada ............... H04N 1/2158 358/474 |
| 2012/0084798 A1 | 4/2012 | Reeves et al. |
| 2012/0086716 A1 | 4/2012 | Reeves et al. |
| 2012/0086717 A1 | 4/2012 | Liu |
| 2012/0089610 A1 | 4/2012 | Agrawal et al. |
| 2012/0089914 A1 | 4/2012 | Holt et al. |
| 2012/0089992 A1 | 4/2012 | Reeves et al. |
| 2012/0096389 A1 | 4/2012 | Flam et al. |
| 2012/0096392 A1 | 4/2012 | Ording et al. |
| 2012/0102432 A1 | 4/2012 | Breedvelt-Schouten et al. |
| 2012/0102543 A1 | 4/2012 | Kohli et al. |
| 2012/0110515 A1 | 5/2012 | Abramoff et al. |
| 2012/0116834 A1 | 5/2012 | Pope et al. |
| 2012/0116835 A1 | 5/2012 | Pope et al. |
| 2012/0124749 A1 | 5/2012 | Lewman |
| 2012/0131445 A1 | 5/2012 | Oyarzabal et al. |
| 2012/0151173 A1 | 6/2012 | Shirley et al. |
| 2012/0158744 A1 | 6/2012 | Tseng et al. |
| 2012/0192050 A1 | 7/2012 | Campbell et al. |
| 2012/0198322 A1 | 8/2012 | Gulwani et al. |
| 2012/0210252 A1 | 8/2012 | Fedoseyeva et al. |
| 2012/0215574 A1 | 8/2012 | Driessnack et al. |
| 2012/0215578 A1 | 8/2012 | Swierz, III et al. |
| 2012/0233533 A1 | 9/2012 | Yücel et al. |
| 2012/0246170 A1 | 9/2012 | Iantorno |
| 2012/0254252 A1 | 10/2012 | Jin et al. |
| 2012/0254770 A1 | 10/2012 | Ophir |
| 2012/0260190 A1 | 10/2012 | Berger et al. |
| 2012/0278117 A1 | 11/2012 | Nguyen et al. |
| 2012/0284197 A1 | 11/2012 | Strick et al. |
| 2012/0297307 A1 | 11/2012 | Rider et al. |
| 2012/0300931 A1* | 11/2012 | Ollikainen .......... H04L 63/0428 713/193 |
| 2012/0303262 A1 | 11/2012 | Alam et al. |
| 2012/0304098 A1 | 11/2012 | Kuulusa |
| 2012/0311496 A1 | 12/2012 | Cao et al. |
| 2012/0311672 A1 | 12/2012 | Connor et al. |
| 2013/0018952 A1 | 1/2013 | McConnell et al. |
| 2013/0018953 A1 | 1/2013 | McConnell et al. |
| 2013/0018960 A1 | 1/2013 | Knysz et al. |
| 2013/0024418 A1 | 1/2013 | Strick et al. |
| 2013/0024760 A1 | 1/2013 | Vogel et al. |
| 2013/0036369 A1 | 2/2013 | Mitchell et al. |
| 2013/0041958 A1 | 2/2013 | Post et al. |
| 2013/0055113 A1 | 2/2013 | Chazin et al. |
| 2013/0063490 A1 | 3/2013 | Zaman et al. |
| 2013/0086460 A1 | 4/2013 | Folting et al. |
| 2013/0090969 A1 | 4/2013 | Rivere |
| 2013/0097490 A1 | 4/2013 | Kotler et al. |
| 2013/0103417 A1 | 4/2013 | Seto et al. |
| 2013/0104035 A1 | 4/2013 | Wagner et al. |
| 2013/0111320 A1 | 5/2013 | Campbell et al. |
| 2013/0117268 A1* | 5/2013 | Smith ..................... G06F 40/30 707/739 |
| 2013/0159832 A1 | 6/2013 | Ingargiola et al. |
| 2013/0159907 A1 | 6/2013 | Brosche et al. |
| 2013/0211866 A1 | 8/2013 | Gordon et al. |
| 2013/0212197 A1 | 8/2013 | Karlson |
| 2013/0212234 A1 | 8/2013 | Bartlett et al. |
| 2013/0238363 A1 | 9/2013 | Ohta et al. |
| 2013/0238968 A1 | 9/2013 | Barrus |
| 2013/0246384 A1 | 9/2013 | Victor |
| 2013/0262527 A1 | 10/2013 | Hunter |
| 2013/0268331 A1 | 10/2013 | Bitz et al. |
| 2013/0297468 A1 | 11/2013 | Hirsch et al. |
| 2013/0318424 A1 | 11/2013 | Boyd |
| 2013/0339051 A1* | 12/2013 | Dobrean ................ G16H 15/00 715/256 |
| 2014/0006326 A1 | 1/2014 | Bazanov |
| 2014/0019842 A1 | 1/2014 | Montagna et al. |
| 2014/0033307 A1* | 1/2014 | Schmidtler .......... H04L 63/1483 726/22 |
| 2014/0043331 A1 | 2/2014 | Makinen et al. |
| 2014/0046638 A1 | 2/2014 | Peloski |
| 2014/0052749 A1 | 2/2014 | Rissanen |
| 2014/0068403 A1 | 3/2014 | Bhargav et al. |
| 2014/0074545 A1 | 3/2014 | Minder et al. |
| 2014/0075301 A1 | 3/2014 | Mihara |
| 2014/0082525 A1 | 3/2014 | Kass et al. |
| 2014/0101527 A1 | 4/2014 | Suciu |
| 2014/0108985 A1 | 4/2014 | Scott et al. |
| 2014/0109012 A1 | 4/2014 | Choudhary et al. |
| 2014/0111516 A1* | 4/2014 | Hall ......................... G06T 11/60 345/428 |
| 2014/0115515 A1 | 4/2014 | Adams et al. |
| 2014/0115518 A1 | 4/2014 | Abdukalykov et al. |
| 2014/0129960 A1 | 5/2014 | Wang et al. |
| 2014/0136972 A1 | 5/2014 | Rodgers et al. |
| 2014/0137003 A1 | 5/2014 | Peters et al. |
| 2014/0137144 A1 | 5/2014 | Järvenpää et al. |
| 2014/0172475 A1 | 6/2014 | Olliphant et al. |
| 2014/0173401 A1 | 6/2014 | Oshlag et al. |
| 2014/0188748 A1 | 7/2014 | Cavoue et al. |
| 2014/0195933 A1 | 7/2014 | Rao DV |
| 2014/0214404 A1 | 7/2014 | Kalia et al. |
| 2014/0215303 A1* | 7/2014 | Grigorovitch ........ G06F 40/106 715/229 |
| 2014/0249877 A1 | 9/2014 | Hull et al. |
| 2014/0278638 A1 | 9/2014 | Kreuzkamp et al. |
| 2014/0278720 A1 | 9/2014 | Taguchi |
| 2014/0280287 A1 | 9/2014 | Ganti |
| 2014/0280377 A1 | 9/2014 | Frew |
| 2014/0281868 A1 | 9/2014 | Vogel et al. |
| 2014/0281869 A1 | 9/2014 | Yob |
| 2014/0289223 A1 | 9/2014 | Colwell et al. |
| 2014/0304174 A1 | 10/2014 | Scott et al. |
| 2014/0306837 A1 | 10/2014 | Hauck, III |
| 2014/0324497 A1 | 10/2014 | Verma et al. |

(56) References Cited

U.S. PATENT DOCUMENTS

| | | |
|---|---|---|
| 2014/0324501 A1 | 10/2014 | Davidow et al. |
| 2014/0365938 A1 | 12/2014 | Black et al. |
| 2014/0372932 A1 | 12/2014 | Rutherford et al. |
| 2015/0032686 A1 | 1/2015 | Kuchoor |
| 2015/0033131 A1 | 1/2015 | Peev et al. |
| 2015/0033149 A1 | 1/2015 | Kuchoor |
| 2015/0067556 A1 | 3/2015 | Tibrewal et al. |
| 2015/0074721 A1 | 3/2015 | Fishman et al. |
| 2015/0074728 A1 | 3/2015 | Chai et al. |
| 2015/0095752 A1 | 4/2015 | Studer et al. |
| 2015/0106736 A1 | 4/2015 | Torman et al. |
| 2015/0125834 A1 | 5/2015 | Mendoza |
| 2015/0142676 A1* | 5/2015 | McGinnis ............ G06Q 10/103 705/301 |
| 2015/0142829 A1 | 5/2015 | Lee et al. |
| 2015/0153943 A1 | 6/2015 | Wang |
| 2015/0154660 A1 | 6/2015 | Weald et al. |
| 2015/0169514 A1 | 6/2015 | Sah et al. |
| 2015/0169531 A1 | 6/2015 | Campbell et al. |
| 2015/0188964 A1* | 7/2015 | Sharma .............. H04N 21/6437 709/203 |
| 2015/0212717 A1 | 7/2015 | Nair et al. |
| 2015/0220491 A1 | 8/2015 | Cochrane et al. |
| 2015/0242091 A1 | 8/2015 | Lu et al. |
| 2015/0249864 A1 | 9/2015 | Tang et al. |
| 2015/0261796 A1 | 9/2015 | Gould et al. |
| 2015/0262121 A1 | 9/2015 | Riel-Dalpe et al. |
| 2015/0278699 A1 | 10/2015 | Danielsson |
| 2015/0281292 A1 | 10/2015 | Murayama |
| 2015/0295877 A1 | 10/2015 | Roman |
| 2015/0317590 A1 | 11/2015 | Karlson |
| 2015/0324453 A1 | 11/2015 | Werner |
| 2015/0331846 A1 | 11/2015 | Guggilla et al. |
| 2015/0363478 A1 | 12/2015 | Haynes |
| 2015/0370540 A1 | 12/2015 | Coslovi et al. |
| 2015/0370904 A1 | 12/2015 | Joshi et al. |
| 2015/0378542 A1 | 12/2015 | Saito et al. |
| 2015/0378711 A1 | 12/2015 | Cameron et al. |
| 2015/0378979 A1 | 12/2015 | Hirzel et al. |
| 2016/0012111 A1 | 1/2016 | Pattabhiraman et al. |
| 2016/0018962 A1 | 1/2016 | Low et al. |
| 2016/0026939 A1 | 1/2016 | Schiffer et al. |
| 2016/0027076 A1 | 1/2016 | Jackson et al. |
| 2016/0055134 A1 | 2/2016 | Sathish et al. |
| 2016/0055374 A1 | 2/2016 | Zhang et al. |
| 2016/0063435 A1 | 3/2016 | Shah et al. |
| 2016/0078368 A1 | 3/2016 | Kakhandiki et al. |
| 2016/0088480 A1 | 3/2016 | Chen et al. |
| 2016/0092557 A1 | 3/2016 | Stojanovic et al. |
| 2016/0117308 A1 | 4/2016 | Haider et al. |
| 2016/0170586 A1 | 6/2016 | Gallo |
| 2016/0173122 A1 | 6/2016 | Akitomi et al. |
| 2016/0210572 A1 | 7/2016 | Shaaban et al. |
| 2016/0224532 A1 | 8/2016 | Miller et al. |
| 2016/0231915 A1 | 8/2016 | Nhan et al. |
| 2016/0232489 A1 | 8/2016 | Skaaksrud |
| 2016/0246490 A1 | 8/2016 | Cabral |
| 2016/0253982 A1 | 9/2016 | Cheung et al. |
| 2016/0259856 A1 | 9/2016 | Ananthapur et al. |
| 2016/0275150 A1 | 9/2016 | Bournonnais et al. |
| 2016/0299655 A1 | 10/2016 | Migos et al. |
| 2016/0321235 A1 | 11/2016 | He et al. |
| 2016/0321604 A1 | 11/2016 | Imaeda et al. |
| 2016/0335302 A1 | 11/2016 | Teodorescu |
| 2016/0335303 A1 | 11/2016 | Madhalam et al. |
| 2016/0335731 A1 | 11/2016 | Hall |
| 2016/0335903 A1 | 11/2016 | Mendoza |
| 2016/0344828 A1* | 11/2016 | Hausler .............. H04L 67/1044 |
| 2016/0350950 A1 | 12/2016 | Ritchie et al. |
| 2016/0381099 A1* | 12/2016 | Keslin .................. H04L 67/10 709/205 |
| 2017/0017779 A1* | 1/2017 | Huang .................. G06F 21/16 |
| 2017/0031967 A1 | 2/2017 | Chavan et al. |
| 2017/0041296 A1 | 2/2017 | Ford et al. |
| 2017/0052937 A1 | 2/2017 | Sirven et al. |
| 2017/0061342 A1 | 3/2017 | LoRe et al. |
| 2017/0061360 A1 | 3/2017 | Rucker et al. |
| 2017/0061820 A1 | 3/2017 | Firoozbakhsh |
| 2017/0063722 A1 | 3/2017 | Cropper et al. |
| 2017/0075557 A1 | 3/2017 | Noble et al. |
| 2017/0076101 A1 | 3/2017 | Kochhar et al. |
| 2017/0090734 A1 | 3/2017 | Fitzpatrick |
| 2017/0090736 A1 | 3/2017 | King et al. |
| 2017/0091337 A1 | 3/2017 | Patterson |
| 2017/0093876 A1 | 3/2017 | Feng et al. |
| 2017/0109499 A1 | 4/2017 | Doshi et al. |
| 2017/0111327 A1 | 4/2017 | Wu |
| 2017/0116552 A1 | 4/2017 | Deodhar et al. |
| 2017/0124042 A1 | 5/2017 | Campbell et al. |
| 2017/0124048 A1 | 5/2017 | Campbell et al. |
| 2017/0124055 A1 | 5/2017 | Radakovitz et al. |
| 2017/0124740 A1 | 5/2017 | Campbell et al. |
| 2017/0126772 A1 | 5/2017 | Campbell et al. |
| 2017/0132296 A1 | 5/2017 | Ding |
| 2017/0132652 A1 | 5/2017 | Kedzlie et al. |
| 2017/0139874 A1 | 5/2017 | Chin |
| 2017/0139884 A1 | 5/2017 | Bendig et al. |
| 2017/0139891 A1 | 5/2017 | Ah-Soon et al. |
| 2017/0140047 A1 | 5/2017 | Bendig et al. |
| 2017/0140219 A1 | 5/2017 | King et al. |
| 2017/0153771 A1 | 6/2017 | Chu |
| 2017/0177888 A1 | 6/2017 | Arora et al. |
| 2017/0185668 A1 | 6/2017 | Convertino et al. |
| 2017/0200122 A1 | 7/2017 | Edson et al. |
| 2017/0206366 A1* | 7/2017 | Fay ........................ G06F 21/604 |
| 2017/0220813 A1* | 8/2017 | Mullins .................. G06F 21/10 |
| 2017/0221072 A1 | 8/2017 | AthuluruTlrumala et al. |
| 2017/0228445 A1 | 8/2017 | Chiu et al. |
| 2017/0228460 A1 | 8/2017 | Amel |
| 2017/0236081 A1 | 8/2017 | Grady Smith et al. |
| 2017/0242921 A1 | 8/2017 | Rota |
| 2017/0262786 A1 | 9/2017 | Khasis |
| 2017/0270970 A1 | 9/2017 | Ho et al. |
| 2017/0272316 A1 | 9/2017 | Johnson et al. |
| 2017/0272331 A1 | 9/2017 | Lissack |
| 2017/0277669 A1 | 9/2017 | Sekharan |
| 2017/0285879 A1 | 10/2017 | Pilkington et al. |
| 2017/0285890 A1 | 10/2017 | Dolman |
| 2017/0315683 A1 | 11/2017 | Boucher et al. |
| 2017/0315974 A1 | 11/2017 | Kong et al. |
| 2017/0315979 A1 | 11/2017 | Boucher et al. |
| 2017/0324692 A1 | 11/2017 | Zhou |
| 2017/0351252 A1 | 12/2017 | Kleifges et al. |
| 2017/0372442 A1 | 12/2017 | Mejias |
| 2018/0011827 A1 | 1/2018 | Avery et al. |
| 2018/0025084 A1 | 1/2018 | Conlan et al. |
| 2018/0026954 A1 | 1/2018 | Foepke et al. |
| 2018/0032492 A1 | 2/2018 | Altshuller et al. |
| 2018/0032570 A1 | 2/2018 | Miller et al. |
| 2018/0055434 A1 | 3/2018 | Cheung et al. |
| 2018/0075104 A1 | 3/2018 | Oberbreckling et al. |
| 2018/0075115 A1 | 3/2018 | Murray et al. |
| 2018/0075413 A1 | 3/2018 | Culver et al. |
| 2018/0075560 A1 | 3/2018 | Thukral et al. |
| 2018/0081863 A1 | 3/2018 | Bathla |
| 2018/0081868 A1 | 3/2018 | Willcock et al. |
| 2018/0088753 A1 | 3/2018 | Viégas et al. |
| 2018/0088989 A1 | 3/2018 | Nield et al. |
| 2018/0089299 A1 | 3/2018 | Collins et al. |
| 2018/0095938 A1 | 4/2018 | Monte |
| 2018/0096417 A1 | 4/2018 | Cook et al. |
| 2018/0109760 A1 | 4/2018 | Metter et al. |
| 2018/0121994 A1 | 5/2018 | Matsunaga et al. |
| 2018/0128636 A1 | 5/2018 | Zhou |
| 2018/0129651 A1 | 5/2018 | Latvala et al. |
| 2018/0157455 A1 | 6/2018 | Troy et al. |
| 2018/0157467 A1 | 6/2018 | Stachura |
| 2018/0157468 A1 | 6/2018 | Stachura |
| 2018/0157633 A1 | 6/2018 | He et al. |
| 2018/0173715 A1 | 6/2018 | Dunne |
| 2018/0181650 A1 | 6/2018 | Komatsuda et al. |
| 2018/0181716 A1 | 6/2018 | Mander et al. |
| 2018/0210936 A1 | 7/2018 | Reynolds et al. |
| 2018/0225270 A1* | 8/2018 | Bhide .................... G06F 40/16 |

(56) References Cited

U.S. PATENT DOCUMENTS

| | | |
|---|---|---|
| 2018/0260371 A1 | 9/2018 | Theodore et al. |
| 2018/0276417 A1 | 9/2018 | Cerezo |
| 2018/0293217 A1 | 10/2018 | Callaghan |
| 2018/0293669 A1 | 10/2018 | Jackson et al. |
| 2018/0329930 A1 | 11/2018 | Eberlein et al. |
| 2018/0330320 A1 | 11/2018 | Kohli |
| 2018/0357305 A1 | 12/2018 | Kinast et al. |
| 2018/0365429 A1 | 12/2018 | Segal |
| 2018/0367484 A1 | 12/2018 | Rodriguez et al. |
| 2018/0373434 A1 | 12/2018 | Switzer et al. |
| 2018/0373757 A1 | 12/2018 | Schukovets et al. |
| 2019/0005094 A1 | 1/2019 | Yi |
| 2019/0012342 A1 | 1/2019 | Cohn |
| 2019/0036989 A1 | 1/2019 | Eirinberg et al. |
| 2019/0042628 A1* | 2/2019 | Rajpara ............... G06F 16/3323 |
| 2019/0050445 A1 | 2/2019 | Griffith et al. |
| 2019/0050812 A1 | 2/2019 | Boileau |
| 2019/0056856 A1 | 2/2019 | Simmons et al. |
| 2019/0065545 A1 | 2/2019 | Hazel et al. |
| 2019/0068703 A1 | 2/2019 | Vora et al. |
| 2019/0073350 A1 | 3/2019 | Shiotani |
| 2019/0095413 A1 | 3/2019 | Davis et al. |
| 2019/0108046 A1 | 4/2019 | Spencer-Harper et al. |
| 2019/0113935 A1 | 4/2019 | Kuo et al. |
| 2019/0114308 A1 | 4/2019 | Hancock |
| 2019/0123924 A1 | 4/2019 | Embiricos et al. |
| 2019/0130611 A1 | 5/2019 | Black et al. |
| 2019/0138583 A1 | 5/2019 | Silk et al. |
| 2019/0138588 A1 | 5/2019 | Silk et al. |
| 2019/0138653 A1 | 5/2019 | Roller et al. |
| 2019/0155821 A1 | 5/2019 | Dirisala |
| 2019/0208058 A1 | 7/2019 | Dvorkin et al. |
| 2019/0236188 A1 | 8/2019 | McKenna |
| 2019/0243879 A1 | 8/2019 | Harley et al. |
| 2019/0251884 A1 | 8/2019 | Burns et al. |
| 2019/0258461 A1 | 8/2019 | Li et al. |
| 2019/0258706 A1 | 8/2019 | Li et al. |
| 2019/0286839 A1 | 9/2019 | Mutha et al. |
| 2019/0306009 A1 | 10/2019 | Makovsky et al. |
| 2019/0324840 A1 | 10/2019 | Malamut et al. |
| 2019/0325012 A1 | 10/2019 | Delaney et al. |
| 2019/0347077 A1 | 11/2019 | Huebra |
| 2019/0361879 A1 | 11/2019 | Rogynskyy et al. |
| 2019/0361971 A1 | 11/2019 | Zenger et al. |
| 2019/0364009 A1 | 11/2019 | Joseph et al. |
| 2019/0371442 A1 | 12/2019 | Schoenberg |
| 2019/0391707 A1 | 12/2019 | Ristow et al. |
| 2020/0005248 A1 | 1/2020 | Gerzi et al. |
| 2020/0005295 A1 | 1/2020 | Murphy |
| 2020/0012629 A1 | 1/2020 | Lereya et al. |
| 2020/0019595 A1 | 1/2020 | Azua |
| 2020/0026397 A1 | 1/2020 | Wohlstadter et al. |
| 2020/0042648 A1 | 2/2020 | Rao |
| 2020/0050696 A1 | 2/2020 | Mowatt et al. |
| 2020/0053176 A1 | 2/2020 | Jimenez et al. |
| 2020/0125574 A1 | 4/2020 | Ghoshal et al. |
| 2020/0134002 A1 | 4/2020 | Tung et al. |
| 2020/0142546 A1 | 5/2020 | Breedvelt-Schouten et al. |
| 2020/0151630 A1 | 5/2020 | Shakhnovich |
| 2020/0159558 A1 | 5/2020 | Bak |
| 2020/0175094 A1* | 6/2020 | Palmer ................. G06F 16/353 |
| 2020/0192785 A1 | 6/2020 | Chen |
| 2020/0247661 A1 | 8/2020 | Rao et al. |
| 2020/0265112 A1* | 8/2020 | Fox ......................... H04L 67/06 |
| 2020/0301678 A1 | 9/2020 | Burman et al. |
| 2020/0301902 A1 | 9/2020 | Maloy et al. |
| 2020/0327244 A1 | 10/2020 | Blass et al. |
| 2020/0334019 A1 | 10/2020 | Bosworth et al. |
| 2020/0348809 A1 | 11/2020 | Drescher |
| 2020/0349320 A1 | 11/2020 | Owens |
| 2020/0356873 A1 | 11/2020 | Nawrocke et al. |
| 2020/0380212 A1 | 12/2020 | Butler et al. |
| 2020/0380449 A1 | 12/2020 | Choi |
| 2020/0387664 A1 | 12/2020 | Kusumura et al. |
| 2020/0401581 A1 | 12/2020 | Eubank et al. |
| 2021/0019287 A1 | 1/2021 | Prasad et al. |
| 2021/0021603 A1 | 1/2021 | Gibbons |
| 2021/0034058 A1 | 2/2021 | Subramanian et al. |
| 2021/0042796 A1 | 2/2021 | Khoury et al. |
| 2021/0049555 A1 | 2/2021 | Shor |
| 2021/0055955 A1 | 2/2021 | Yankelevich et al. |
| 2021/0056509 A1 | 2/2021 | Lindy |
| 2021/0072883 A1 | 3/2021 | Migunova et al. |
| 2021/0073526 A1 | 3/2021 | Zeng et al. |
| 2021/0084120 A1 | 3/2021 | Fisher et al. |
| 2021/0124749 A1 | 4/2021 | Suzuki et al. |
| 2021/0124872 A1 | 4/2021 | Lereya |
| 2021/0136027 A1 | 5/2021 | Barbitta et al. |
| 2021/0149553 A1 | 5/2021 | Lereya et al. |
| 2021/0150489 A1 | 5/2021 | Haramati et al. |
| 2021/0165782 A1 | 6/2021 | Deshpande et al. |
| 2021/0166196 A1 | 6/2021 | Lereya et al. |
| 2021/0166339 A1 | 6/2021 | Mann et al. |
| 2021/0173682 A1 | 6/2021 | Chakraborti et al. |
| 2021/0174006 A1 | 6/2021 | Stokes |
| 2021/0192126 A1 | 6/2021 | Gehrmann et al. |
| 2021/0248311 A1* | 8/2021 | Helft ....................... G06F 40/18 |
| 2021/0264220 A1 | 8/2021 | Wei et al. |
| 2021/0326519 A1 | 10/2021 | Lin et al. |
| 2021/0342785 A1* | 11/2021 | Mann ..................... G06F 40/40 |
| 2022/0221591 A1 | 7/2022 | Smith et al. |

FOREIGN PATENT DOCUMENTS

| | | | |
|---|---|---|---|
| CN | 107123424 A | 9/2017 | |
| CN | 107123424 A * | 9/2017 | ........... G06F 16/683 |
| CN | 107422666 A | 12/2017 | |
| CN | 107623596 A | 1/2018 | |
| CN | 107885656 A | 4/2018 | |
| CN | 112929172 A | 6/2021 | |
| EP | 3 443 466 B1 | 12/2021 | |
| KR | 20150100760 | 9/2015 | |
| KR | 20150100760 A * | 9/2015 | |
| WO | WO 2004/100015 A2 | 11/2004 | |
| WO | WO-2004100015 A2 * | 11/2004 | ........... G06F 17/211 |
| WO | WO 2006/116580 A2 | 11/2006 | |
| WO | WO 2008109541 A1 | 9/2008 | |
| WO | WO 2017/202159 A1 | 11/2017 | |
| WO | WO 2020/187408 A1 | 9/2020 | |
| WO | WO 2021096944 A1 | 5/2021 | |
| WO | WO 2021144656 A1 | 7/2021 | |
| WO | WO-2021144656 A1 * | 7/2021 | ............. G06F 16/26 |
| WO | WO-2021161104 A1 * | 8/2021 | ............ G06F 16/211 |
| WO | WO 2021161104 A1 | 8/2021 | |
| WO | WO-2021220058 A1 * | 11/2021 | ............ G06F 11/302 |
| WO | WO 2021220058 A1 | 11/2021 | |
| WO | WO-2022153122 A1 * | 7/2022 | ........... G06F 3/0484 |

OTHER PUBLICATIONS

Baarslag. "Negotiation as an interaction mechanism for deciding app permissions." In Proceedings of the 2016 CHI conference extended abstracts on human factors in computing systems, pp. 2012-2019. 2016. (Year: 2016).*

Alexis Rodrigo. Project Management with monday.com: A 101 introduction, onlne, 34 pages, Jul. 22, 2019. (Year: 2019).*

Desmedt, Yvo, and Arash Shaghaghi. "Function-Based Access Control (FBAC) From Access Control Matrix to Access Control Tensor." In Proceedings of the 8th ACM CCS International Workshop on Managing Insider Security Threats, pp. 89-92. 2016. (Year: 2016).*

Stancu, Florin-Alexandru, Mihai Chiroiu, and Razvan Rughinis. "SecCollab-Improving Confidentiality for Existing Cloud-Based Collaborative Editors." In 2017 21st International Conference on Control Systems and Computer Science (CSCS), pp. 324-331. IEEE, 2017. (Year: 2017).*

Alessio et al., Monday.com Walkthrough 2018VAll Features, Platforms & Thoughts, Mar. 1, 2018, pp. 1-55, 2018.

Rodrigo et al., Project Management with Monday.com: a 101 Introduction; Jul. 22, 2019, pp. 1-21, 2019.

(56) References Cited

OTHER PUBLICATIONS

International Search Report and Written Opinion of the International Searching Authority in PCT/IB2020/000658, dated Nov. 11, 2020 (12 pages).
International Search Report in PCT/IB2020/000974, dated May 3, 2021 (19 pages).
International Search Report in PCT/IB2021/000090 dated Jul. 27, 2021.
ShowMyPC, "Switch Presenter While Using ShowMyPC"; web archive.org; Aug. 20, 2016.
International Search Report and Written Opinion of the International Search Authority in PCT/IB2020/000024, dated May 3, 2021 (13 pages).
"Pivot table—Wikipedia"; URL: https://en.wikepedia.org/w/index.php?title=Pivot_table&oldid=857163289, originally retrieve on Oct. 23, 2019; retrieved on Jul. 16, 2021.
Vishal Singh, "A Theoretical Framework of a BIM-based Multi-Disciplinary Collaboration Platform", Nov. 5, 2020, Automation in Construction, 20 (2011), pp. 134-144 (Year: 2011).
Edward A. Stohr, Workflow Automation: Overview and Research Issues, 2001, Information Systems Frontiers 3:3, pp. 281-296 (Year: 2001).
International Search Report and Written Opinion of the International Search Authority in PCT/IB2021/000297, dated Oct. 12, 2021 (20 pages).
Dapulse.com "features".extracted from web.archive.or/web/20140918421/https://dapulse.com/features; Sep. 2014 (Year: 2014).
Stephen Larson et al., Introducing Data Mining Concepts Using Microsoft Excel's Table Analysis Tools, Oct. 2015, [Retrieved on Nov. 19, 2021], Retrieved from the internet: <URL: https://dl.acm.org/doi/pdf/10.5555/2831373.2831394> 3 Pages (127-129) (Year: 2015).
Isaiah Pinchas et al., Lexical Analysis Tool, May 2004, [Retrieved on Nov. 19, 2021], Retrieved from the internet: <URL: https://dl.acm.org/doi/pdf/10.1145/997140.997147> 9 Pages (66-74) (Year: 2004).
Sajjad Bahrebar et al., "A Novel Type-2 Fuzzy Logic for Improved Risk Analysis of Proton Exchange Membrane Fuel Cells in Marine Power Systems Application", *Energies*, 11, 721, pp. 1-16, Mar. 22, 2018.
Pedersen et al., "Tivoli: an electronic whiteboard for informal workgroup meetings", Conference on Human Factors in Computing Systems: Proceedings of the INTERACT '93 and CHI '93 conference on Human factors in computing systems; Apr. 24-29, 1993:391-398. (Year 1993).
Peltier, "Clustered and Stacked Column and Bar Charts", Aug. 2011, Peltier Technical Services, Inc., pp. 1-128; (Year: 2011).
Beate List, "An Evaluation of Conceptual Business Process Modelling Languages", 2006, SAC'06, Apr. 23-27, pp. 1532-1539 (Year: 2006).
"demonstracion en espanol de Monday.com", published Feb. 20, 2019. https://www.youtube.com/watch?v=z0qydTgof1A (Year: 2019).
Desmedt, Yvo, and Arash Shaghaghi, "Function-Based Access Control (FBAC) From Access Control Matrix to Access Control Tensor." In Proceedings of the 8th ACM CCS International Workshop on Managing Insider Security Threats, pp. 89-92. (2016).
Anupam, V., et al., "Personalizing the Web Using Site Descriptions", Proceedings of the Tenth International Workshop on Database and Expert Systems Applications, ISBN: 0-7695-0281-4, DOI: 10.1109/DEXA.1999.795275, Jan. 1, 1999, pp. 732-738. (Year: 1999).
Gutwin, C. et al., "Supporting Informal Collaboration in Shared-Workspace Groupware", J. Univers. Comput. Sci., 14(9), 1411-1434 (2008).

U.S. Appl. No. 17/143,897, filed Jan. 7, 2021.
U.S. Appl. No. 17/143,603, filed Jan. 7, 2021.
U.S. Appl. No. 17/143,745, filed Jan. 7, 2021.
U.S. Appl. No. 17/143,482, filed Jan. 7, 2021.
U.S. Appl. No. 17/143,768, filed Jan. 7, 2021.
U.S. Appl. No. 17/143,677, filed Jan. 7, 2021.
U.S. Appl. No. 17/143,653, filed Jan. 7, 2021.
U.S. Appl. No. 17/143,916, filed Jan. 7, 2021.
U.S. Appl. No. 17/143,475, filed Jan. 7, 2021.
U.S. Appl. No. 17/143,865, filed Jan. 7, 2021.
U.S. Appl. No. 17/143,462, filed Jan. 7, 2021.
U.S. Appl. No. 17/143,470, filed Jan. 7, 2021.
U.S. Appl. No. 17/143,905, filed Jan. 7, 2021.
U.S. Appl. No. 17/143,798, filed Jan. 7, 2021.
U.S. Appl. No. 17/143,892, filed Jan. 7, 2021.
U.S. Appl. No. 17/243,716, filed Apr. 29, 2021.
U.S. Appl. No. 17/243,727, filed Apr. 29, 2021.
U.S. Appl. No. 17/232,978, filed Apr. 16, 2021.
U.S. Appl. No. 17/243,809, filed Apr. 29, 2021.
U.S. Appl. No. 17/243,901, filed Apr. 29, 2021.
U.S. Appl. No. 17/232,354, filed Apr. 16, 2021.
U.S. Appl. No. 17/243,898, filed Apr. 29, 2021.
U.S. Appl. No. 17/243,969, filed Apr. 29, 2021.
U.S. Appl. No. 17/243,742, filed Apr. 29, 2021.
U.S. Appl. No. 17/243,752, filed Apr. 29, 2021.
U.S. Appl. No. 17/232,754, filed Apr. 16, 2021.
U.S. Appl. No. 17/232,827, filed Apr. 16, 2021.
U.S. Appl. No. 17/243,763, filed Apr. 29, 2021.
U.S. Appl. No. 17/243,848, filed Apr. 29, 2021.
U.S. Appl. No. 17/243,934, filed Apr. 29, 2021.
U.S. Appl. No. 17/244,121, filed Apr. 29, 2021.
U.S. Appl. No. 17/243,807, filed Apr. 29, 2021.
U.S. Appl. No. 17/244,027, filed Apr. 29, 2021.
U.S. Appl. No. 17/244,157, filed Apr. 29, 2021.
U.S. Appl. No. 17/243,725, filed Apr. 29, 2021.
U.S. Appl. No. 17/243,737, filed Apr. 29, 2021.
U.S. Appl. No. 17/243,748, filed Apr. 29, 2021.
U.S. Appl. No. 16/453,065, filed Jun. 26, 2019.
U.S. Appl. No. 17/243,691, filed Apr. 29, 2021.
U.S. Appl. No. 17/243,722, filed Apr. 29, 2021.
U.S. Appl. No. 17/243,892, filed Apr. 29, 2021.
U.S. Appl. No. 17/243,977, filed Apr. 29, 2021.
U.S. Appl. No. 17/243,764, filed Apr. 29, 2021.
U.S. Appl. No. 17/243,837, filed Apr. 29, 2021.
U.S. Appl. No. 17/243,729, filed Apr. 29, 2021.
U.S. Appl. No. 17/243,802, filed Apr. 29, 2021.
U.S. Appl. No. 17/242,452, filed Apr. 28, 2021.
U.S. Appl. No. 17/243,891, filed Apr. 29, 2021.
U.S. Appl. No. 17/243,775, filed Apr. 29, 2021.
U.S. Appl. No. 17/243,731, filed Apr. 29, 2021.
U.S. Appl. No. 17/243,768, filed Apr. 29, 2021.
U.S. Appl. No. 16/502,679, filed Jul. 3, 2019.
U.S. Appl. No. 17/565,652, filed Dec. 30, 2021.
U.S. Appl. No. 17/565,699, filed Dec. 30, 2021.
U.S. Appl. No. 17/565,718, filed Dec. 30, 2021.
U.S. Appl. No. 17/565,880, filed Dec. 30, 2021.
U.S. Appl. No. 17/564,745, filed Dec. 29, 2021.
U.S. Appl. No. 17/565,526, filed Dec. 30, 2021.
U.S. Appl. No. 17/565,614, filed Dec. 30, 2021.
U.S. Appl. No. 17/565,843, filed Dec. 30, 2021.
U.S. Appl. No. 17/565,534, filed Dec. 30, 2021.
U.S. Appl. No. 17/565,821, filed Dec. 30, 2021.
U.S. Appl. No. 17/565,780, filed Dec. 30, 2021.

\* cited by examiner

DIGITAL PROCESSING SYSTEMS AND METHODS FOR GRANULAR PERMISSION SYSTEM FOR ELECTRONIC DOCUMENTS IN COLLABORATIVE WORK SYSTEMS

CROSS-REFERENCE TO RELATED APPLICATIONS

This application is based on and claims benefit of priority of International Patent Application No. PCT/IB2021/062440 filed on Dec. 29, 2021, which claims priority to U.S. Provisional Patent Application No. 63/233,925, filed Aug. 17, 2021, U.S. Provisional Patent Application No. 63/273,448, filed Oct. 29, 2021, U.S. Provisional Patent Application No. 63/273,453, filed Oct. 29, 2021, International Patent Application No. PCT/IB2021/000024, filed on Jan. 14, 2021, International Patent Application No. PCT/IB2021/000090, filed on Feb. 11, 2021, and International Patent Application No. PCT/IB2021/000297, filed on Apr. 28, 2021, the contents of all of which are incorporated herein by reference in their entireties.

TECHNICAL FIELD

Embodiments consistent with the present disclosure include systems and methods for collaborative work systems. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

BACKGROUND

Operation of modern enterprises can be complicated and time consuming. In many cases, managing the operation of a single project requires integration of several employees, departments, and other resources of the entity. To manage the challenging operation, project management software applications may be used. Such software applications allow a user to organize, plan, and manage resources by providing project-related information in order to optimize the time and resources spent on each project. It would be useful to improve these software applications to increase operation management efficiency.

SUMMARY

One aspect of the present disclosure is directed to systems, methods, and computer readable media for setting granular permissions for shared electronic documents. Systems, methods, and non-transitory computer readable media may involve at least one processor configured to enable access to an electronic word processing document including blocks of text that may each have an associated address. The at least one processor may be further configured to access at least one data structure containing block-based permissions for each block of text. The block-based permissions may include at least one permission to view an associated block of text. The at least one processor may be further configured to receive from an entity a request to access the electronic word processing document. In addition, the at least one processor may be configured to perform a lookup in the at least one data structure to determine that the entity lacks permission to view at least one specific block within the word processing document. The at least one processor may be further configured to cause to be rendered on a display associated with the entity, the word processing document with the at least one specific block omitted from the display.

DETAILED DESCRIPTION

Figure 1:
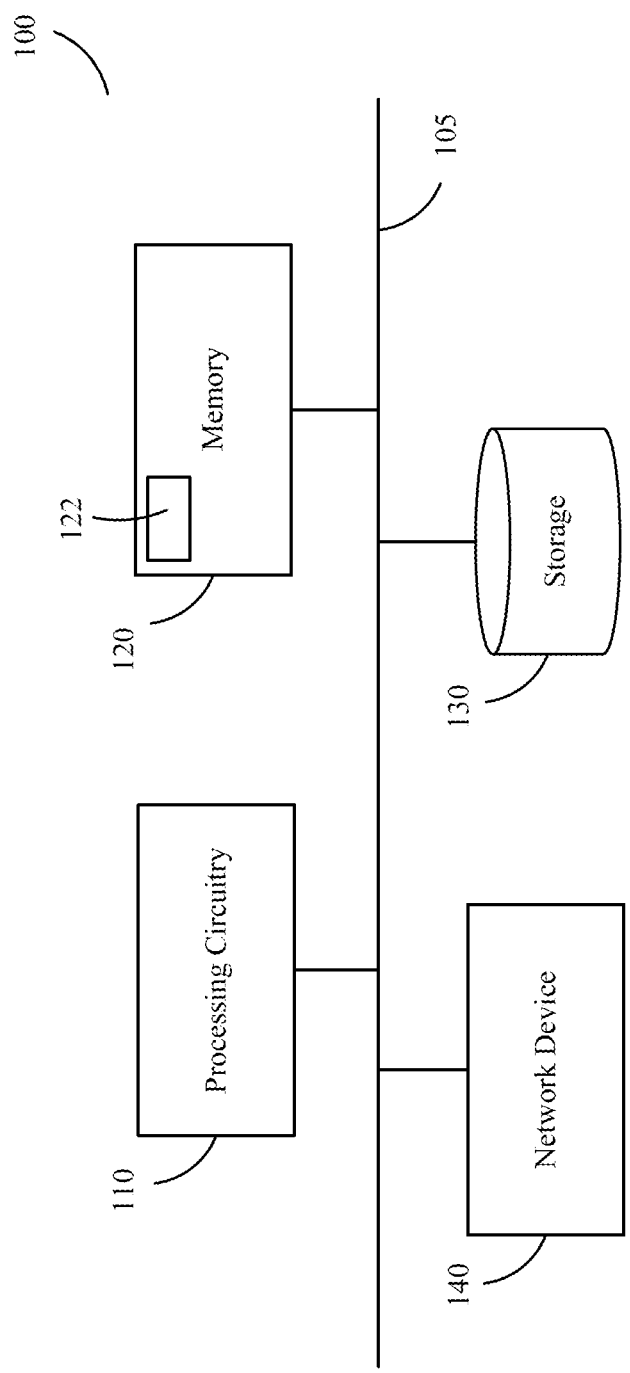
FIG. 1 is a block diagram of an exemplary computing device which may be employed in connection with embodiments of the present disclosure.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspect of any other mechanisms, and such combinations are within the scope of this disclosure.

This disclosure is constructed to provide a basic understanding of a few exemplary embodiments with the understanding that features of the exemplary embodiments may be combined with other disclosed features or may be incorporated into platforms or embodiments not described herein while still remaining within the scope of this disclosure. For convenience, and form of the word "embodiment" as used herein is intended to refer to a single embodiment or multiple embodiments of the disclosure.

Certain embodiments disclosed herein include devices, systems, and methods for collaborative work systems that may allow a user to interact with information in real time. To avoid repetition, the functionality of some embodiments is described herein solely in connection with a processor or at least one processor. It is to be understood that such exemplary descriptions of functionality applies equally to methods and computer readable media and constitutes a written description of systems, methods, and computer readable media. The underlying platform may allow a user to structure a systems, methods, or computer readable media in many ways using common building blocks, thereby permitting flexibility in constructing a product that suits desired needs. This may be accomplished through the use of boards. A board may be a table configured to contain items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in a table. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented horizontally and a column vertically. However, in the broader generic sense as used herein, the term "row" may refer to one or more of a horizontal and/or a vertical presentation. A table or tablature as used herein, refers to data presented in horizontal and vertical rows, (e.g., horizontal rows and vertical columns) defining cells in which data is presented.

Tablature may refer to any structure for presenting data in an organized manner, as previously discussed, such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or as an intersection between a horizontal and a vertical column. As a further example, a cell may be defined as a node on a web chart or a node on a tree data structure. As would be appreciated by a skilled artisan, however, the disclosed embodiments are not limited to any specific structure, but rather may be practiced in conjunction with any desired organizational arrangement. In addition, tablature may include any type of information, depending on intended use. When used in conjunction with a workflow management application, the tablature may include any information associated with one or more tasks, such as one or more status values, projects, countries, persons, teams, progress statuses, a combination thereof, or any other information related to a task.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using, for example, static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Boards and widgets may be part of a platform that may enable users to interact with information in real time in collaborative work systems involving electronic collaborative word processing documents. Electronic collaborative word processing documents (and other variations of the term) as used herein are not limited to only digital files for word processing, but may include any other processing document such as presentation slides, tables, databases, graphics, sound files, video files or any other digital document or file. Electronic collaborative word processing documents may include any digital file that may provide for input, editing, formatting, display, and/or output of text, graphics, widgets, objects, tables, links, animations, dynamically updated elements, or any other data object that may be used in conjunction with the digital file. Any information stored on or displayed from an electronic collaborative word processing document may be organized into blocks. A block may include any organizational unit of information in a digital file, such as a single text character, word, sentence, paragraph, page, graphic, or any combination thereof. Blocks may include static or dynamic information, and may be linked to other sources of data for dynamic updates. Blocks may be automatically organized by the system, or may be manually selected by a user according to preference. In one embodiment, a user may select a segment of any information in an electronic word processing document and assign it as a particular block for input, editing, formatting, or any other further configuration.

An electronic collaborative word processing document may be stored in one or more repositories connected to a network accessible by one or more users through their computing devices. In one embodiment, one or more users may simultaneously edit an electronic collaborative word processing document. The one or more users may access the electronic collaborative word processing document through one or more user devices connected to a network. User access to an electronic collaborative word processing document may be managed through permission settings set by an author of the electronic collaborative word processing document. An electronic collaborative word processing document may include graphical user interface elements enabled to support the input, display, and management of multiple edits made by multiple users operating simultaneously within the same document.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture.

Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

The memory may include a Random Access Memory (RAM), a Read-Only Memory (ROM), a hard disk, an optical disk, a magnetic medium, a flash memory, other permanent, fixed, volatile or non-volatile memory, or any other mechanism capable of storing instructions. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage.

Some embodiments may involve at least one processor. A processor may be any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), virtual reality (VR) display.

Certain embodiments disclosed herein may include a processor configured to perform methods that may include triggering an action in response to an input. The input may be from a user action or from a change of information contained in a user's table, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data contained in a board or in memory. An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

FIG. 1 is a block diagram of an exemplary computing device 100 for generating a column and/or row oriented data structure repository for data consistent with some embodiments. The computing device 100 may include processing circuitry 110, such as, for example, a central processing unit (CPU). In some embodiments, the processing circuitry 110 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 110 may be coupled via a bus 105 to a memory 120.

The memory 120 may further include a memory portion 122 that may contain instructions that when executed by the processing circuitry 110, may perform the method described in more detail herein. The memory 120 may be further used as a working scratch pad for the processing circuitry 110, a temporary storage, and others, as the case may be. The memory 120 may be a volatile memory such as, but not limited to, random access memory (RAM), or non-volatile memory (NVM), such as, but not limited to, flash memory. The processing circuitry 110 may be further connected to a network device 140, such as a network interface card, for providing connectivity between the computing device 100 and a network, such as a network 210, discussed in more detail with respect to FIG. 2 below. The processing circuitry 110 may be further coupled with a storage device 130. The storage device 130 may be used for the purpose of storing single data type column-oriented data structures, data elements associated with the data structures, or any other data structures. While illustrated in FIG. 1 as a single device, it is to be understood that storage device 130 may include multiple devices either collocated or distributed.

The processing circuitry 110 and/or the memory 120 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

Figure 2:
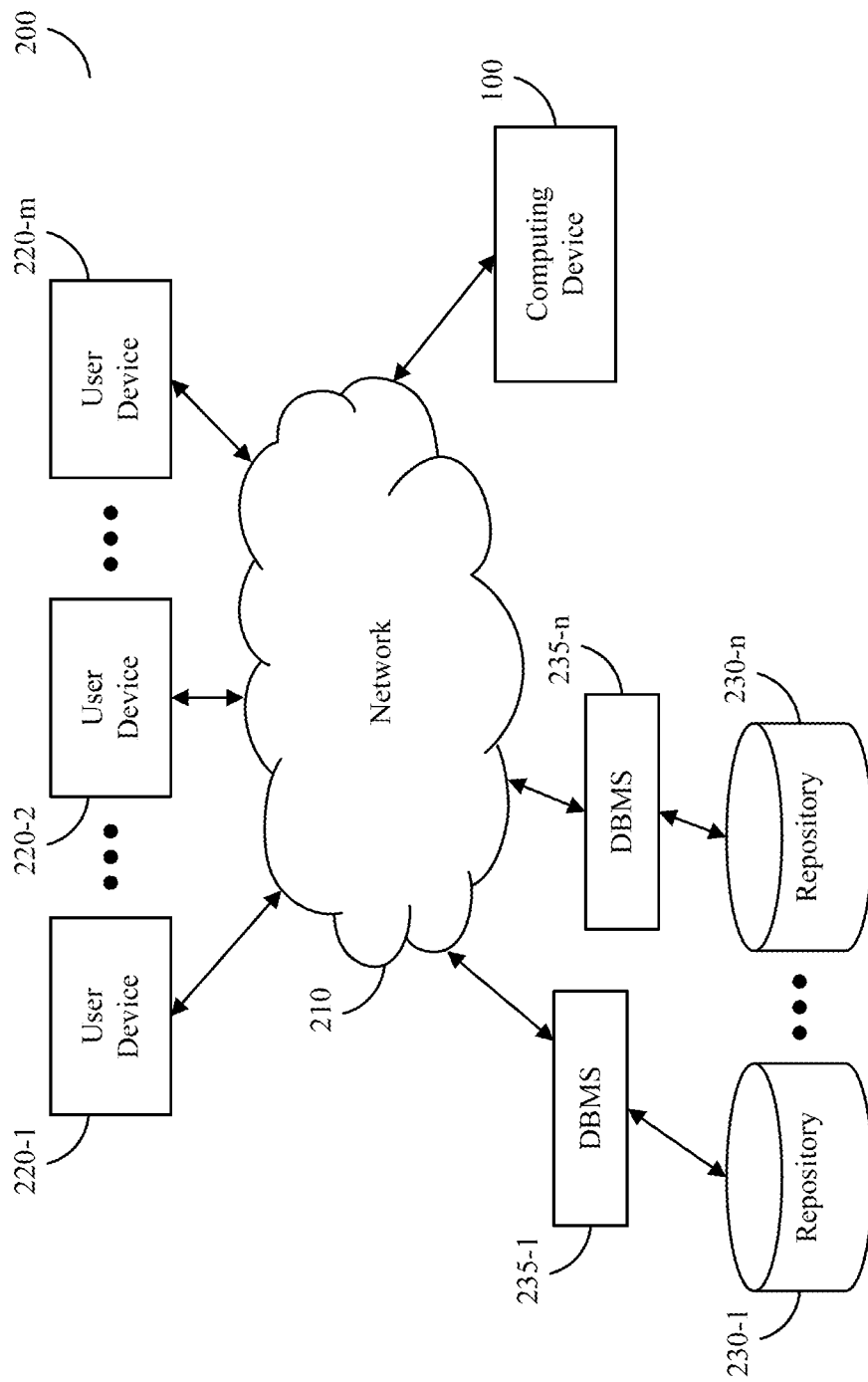
FIG. 2 is a block diagram of an exemplary computing architecture for collaborative work systems, consistent with embodiments of the present disclosure.

FIG. 2 is a block diagram of computing architecture 200 that may be used in connection with various disclosed embodiments. The computing device 100, as described in connection with FIG. 1, may be coupled to network 210. The network 210 may enable communication between different elements that may be communicatively coupled with the computing device 100, as further described below. The network 210 may include the Internet, the world-wide-web (WWW), a local area network (LAN), a wide area network (WAN), a metro area network (MAN), and other networks capable of enabling communication between the elements of the computing architecture 200. In some disclosed embodiments, the computing device 100 may be a server deployed in a cloud computing environment.

One or more user devices 220-1 through user device 220-m, where 'm' in an integer equal to or greater than 1, referred to individually as user device 220 and collectively as user devices 220, may be communicatively coupled with the computing device 100 via the network 210. A user device 220 may be for example, a smart phone, a mobile phone, a laptop, a tablet computer, a wearable computing device, a personal computer (PC), a smart television and the like. A user device 220 may be configured to send to and receive from the computing device 100 data and/or metadata associated with a variety of elements associated with single data type column-oriented data structures, such as columns, rows, cells, schemas, and the like.

One or more data repositories 230-1 through data repository 230-n, where 'n' in an integer equal to or greater than 1, referred to individually as data repository 230 and collectively as data repository 230, may be communicatively coupled with the computing device 100 via the network 210, or embedded within the computing device 100. Each data repository 230 may be communicatively connected to the network 210 through one or more database management services (DBMS) 235-1 through DBMS 235-n. The data repository 230 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 100.

Figure 3:
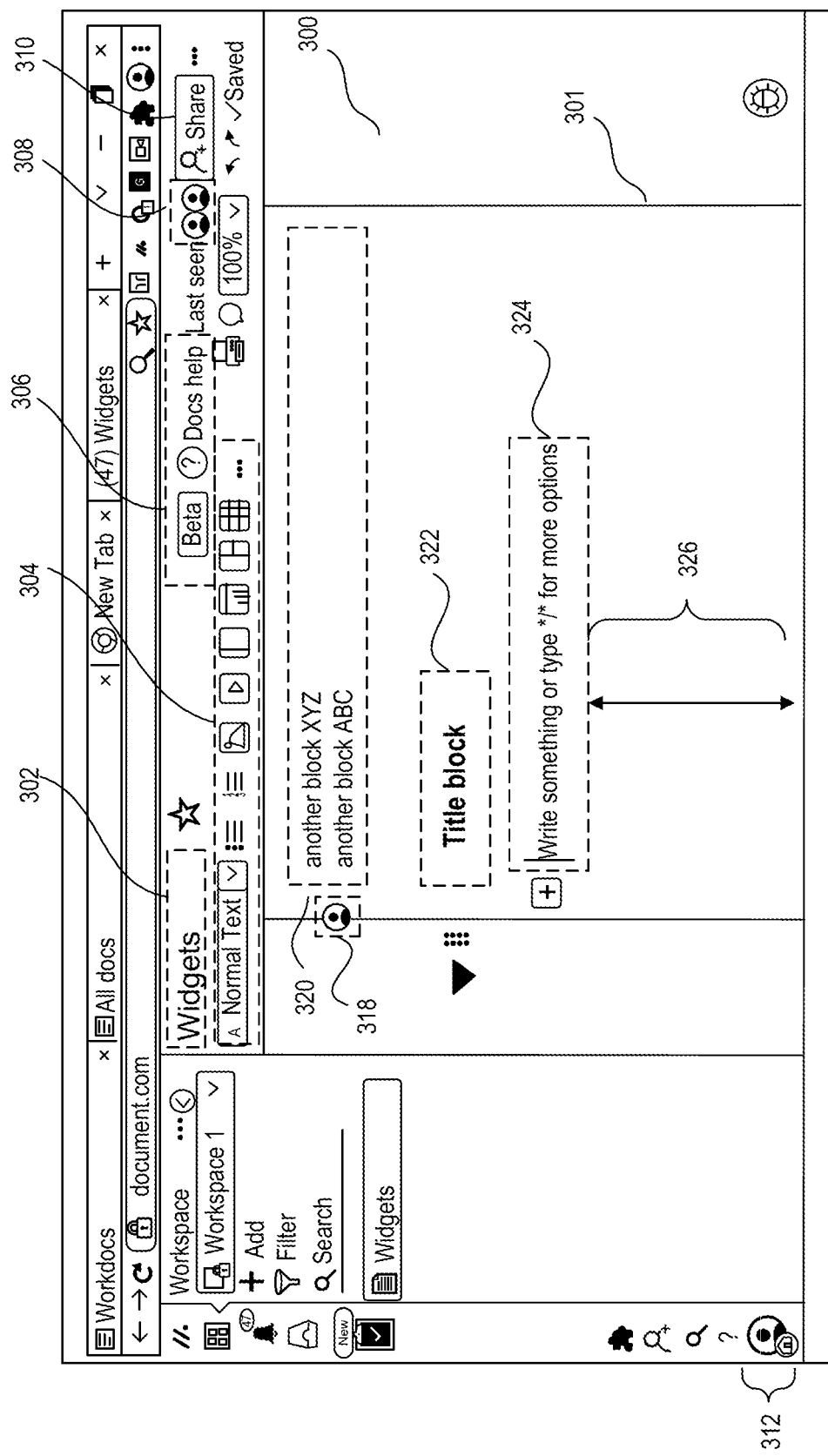
FIG. 3 illustrates an example of an electronic collaborative word processing document, consistent with some embodiments of the present disclosure.

FIG. 3 is an exemplary embodiment of a presentation of an electronic collaborative word processing document 301 via an editing interface or editor 300. The editor 300 may include any user interface components 302 through 312 to assist with input or modification of information in an electronic collaborative word processing document 301. For example, editor 300 may include an indication of an entity 312, which may include at least one individual or group of individuals associated with an account for accessing the electronic collaborative word processing document. User interface components may provide the ability to format a title 302 of the electronic collaborative word processing document, select a view 304, perform a lookup for additional features 306, view an indication of other entities 308 accessing the electronic collaborative word processing document at a certain time (e.g., at the same time or at a recorded previous time), and configure permission access 310 to the electronic collaborative word processing document. The electronic collaborative word processing document 301 may include information that may be organized into blocks as previously discussed. For example, a block 320 may itself include one or more blocks of information. Each block may have similar or different configurations or formats according to a default or according to user preferences. For example, block 322 may be a "Title Block" configured to include text identifying a title of the document, and may also contain, embed, or otherwise link to metadata associated with the title. A block may be pre-configured to display information in a particular format (e.g., in bold font). Other blocks in the same electronic collaborative word processing document 301, such as compound block 320 or input block 324 may be configured differently from title block 322. As a user inputs information into a block, either via input block 324 or a previously entered block, the platform may provide an indication of the entity 318 responsible for inputting or altering the information. The entity responsible for inputting or altering the information in the electronic collaborative word processing document may include any entity accessing the document, such as an author of the document or any other collaborator who has permission to access the document.

Some aspects of this disclosure may relate to a granular permissions system for shared electronic documents, including methods, systems, devices, and computer readable media. For ease of discussion, a system is described below, with the understanding that aspects of the system apply equally to non-transitory computer readable media, methods, and devices. Shared electronic documents, as used herein, are not limited to only digital files for word processing but may include any other processing document such as presentation slides, tables, databases, graphics, sound files, video files or any other digital document or file. Shared electronic documents may include any digital file that may provide for input, editing, formatting, display, and output of text, graphics, widgets, objects, tables, links, animations, dynamically updated elements, or any other data object that may be used in conjunction with the digital file. Shared electronic documents may be collaborative documents or non-collaborative documents. A collaborative document, as used herein, may refer to any document that may enable simultaneous viewing and editing by multiple entities. A collaborative document may, for example, be generated in or uploaded to a common online platform (e.g., a website) to enable multiple members of a team to contribute to preparing and editing the document. A non-collaborative document, as used herein, may refer to any document that only a single entity may modify, prepare, and edit at a time. The single entity may share the non-collaborative document with other entities (e.g., an end-user or audience) to enable the other entities to view or edit the same document.

Granular permissions, as used herein, may refer to any attribute or setting that may define how an entity or entities may interact with any amount of content associated with a section or portion of a shared electronic document. Content, as used herein, may refer to any information displayed in a section or portion of a shared electronic document or any other information that may be associated with a section or portion of a shared electronic document. For example, content may include data objects, alphanumerics, metadata, or any other data associated with a section or portion of a shared electronic document. Such interactions may involve viewing, editing, navigating, executing, or any other user task involving the content associated with the document. The sections or portions of the shared electronic document may include one or more data objects. Non-limiting examples of granular permissions may involve attributes or settings that authorize an entity or entities to view or edit a single character of text, a line of text, several lines of text, a table, a portion of a video, a portion of an audio file associated with the document, or any other selectable portion of the document. Permissions may be said to be configurable on a granular level because permissions may be configured for any selected segment of information (e.g., a block, as discussed in detail later) contained in a document, and not just a general permission setting for the entire document. Other non-limiting examples of granular permissions may involve attributes or settings that authorize an entity or entities to view or edit a sentence, paragraph, an image, or a chart associated with the document. In some embodiments, the granular permission settings may be reconfigured after a particular setting has been applied. For example, a single electronic document may contain a first portion of text with a first permission setting and a second portion of text with a second permission setting. The first permission setting may be configured to enable only the document author to view and access the first portion of text while the second permission setting may be configured to enable any user to view and access the second portion of text. As a result, the document author would be able to view and access both the first and second portions of text in the document, while a secondary user would only be able to view and access the second portion of text. The document author may then reconfigure the permission setting to access the first portion of text to authorize any secondary user to view that first portion of text at a later time. Similarly, the permission settings to access the second portion of text may be reconfigured to restrict access to certain users by predetermined users such as the document author.

Figure 4A:
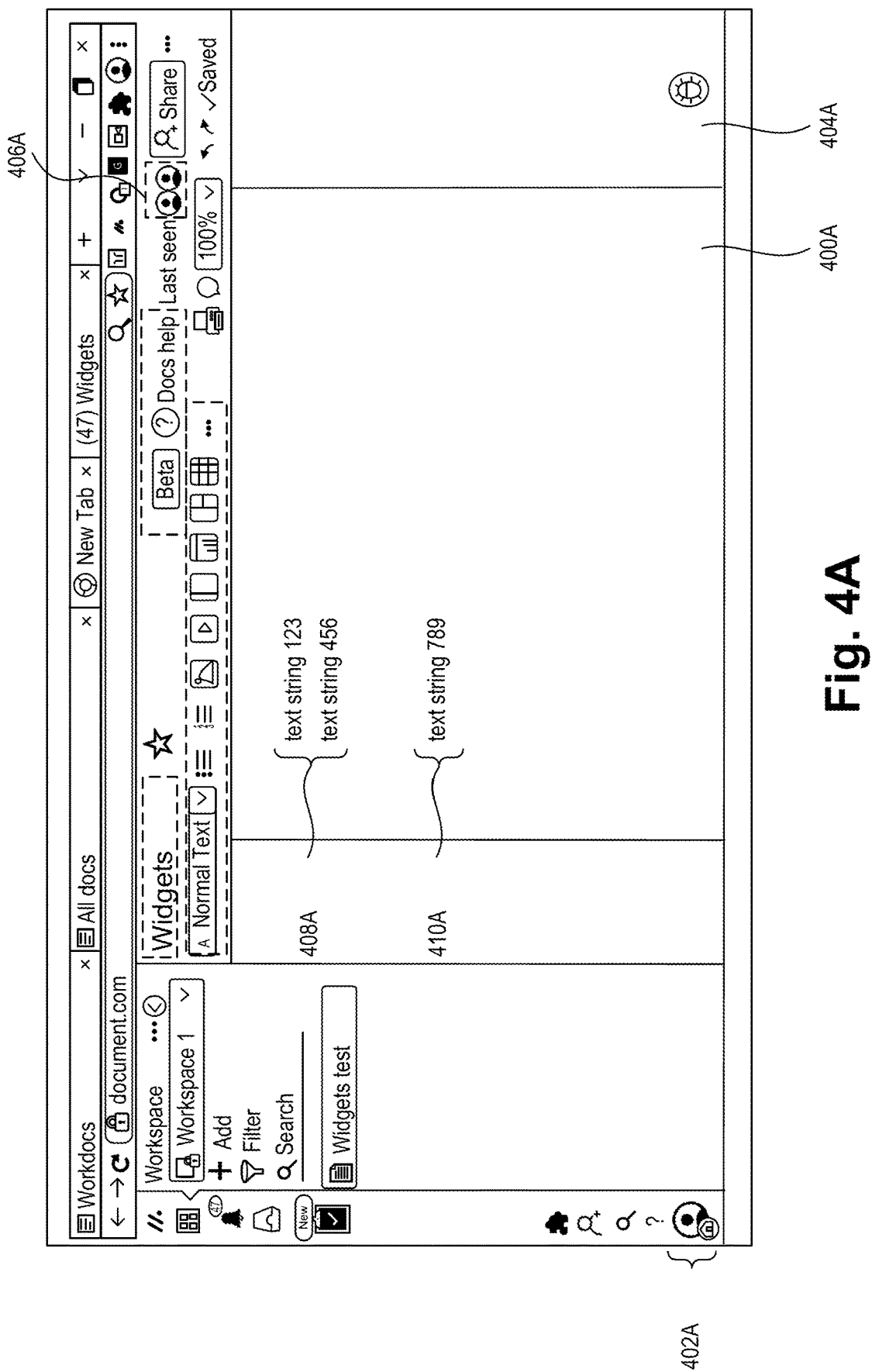
FIG. 4A illustrates an example of a shared electronic document with defined granular permissions, consistent with some embodiments of the present disclosure.
Figure 4B:
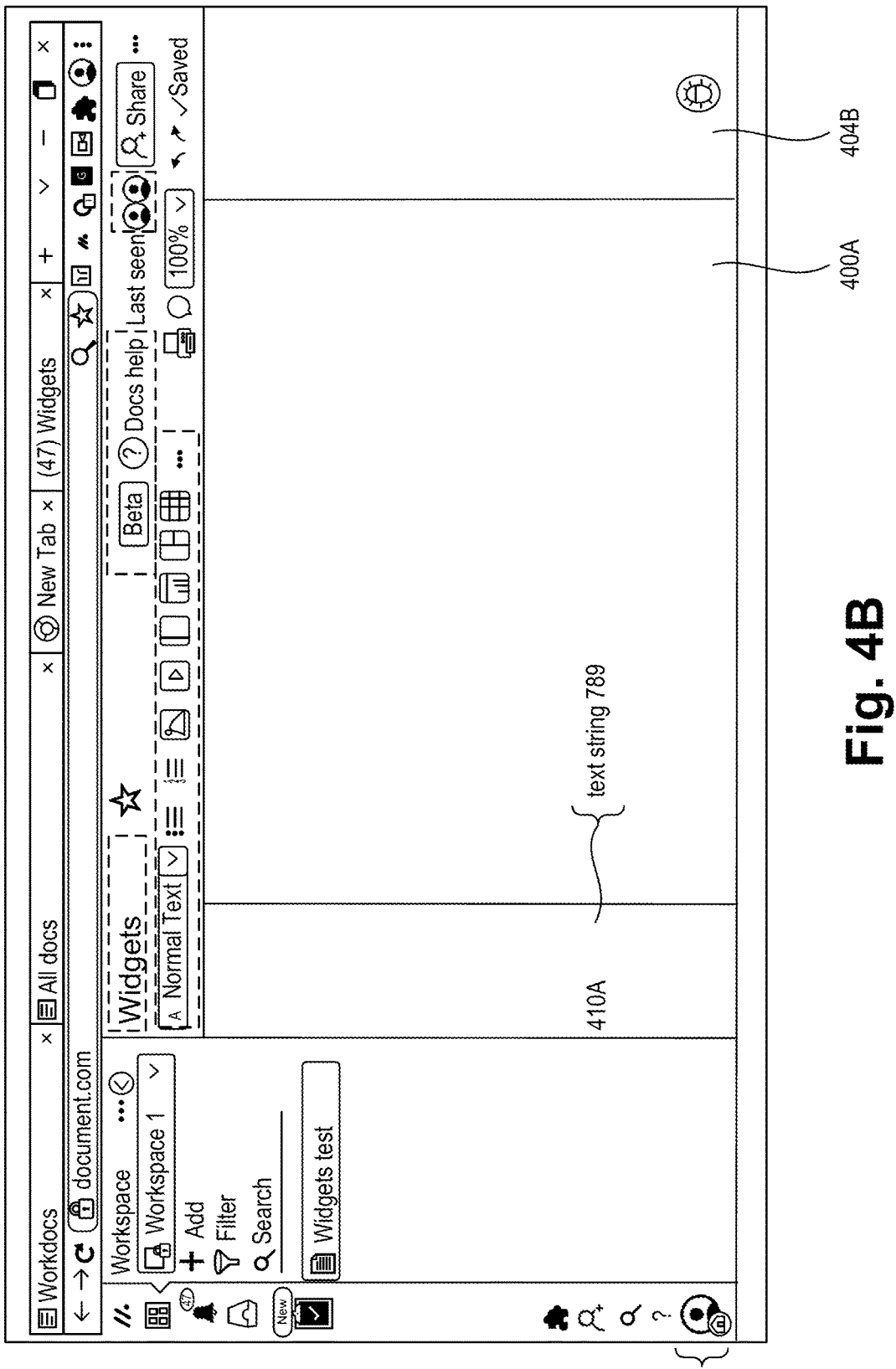
FIG. 4B illustrates another example of a shared electronic document with defined granular permissions, consistent with some embodiments of the present disclosure.

By way of example, FIGS. 4A and 4B illustrate examples of a shared electronic document with granular permissions. Referring to FIG. 4A, the shared electronic document 400A may be a collaborative electronic word processing document. The document 400A may include an indication of an entity 402A accessing the document via an editing interface 404A. The indicator 406A may indicate to an accessing entity, such as entity 402A, all of the entities accessing the shared electronic document at that time, or at any other time (e.g., the indicator may display a last accessed time stamp for a particular entity). The document 400A may further include a first section 408A (e.g., a first block) and a second section 410A (e.g., a second block), each of which may include information such as a single string or multiple strings of text. The first section 408A and the second section 410A may, by way of example, have associated granular permissions authorizing entity 402A to view, or view and edit, the content associated with both the first and second sections.

Referring now to FIG. 4B, the shared electronic document 400A may be accessed by a second entity 402B via an editing interface 404B. The first section 408A (shown in FIG. 4A) and the second section 410A may, for example, have associated granular permissions that do not authorize entity 402B to view or otherwise access the content associated with the first section 408A, but do authorize entity 402B to view, or view and edit, the content associated with the section 410A. As a result, the second entity 402B may be presented with an alternative display of electronic document 400A with less information than in a display of the same electronic document 400A to entity 402A in FIG. 4A.

Some aspects of this disclosure may include enabling access to an electronic word processing document including blocks of text. An electronic word processing document may include any digital file that may provide for input, editing, formatting, display, and output of text (e.g., alphanumerics) and other content, such as graphics, widgets, objects, tables, links, animations, dynamically updated elements, or any other data object that may be used in conjunction with the digital file. An electronic word processing document may be a collaborative document or a non-collaborative document, as previously described with reference to shared electronic documents. Enabling access to the electronic work processing document, as used herein, may refer to one or more of providing authorization for retrieving information contained in the electronic work processing document that may be stored in a repository so that the information may be transmitted, manipulated, and/or displayed on a hardware device. The system may, for example, be configured to enable access to an electronic word processing document when an entity requests permission to retrieve information in the electronic word processing document. Accessing an electronic word processing document may include retrieving the electronic word processing document from a storage medium, such as a local storage medium or a remote storage medium. A local storage medium may be maintained, for example, on a local computing device, on a local network, or on a resource such as a server within or connected to a local network. A remote storage medium may be maintained in the cloud, or at any other location other than a local network. In some embodiments, accessing the electronic word processing document may include retrieving the electronic word processing document from a web browser cache. Additionally or alternatively, accessing the electronic word processing document may include accessing a live data stream of the electronic word processing document from a remote source. In some embodiments, accessing the electronic word processing document may include logging into an account having a permission to access the document. For example, accessing the electronic word processing document may be achieved by interacting with an indication associated with the electronic word processing document, such as an icon or file name, which may cause the system to retrieve (e.g., from a storage medium) a particular electronic word processing document associated with the indication.

As used herein, blocks of text may refer to any organizational unit of text or any other information that may be included in an electronic word processing document. For example, blocks of text may contain one or more of a single letter, number, or symbol; a combination of letters, numbers, or symbols; a sentence; multiple sentences; a paragraph; multiple paragraphs; or any other combination of characters grouped together. Blocks of text may include static or dynamic text and may be linked to other sources of data for dynamic updates. Blocks of text may be manually defined by an entity according to preference or may be automatically defined by the system. The entity may, for example, select any text and assign it as a single block of text. Alternatively, the system may, for example, define block of text as text separated by a carriage return, text separated by a space, text in a text box, text in a column, or text grouped together in any other manner. Blocks of text may further be configured to enable an entity to alter the order in which the blocks of text appear on a document. As used herein, an associated address of a block of text may refer to any identifier associated with a specific block of text that identifies a specific memory location, such as in a repository. In some exemplary embodiments, the associated address may be, for example, a fixed-length sequence of digits displayed and manipulated as unsigned integers that enables the system to store information associated with a block of text at a particular location designated by the associated address. In some embodiments, each address may include at least one of a block-associated tag, block-associated metadata, or a block-associated location. A block-associated tag, as used herein, may refer to a keyword, symbol, or term assigned to one or more blocks of text, or any other classification designation. For example, a block-associated tag may include words, images, or any other identifying marks. In some embodiments, a block-associated tag may be assigned manually by an entity or may be chosen from a controlled vocabulary. In other embodiments, a block-associated tag may be assigned by the system upon contextual determination of the information contained in a particular block. For example, if a block of text contains information regarding the name of a sports team, the system may automatically determine that the information in the block contains sports information and associate a block-associated tag with that block that indicates the block is related to sports information. Block-associated metadata, as used herein, may refer to any data providing information about one of more blocks of text. For example, block-associated metadata may include descriptive metadata, structural metadata, administrative metadata, reference metadata, statistical metadata, legal metadata, or a combination thereof. For example, a block may have associated metadata to indicate an author of the information in that block. As a result, that block may have block-associated metadata that is associated with that block to record an identification for that author. Block-associated location, as used herein, may refer to location based data associated with a particular block. The location based data may be based on data contained in the specific block itself (e.g., the block contains text indicating an address in Switzerland), or the block may store location information based on the location of the author of the block (e.g., a document author generates a block of text from their computing device based in Canada, resulting in a block-associated location of Canada with that block). Each address may include any combination of the block-associated tags, metadata, and locations such that when a computing device accessing information in a block at a particular address, the computing device may also access the associated tags, metadata, and location associated data with that block.

Figure 5:
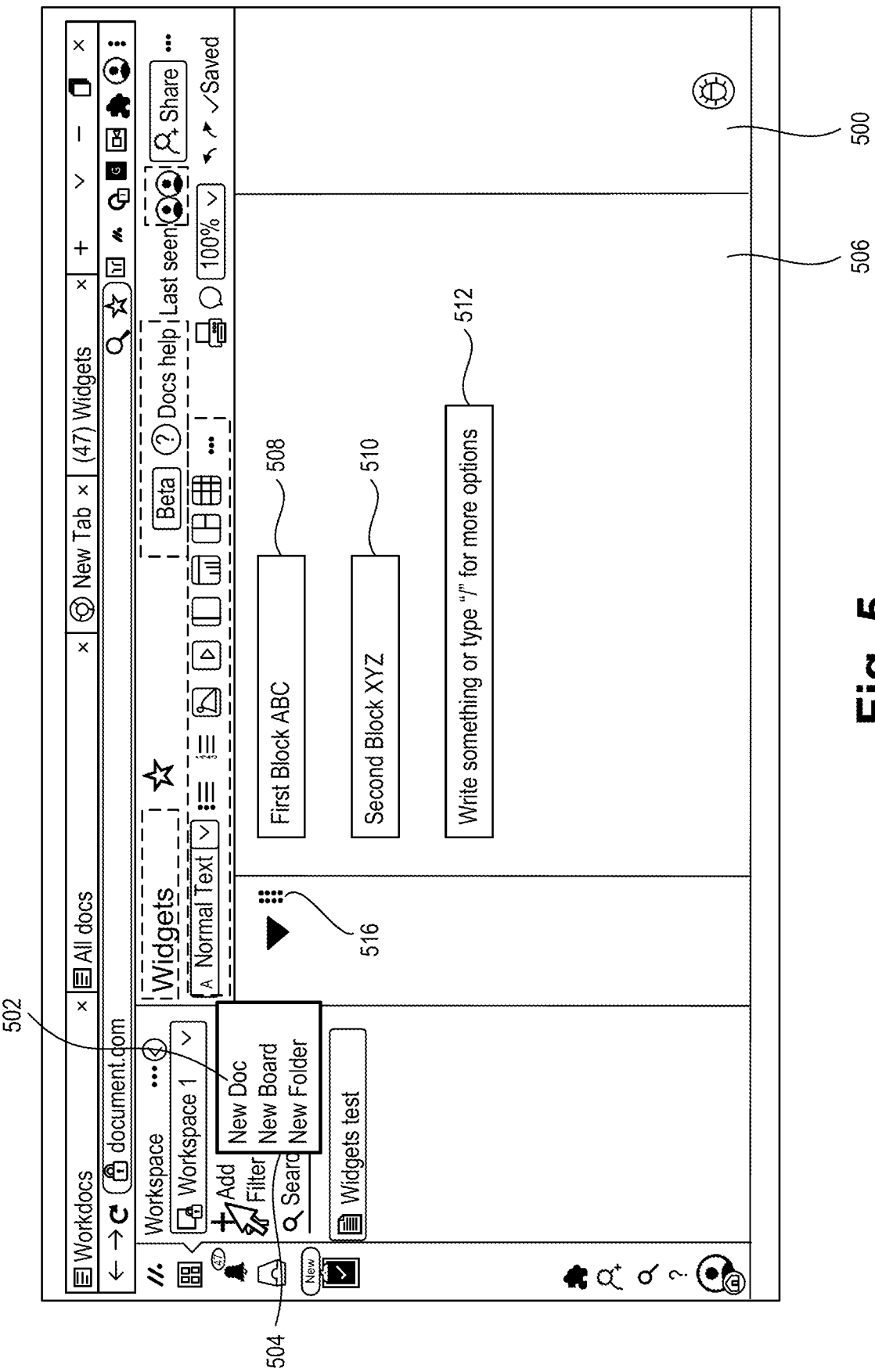
FIG. 5 illustrates an example of an electronic word processing document including blocks of text, consistent with some embodiments of the present disclosure.

By way of example, FIG. 5 illustrates an example of an electronic word processing document including blocks of text. The system may, for example, enable access to an electronic word processing document by generating the document in response to an entity selecting, via the editing interface 500, the "New Doc" button 502 in pop-out menu 504. The generation of the electronic word processing document may be achieved by an application running on a computing device (e.g., the computing device 100 in FIG. 1 and FIG. 2). The application may generate the document for rendering on a display of a user device (e.g., the user device 220-1, 220-2, or 220-m in FIG. 2).

As shown in FIG. 5, the electronic word processing document 506 may include blocks of text 508 to 512. The blocks 508 and 510 include the text "First Block ABC" and "Second Block XYZ," respectively. The new or input block 512 has no text added yet and prompts an entity to "Write something or type "/" for more options." A new block of text may be generated, for example, in response to an entity selecting an unoccupied area of the document 506; entering a line break by, for example, clicking "enter" on a computer keyboard; or combining existing blocks of text 508 to 512. An entity, with proper permissions, may edit the arrangement order in which the blocks of text appear on the document 506 by, for example, clicking and dragging the drag button 516, which may appear near a selected block of text.

Some disclosed embodiments may further include accessing at least one data structure containing block-based permissions for each block of text, and wherein the permissions include at least one permission to view an associated block of text. Block-based permissions, as used herein, may refer to any attribute or setting associated with one or more blocks of text that defines how an entity or entities may interact with the content of the block or blocks of text. Such interactions may involve viewing, editing, navigating, executing, or any other user task involving the content of the block or blocks of text. The content of a block may include, for example, one or more of text, audio, graphics, icons, tables, charts, widgets, links, or any other item, whether static or dynamic, contained in each block of text, or any other information that may be associated with each block of text (e.g., metadata).

Consistent with the present disclosure, a data structure may include any repository storing a collection of data values and relationships among them. For example, the data structure may store information on one or more of a server, local memory, or any other repository suitable for storing any of the data that may be associated with block-based permissions or any other data items. The data structure may contain permissions for each block of text or alternatively, may contain permissions associated with a range of blocks of text. For example, the first three blocks of text may have the same permissions and the next three blocks of text may have the same permissions. In addition, the data structure may contain one or more of the associated address, the block-associated tag, the block-associated metadata, the block-associated location, or any other information related to the block-based permissions for each block of text. Accessing the data structure may include receiving a request to retrieve information contained in the data structure, which may store the information relative to permission settings for each block of text in an electronic document. The data structure may contain information relating to permission settings for one or more blocks associated with an electronic document such that the system may only need to perform a single look-up for the permissions that a user has for accessing any of the blocks of information associated with one or more electronic documents. For example, information in a data structure may be stored in the form of a storage medium, such as a local storage medium or a remote storage medium, as discussed previously above. A local storage medium may be maintained, for example, on a local computing device, on a local network, or on a resource such as a server within or connected to a local network. A remote storage medium may be maintained in the cloud, or at any other location other than a local network. In some embodiments, accessing the data structure may include retrieving the data or information from a web browser cache. Additionally or alternatively, accessing the information may include accessing a live data stream of the data from a remote source. In some embodiments, accessing the data structure may include logging into an account having a permission to access information located in an electronic word processing document. For example, accessing the electronic word processing document in a data structure may be achieved by interacting with an indication associated with the electronic word processing document, such as an icon or file name, which may cause the system to retrieve (e.g., from a storage medium) a particular electronic word processing document associated with the indication.

Permission to view, as used herein, may refer to providing authority to one or more entities to retrieve or inspect the information in an associated block of text. A block of text may have one or more permission settings to view the information contained in the block according to different types of users, or specific users. In exemplary embodiments, the permission to view information may be a default permission for one or more blocks of text. A default permission may refer to a permission or permissions automatically assigned to one or more blocks of text by the system when it enables access to the document, such as in response to an entity requesting generation of a new document, as previously described. For example, a default permission may only allow document authors permission to view one or more blocks of text. In other exemplary embodiments, one or more entities, such as document authors or other entities, may define a block-based permission to provide one or more entities permission to view one or more blocks of text. For example, the system may receive, from the document author, a selection of one or more blocks and an instruction to associate or assign at least one permission with the selected blocks authorizing one or more entities to view the blocks of text. Each block may have multiple permission settings enabling different entities to access different amounts of information in each block.

Figure 6:
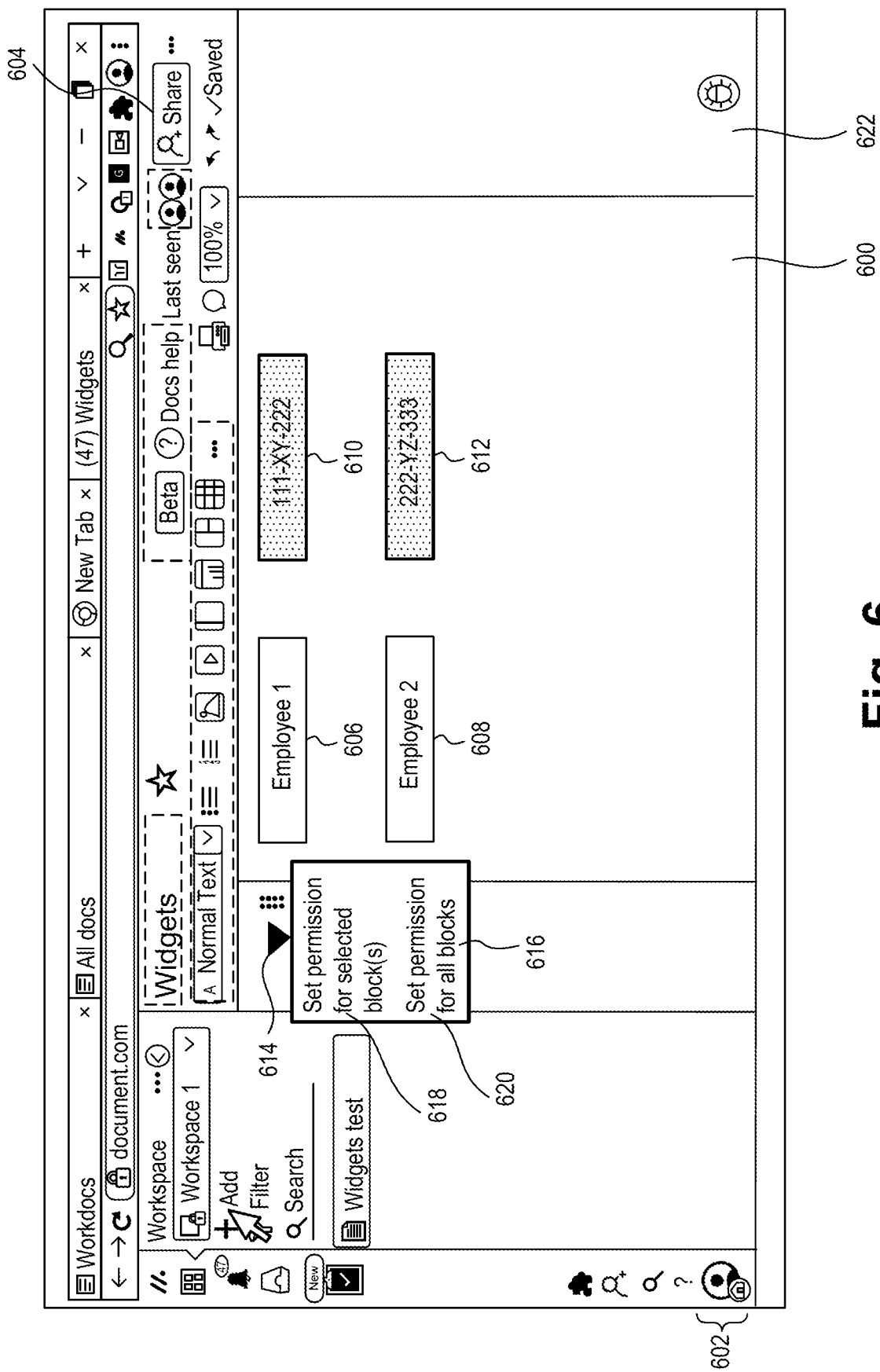
FIG. 6 illustrates one example of an electronic word processing document including blocks of text having associated block-based permissions, consistent with some embodiments of the present disclosure.

FIG. 6 illustrates one example of an electronic word processing document including blocks of text having associated block-based permissions. The electronic word processing document 600 may be a non-collaborative document, such that entity 602 may be the only entity that may edit the document contents. Entity 602 may, however, share the non-collaborative document 600 with other entities (e.g., end-users or an audience) view, edit, or otherwise access the document. For example, entity 602 may select the "share" button 604 and send an email or link to other entities inviting them to view, edit, or access the document.

Referring to FIG. 6, the electronic word processing document 600 may further include blocks of text 606 to 612. Each block of text 606 to 612 may or may not have default block-based permissions. In some embodiments, default block-based permissions may allow any entity to whom the document 600 is shared to view blocks of text 606 to 612. In other embodiments, default block-based permissions may, for example, prohibit or limit any entity to whom the document 600 is shared to view blocks of text 606 to 612.

Referring again to FIG. 6, entity 602 may select each block of text (or select multiple blocks at once) and define or alter the default block-based permissions associated with each block of text. For example, blocks of text 610 and 612 may include the social security numbers "111-XY-222" and "222-YZ-333" respectively. Entity 602 may set block-based permissions associated with these blocks to allow only team members in a human resources department to view these blocks, whereas all team members may have permission to view blocks 606 and 608. The block-based permissions for each block of text 606 to 612 may be contained in at least one data structure (e.g., in storage 130, repository 230-1, repository 230-n of FIGS. 1 and 2) associated with the electronic word processing document 600. Entity 602 may subsequently share the electronic word processing document with several team members, some of which may be team members in the human resources department. If a team member is not in the human resources department, blocks of text 610 and 612 may not be rendered on the display (e.g., omitted from display or redacted) associated with the team member. However, if the team member is in the human resources department, each block of text, including blocks 610 and 612 may be rendered on the display associated with the team member.

In some embodiments, at least one data structure may be configured to maintain identities of document authors, and the document authors may be enabled to define block permissions. As used herein, document authors may refer to any originator or owner of an electronic word processing document. If the document is a non-collaborative document, the document author may refer to a single entity who generates, drafts, writes, produces, revises, or edits the document in any other manner. Alternatively, if the document is a collaborative document, document authors may refer to the entity or entities responsible for initially creating the document or the entity or entities who maintain ownership of the document. As used herein, maintain identities of document authors may refer to storing information related with the document authors in a data structure associated with the document. The stored information may include any unique identifier capable of distinguishing among document authors and other entities with access to the document. For example, the unique identifier may be an author token, a session ID, a username, an IP address associated with a document authors device, or any other information capable of distinguishing among document authors and other entities with access to the document. Enabled to define block permissions, as used herein, may refer to authorizing document authors to set, describe, establish, designate, alter, or otherwise give meaning to block-based permissions associated with each block of text. Defining block permissions may involve, for example, selecting one or more blocks of text and then selecting among various permissions or describing the permission or permissions to apply to one or more entities. In some embodiments, the at least one processor may perform a lookup in the data structure containing the identities of document authors to determine whether an entity seeking to define a block-based permission is a document author, and based on the lookup, either allow or prohibit the entity to define the block-based permission.

For example, referring again to the electronic word processing document 600 illustrated in FIG. 6, the entity 602 accessing the document 600 via an editing interface 622 may or may not be a document author. The at least one processor may perform a lookup in a data structure (e.g., in storage 130, repository 230-1, repository 230-n of FIGS. 1 and 2) containing unique identifiers for all document authors of the electronic word processing document 600. If the at least one processor determines that the entity 602 accessing the document via the editing interface 622 is not a document author, the drop-down menu 616 may display disabled (i.e., greyed out) menu items "Set Permission(s) for Selected Block(s)" 618 and "Set Permissions for All Blocks" 620 or may omit both menu items from the drop-down menu 616. Alternatively, if the at least one processor determines that the entity 602 accessing the document via the editing interface 622 is a document author, the editing interface 622 may display an interface component enabling the entity 602 to define block permissions. For example, the entity 602 may select the menu arrow 614 to open drop-down menu 616, which may contain the menu items "Set Permission(s) for Selected Block(s)" 618 and "Set Permissions for All Blocks" 620. Selecting block 606, block 608, and menu item 618 may, for example, open a new interface, enabling the document author to configure the permissions associated with blocks 606 and 608 for one or more entities.

Figure 7:
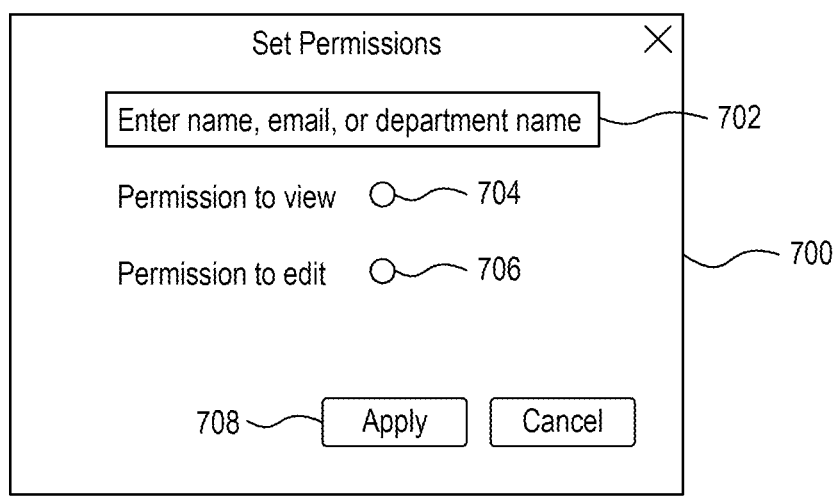
FIG. 7 illustrates one example of an interface for defining block-based permissions for an electronic word processing document, consistent with some embodiments of the present disclosure.

By way of example, FIG. 7 illustrates one example of an interface 700 for defining block-based permissions for block 606 in FIG. 6. The interface 700 may include an input box 702 in which entity 602 (from FIG. 6) may input, for example, a name, email, or department name. For example, entity 602 may input "Entity XYZ" into input box 702. In response to the system receiving a valid entry, the interface 700 may display radio buttons 704 and 706, corresponding to a permission to view and a permission to edit, respectively. Entity 602 may select or deselect either radio button 704 and 706 (in this exemplary embodiment, the entity cannot select both because permission to edit implicitly includes permission to view) and select an apply button 708 to activate the defined permission associated with blocks 606 and 608 (in FIG. 6) for "Entity XYZ."

In some embodiments, an electronic word processing document may be a collaborative document and at least one processor may be configured to receive an added block from an editing entity and to enable the editing entity to set block permissions for an added block. An editing entity, as used herein, may refer to any account or computing device associated with one or more users with permission to select, revise, organize, arrange, rearrange, change, add, or otherwise modify the content of one or more blocks. An entity may refer to an individual, a device, a team, an organization, a group, a department, a division, a subsidiary, a company, a contractor, an agent or representative, or any other thing with independent and distinct existence. An editing entity may include one or more document authors of a collaborative document or one or more entities with permission to simultaneously edit one or more blocks of a collaborative document. An added block, as used herein, may refer to any addition of information in a segment or block newly generated by an editing entity. In some embodiments, an editing entity may insert an added block by selecting an unoccupied area of the collaborative document or by selecting a user interface item to input a new block (e.g., new block icon). In other exemplary embodiments, the editing entity may insert an added block by generating a line break by, for example, clicking "enter" on a computer keyboard coupled to the entity's user device; by pasting copied content from other documents in the collaborative document; or by dragging and dropping content from other documents into the collaborative document, permitting the editing entity to set block permissions for the added block, as used herein, may refer to authorizing any editing entity beyond the document author to configure, assign, describe, establish, designate, alter, or otherwise give meaning to the block permissions associated with the added block in an electronic document owned by the document author. Setting block permissions for the added block may involve selecting the added block of text and then selecting among various permissions or describing the permission or permissions to apply to one or more entities. In some embodiments, the at least one processor may be configured to permit the editing entity to set a permission blocking an author of the document from viewing the added block. Blocking an author of the document from viewing the added block, as used herein, may refer to prohibiting or limiting a document author from examining, observing, reading, looking, inspecting, or otherwise accessing any information contained in a block added by an editing entity. For example, a document author may be collaborating with a second entity on an electronic document (e.g., a collaborating entity who is not an author of the electronic document). While a document author may typically be able to access all information inserted by the second entity to the electronic document, the second entity may have the option to prevent or limit the document author's ability to view information in a block added by the second entity for any number of reasons (e.g., the second entity is still inserting a draft of the information in the block and may not wish to make it available to all collaborators on the document).

Figure 8:
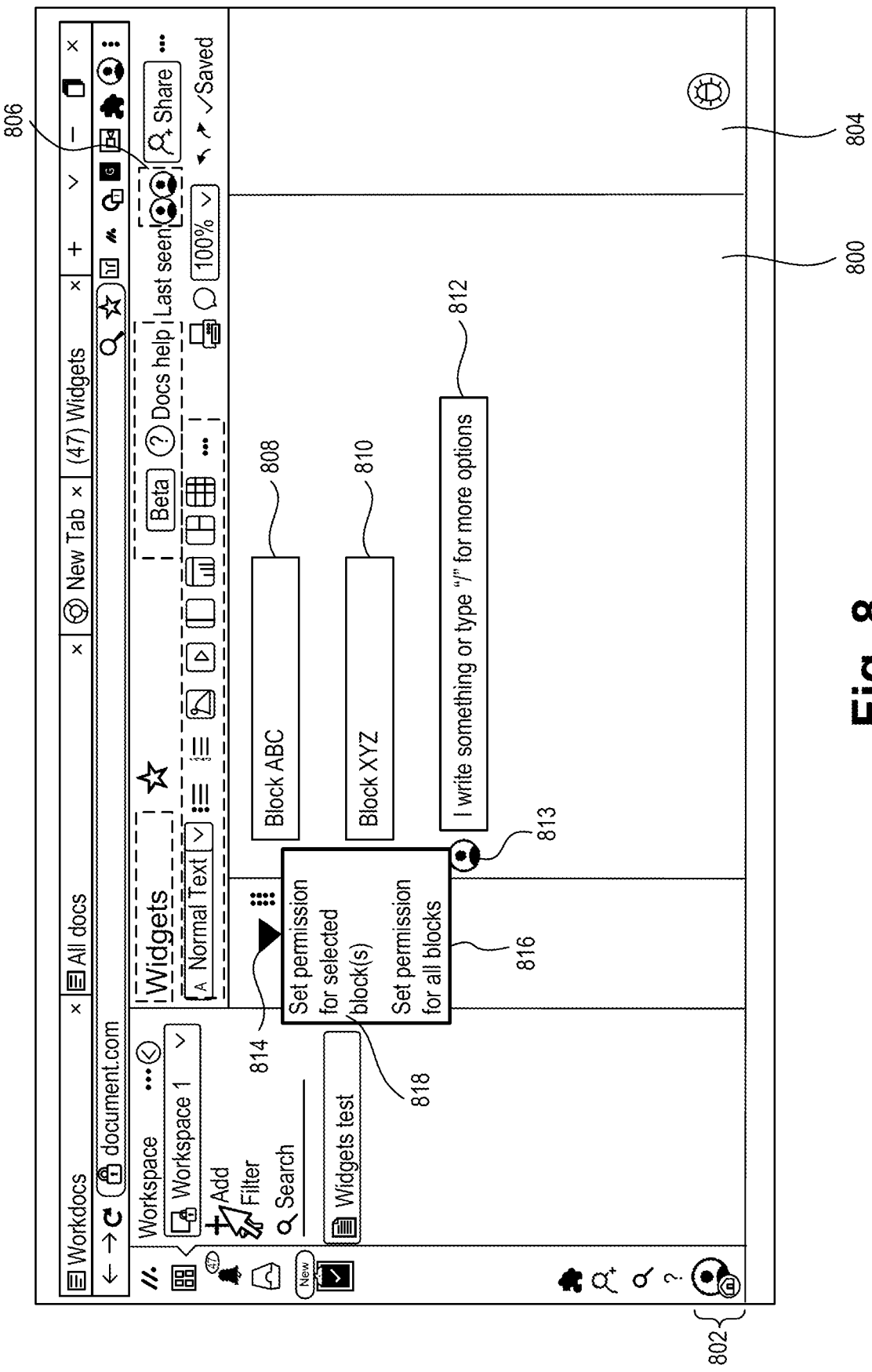
FIG. 8 illustrates one example of an electronic word processing document containing blocks and configured as a collaborative document, consistent with some embodiments of the present disclosure.

By way of example, FIG. 8 illustrates an exemplary electronic word processing document that may be configured as a collaborative document containing blocks. The collaborative document 800 may include an indication of an editing entity 802 accessing the document via an editing interface 804. The editing entity 802 may or may not be a document author. The indicator 806 may indicate to the entity 802 that other entities are currently accessing the document, some of which may be document authors or other entities that have permission to simultaneously edit the blocks, create additional blocks, or both. The collaborative document 800 may further include blocks 808 to 812. Blocks 808 and 810 may be previously entered blocks. Editing entity 802 may have recently created added block 812 by, for example, selecting the area of the document now occupied by added block 812. The editing entity 812 may enter any organizational unit of information, such as a symbol, letter, word, sentence, paragraph, page, graphic, or any combination thereof, in the added block 812. As editing entity 812 inputs or alters the content of added block 812, the system may render an indicator 813 (e.g., a graphical indicator, alphanumeric text, or a combination thereof) next to the block to indicate to other entities currently accessing the collaborative document 800 that editing entity 802 is responsible for inputting or altering the content. The editing entity 812 may select the added block 812 and select the menu arrow 814 to open a drop-down menu 816, which may contain menu item "Set Permission(s) for Selected Block(s)" 818. Selecting menu item 818 may, for example, open an interface enabling the editing entity to configure the permissions for one or more entities, which may or may not include document authors. For example, the interface may be the interface 700 for defining block-based permissions in FIG. 7, as discussed previously above.

In some embodiments, an electronic word processing document may include graphical objects, and block-based permissions may include restrictions on viewing the graphical objects. As used herein, graphical objects may refer to a rendering of one more visual representations of information that may or may not include alphanumerics. For example, graphical objects may include charts, graphs, shapes, images, photographs, pictures, symbols, icons, or any other representation that may be displayed, or a combination thereof. Graphical objects may be two-dimensional or three-dimensional and may be static or dynamic. Restrictions on viewing, as used herein, may refer to prohibiting or limiting one or more entities from examining, observing, reading, looking, inspecting, or accessing graphical objects contained in one or more blocks. In some exemplary embodiments, the restrictions on viewing may be a default permission for one or more blocks containing graphical objects. In other exemplary embodiments, one or more entities may define a block-based permission to restrict one or more entities from viewing graphical objects in one or more blocks of text.

Figure 9:
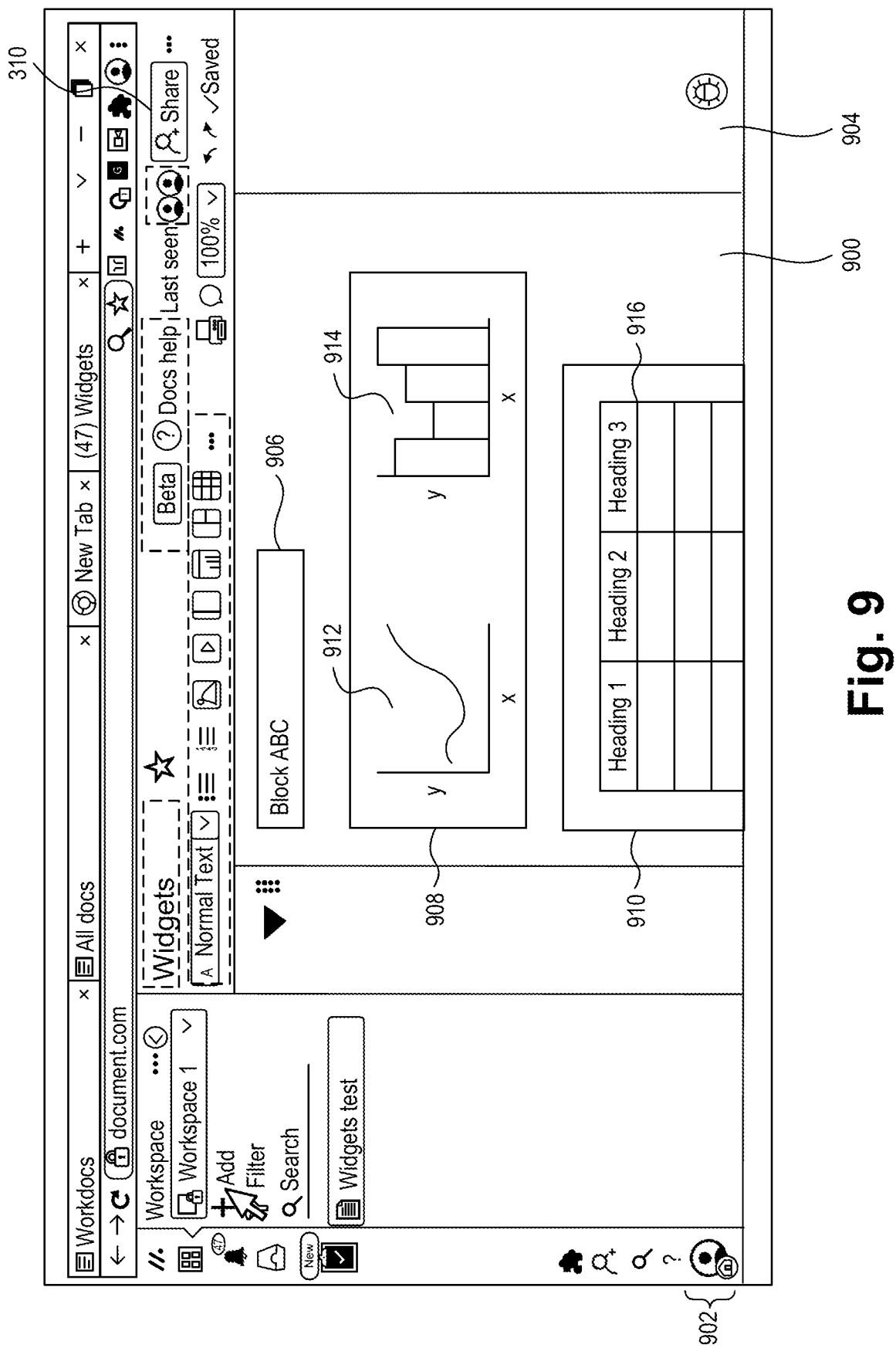
FIG. 9 illustrates one example of an electronic word processing document including graphical objects, consistent with some embodiments of the present disclosure.

By way of example, FIG. 9 illustrates an electronic word processing document including graphical objects. The electronic word processing document 900 may include an indication of an entity 902 accessing the document via an editing interface 904. Entity 902 may or may not be a document author of the document 900. The document 900 may include blocks 906 to 910. Block 906 may include text, such as "Block ABC." Blocks 908 and 910 may include one or more graphical objects. For example, block 908 may include line graph 912 and bar chart 914, and block 910 may include table 916. The block-based permissions for blocks 906 to 910 may restrict specific entities from viewing one or more blocks. For example, the permissions may restrict all entities other than the document author, entity 902, from viewing block 910, which includes the table 916. The block-based permissions may apply to entities based on the type of block (e.g., restrictions may be applied only to blocks containing only graphical objects or only text objects), or based on any particular selection of blocks.

Aspects of the disclosure may include receiving from an entity a request to access an electronic word processing document. As used herein, an entity may refer to an individual, a device, a team, an organization, a group, a department, a division, a subsidiary, a company, a contractor, an agent or representative, or any other thing with independent and distinct existence, as discussed above. A request to access, as used herein, may refer to a signal containing instructions to a gain authorization or entry to download, upload, copy, extract, update, edit, view, or otherwise receive or manipulate data or information associated with the electronic word processing document. The request to access may be in one or more digital, electronic, or photonic signals that may be generated in the form of a voice command, gesture, touch, tap, swipe, cursor selection, cursor scrolling, or a combination thereof from a computing device associated with an entity (e.g., a document author or a collaborating editor). For example, the entity may request to access the electronic word processing document by attempting to open an instance of the document via a web application. Alternatively, the entity may request to access the electronic word processing document by entering authentication or credential information, such as a username and password. In another exemplary embodiment, the entity may request to access the word processing document by accessing a link associated with the document.

For example, referring again to the electronic word processing document illustrated in FIG. 6, the entity 602 accessing the document 600 via an editing interface 622 may share the document 600 with a second entity. For example, entity 602 may select the "Share" button 604, which may cause a new interface to be displayed enabling entity 602 to enter the second entity's email address to which an email with a link to access the document 600 will be delivered to the second entity. The system may receive a request to access the document 600 when, for example, the second entity selects the link.

Some disclosed embodiments may include performing a lookup in at least one data structure to determine that an entity lacks permission to view at least one specific block within an electronic word processing document. Performing a lookup, as used herein, may refer to an action, process, or instance of retrieving or searching in the at least on data structure containing block-based permissions. In some embodiments, the at least one processor may automatically perform a lookup in a remote repository in response to receiving a request from an entity to access an electronic word processing document. For example, performing a lookup may involve retrieving an address associated with a specific block in an electronic word processing document, where the address may include an access point for a data structure containing data and information relating to the specific block and the electronic word processing document. The system may then compare an entity identification (e.g., an account name, an IP address, or any other identifier) to a list of pre-authorized entities in the data structure to determine whether there is a match. The system may perform the lookup and determine a match between an entity identification with one of the pre-authorized entities in the data structure and determine that the entity has partial or full authorization to retrieve, view, and/or access the information associated with the specific block. In other embodiments, the data structure may contain a list of unauthorized entities such that when the system performs a lookup and determines that an accessing entity matches one of the unauthorized entities in the list, the system may reduce or completely restrict access to the information associated with the specific block. An entity lacking permission to view, as used herein, may refer to an entity without authority to retrieve or inspect the information in an associated block of text. For example, the at least one data structure may contain a list of usernames corresponding to entities, including the document author or authors, that may be authorized to view information in a specific block. The system may perform a lookup in the at least one data structure to determine whether the username associated with entity accessing the electronic word processing document is included in the list of usernames. If the system determines, based on the lookup, that that the username associated with the accessing entity is not included in the list of authorized entities, the system may determine that the accessing entity lacks authority to view the specific block. In some embodiments, an absence of a recorded permission in the at least one data structure for a particular block may constitute an unrestricted permission for the particular block. Absence of a recorded permission, as used herein, may refer to the nonexistence or lack of a permission setting in the at least one data structure for a particular block. A recorded permission for a particular block may be absent for one or more entities. For example, the at least one data structure may have a recorded permission for one entity to view or edit a particular block of text but lack a recorded permission associated with the particular block for other entities. Alternatively, the at least one data structure may, for example, lack a recorded permission for all entities. Unrestricted permission for the particular block, as used herein, may refer to authorization to interact with and access the content of the block in any manner without any limitations. For example, unrestricted permission for the particular block may allow any entity accessing a document to view, edit, navigate, execute, or perform any other task involving the content of the particular block.

Some disclosed embodiments may further include causing to be rendered on a display associated with an entity, an electronic word processing document with the at least one specific block omitted from the display. Causing to be rendered on a display associated with the entity, as used herein, may include providing the electronic word processing document to the entity by outputting one or more signals configured to result in the presentation of the electronic word processing document on a screen, other surface, through a projection, or in a virtual space associated with the entity. This may occur, for example, on one or more of a touchscreen, a monitor, AR or VR display, or any other means previously discussed and discussed further below. The electronic word processing document may be presented, for example, via a display screen associated with the entity's computing device, such as a PC, laptop, tablet, projector, cell phone, or personal wearable device. The electronic word processing document may also be presented virtually through AR or VR glasses, or through a holographic display. Other mechanisms of presenting may also be used to enable the entity to visually comprehend the presented information. The electronic word processing document may appear as a new window, as a pop-up, or in other manner for presenting the document on a display associated with the entity. Omitting from the display, as used herein, may refer to leaving out, excluding, redacting, obscuring, or reducing information in at least one block from the display of the electronic word processing document. For example, the at least one processor may omit a block from the display if the at least one data structure contains a block-based permission not authorizing the entity to view one or more blocks of the electronic word processing document. In some embodiments, one or more display signals for the omitted block will not be transmitted to the display associated with the user. In other instances, the one or more display signals may be altered to redact or blur the omitted block.

Figure 10A:
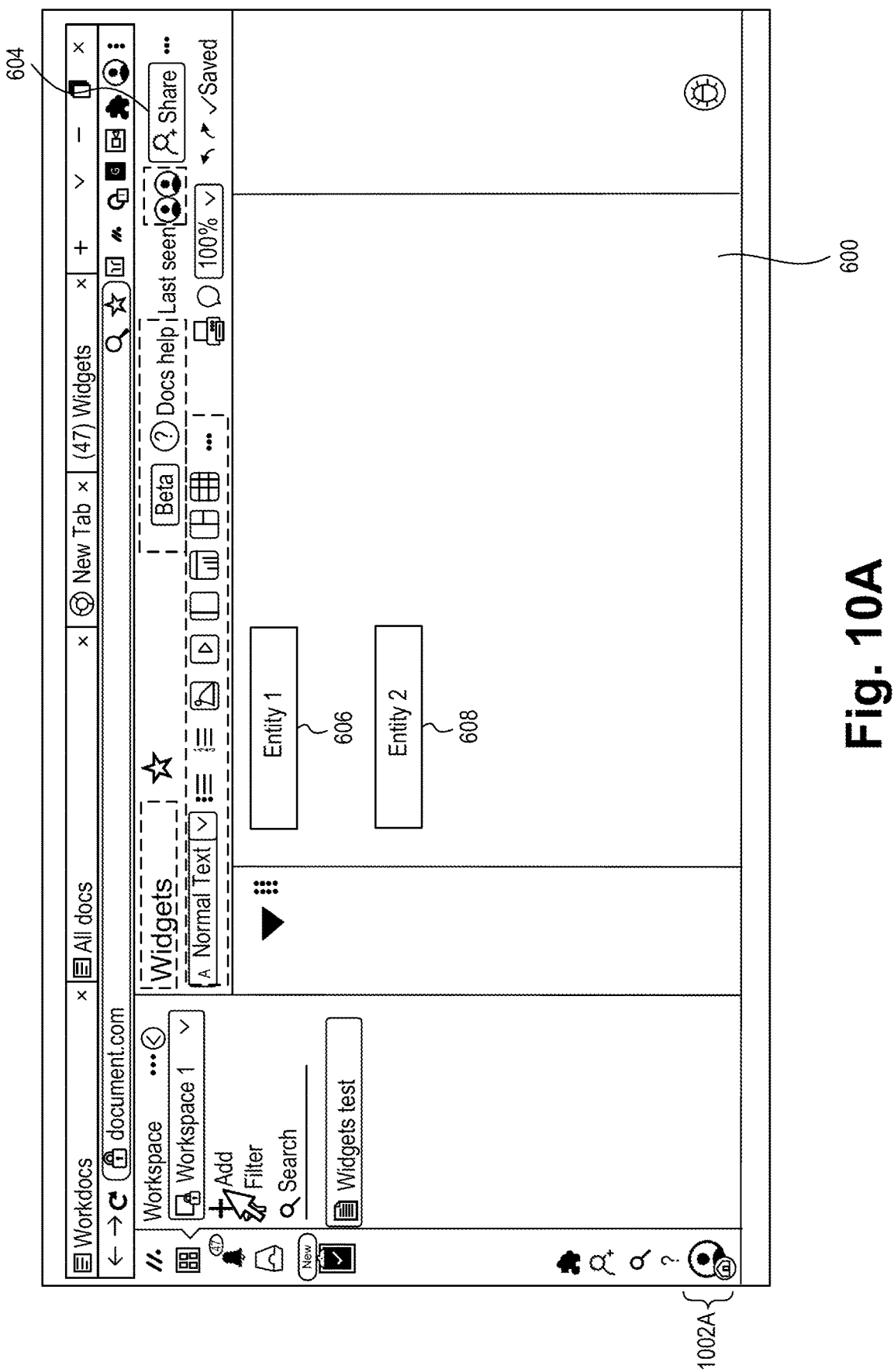
FIG. 10A illustrates an example of an electronic word processing document with one or more blocks of text omitted from the display associated with an entity, consistent with some embodiments of the present disclosure.
Figure 10B:
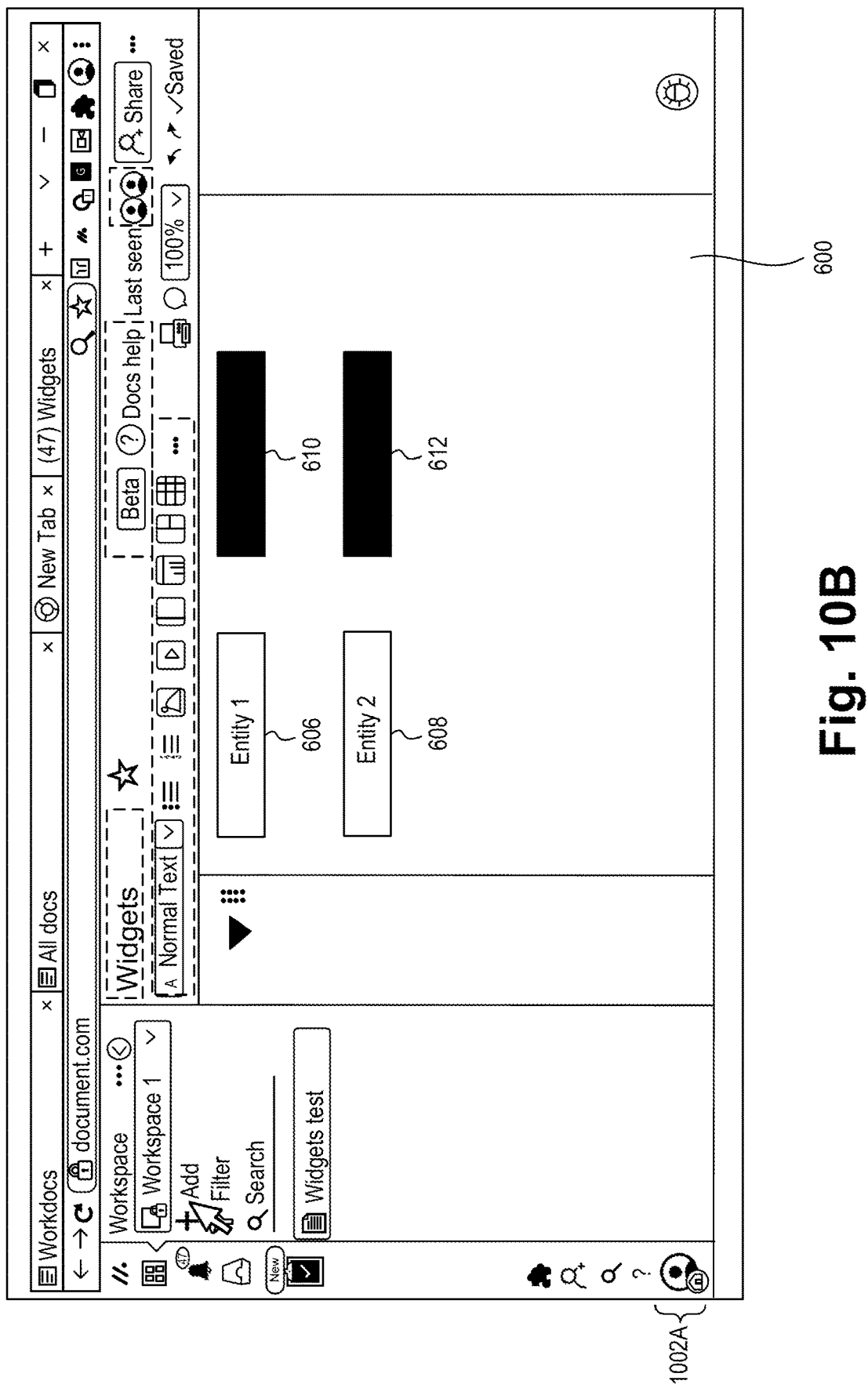
FIG. 10B illustrates another example of an electronic word processing document with one or more blocks of text omitted from the display associated with an entity, consistent with some embodiments of the present disclosure.
Figure 10C:
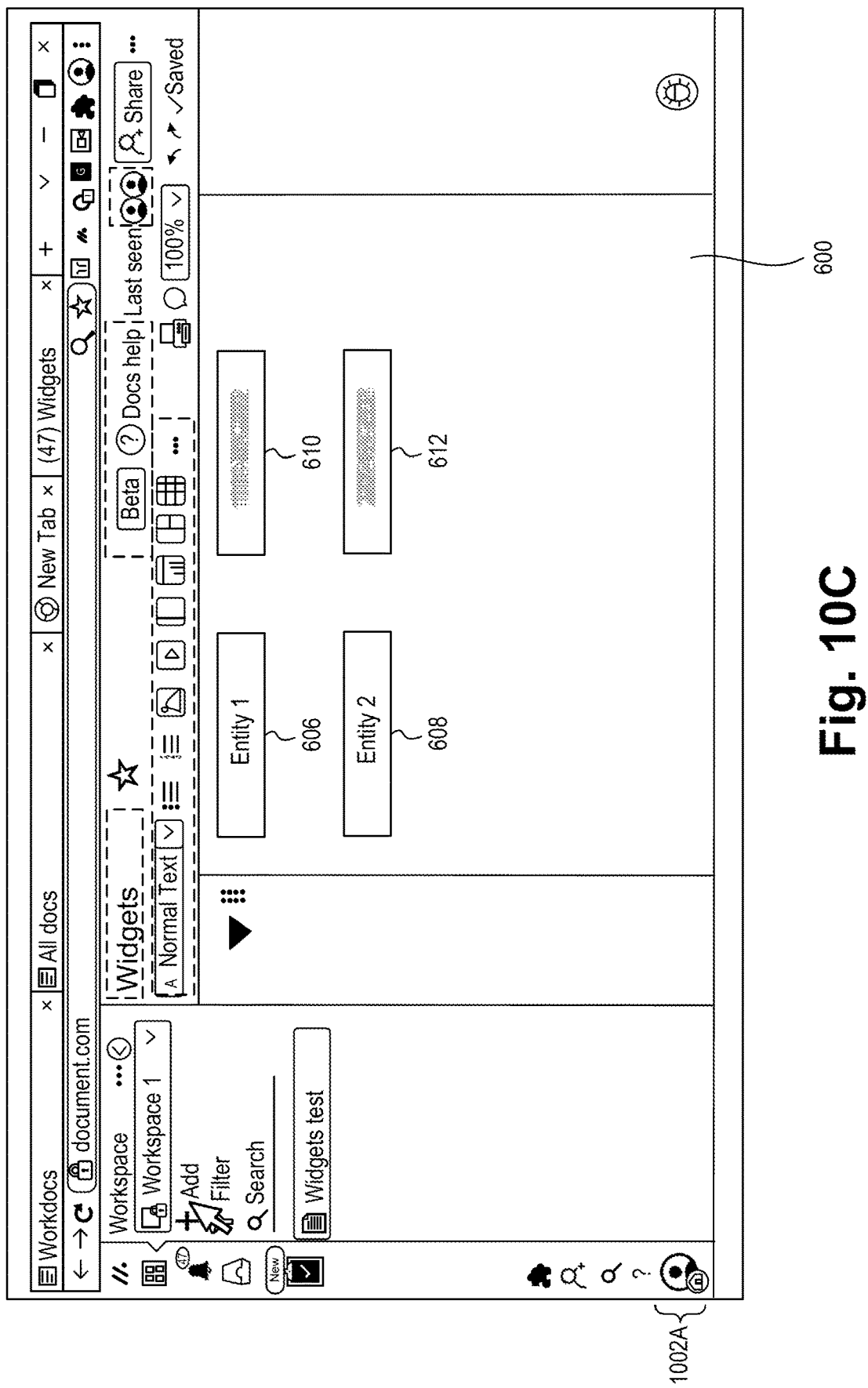
FIG. 10C illustrates another example of an electronic word processing document with one or more blocks of text omitted from the display associated with an entity, consistent with some embodiments of the present disclosure.

For example, referring again to the electronic word processing document illustrated in FIG. 6, the entity 602 may define block-based permissions for blocks of text 610 and 612. The block-based permissions may, for example, allow only team members in a human resources department to view blocks 610 and 612. Entity 602 may subsequently share the electronic word processing document with several team members, which may or may not be in the human resources department. By way of example, FIGS. 10A to 10C illustrate examples of the electronic word processing document 600 illustrated in FIG. 6 with one or more blocks of text omitted from the display associated with team member 1002A not in the human resources department. Referring to FIG. 10A, blocks 610 and 612 (shown in FIG. 6) may be absent from the display associated with entity 1002A. Alternatively, as shown in FIG. 10B, the blocks 610 and 612 may be redacted from the display associated with entity 1002A. In another example, as shown in FIG. 10C, the blocks 610 and 612 may be blurred from the display associated with entity 1002A.

In some embodiments, a data structure may include separate permissions for viewing and editing. Separate permissions, as used herein, may refer to distinct attributes or settings that define how an entity or entities may interact with the content of the block or blocks of text. Such interactions may involve viewing and editing content in an electronic document. Permissions for viewing may refer to any attribute or setting associated with a block of text that authorizes one or more entities to examine, observe, read, look, inspect, or otherwise see the content of the associated block of text. Permissions for editing, as used herein, may refer to any attribute or setting associated with a block of text that authorizes one or more entities to select, revise, organize, arrange, rearrange, change, add, or otherwise modify in any way the contents of the associated block. In some exemplary embodiments, the separate permissions may be associated with a single block of text. For example, a block of text may have associated permissions authorizing a first entity to view and a second entity to edit. In other exemplary embodiments, the separate permissions may be associated with different blocks of text. For example, a first block of text may have an associated permission authorizing an entity to view, and a second block of text may have an associated permission authorizing the entity to edit. In some embodiments, the at least one processor may be configured to perform a look up of viewing and editing permissions associated with a particular collaborative user who, for a particular block, has viewing permissions and lacks editing permissions. Performing a lookup of viewing and editing permissions may be carried out consistent with the disclosure above to determine viewing and editing permissions for a particular user. A collaborative user, as used herein, may refer to any entity able to access the electronic word processing document. For example, a collaborative user may be an entity with permission to view one or more blocks, edit one or more blocks, or a combination thereof. Consistent with embodiments discussed above, the collaborative user may be associated with separate permissions for viewing and editing a particular block such that the collaborative user may have permission to view information associated with the particular block, but lack a permission to edit the information associated with the same particular block. Some aspects of the disclosure may involve the at least one processor configured to render the particular block on a display associated with the collaborative user in a manner permitting viewing of the particular block while preventing editing of the particular block. Rendering a particular block on a display associated with a collaborative user, as used herein, may include providing the particular block to the collaborative user by outputting one or more signals configured to result in the presentation of the particular block on a screen, other surface, through a projection, or in a virtual space. This may occur, for example, on one or more of a touchscreen, a monitor, AR or VR display, or any other means previously discussed. The particular block may appear as a new window, as a pop-up, in an existing document, or in other manner for presenting the specific block on a display associated with the collaborative user. Rendering the particular block in a manner permitting viewing while preventing editing may be accomplished in any manner such that the collaborative user may examine, observe, read, look, or inspect information in a particular block, but may not modify, add, or rearrange the contents of the particular block. In some exemplary embodiments, the particular block may have an associated read-only attribute permitting the collaborative user to view, as well as tab onto, highlight, and copy the contents of the particular block. In other exemplary embodiments, the particular block may have an associated disabled attribute, permitting the collaborative user to view but not edit, click, or otherwise use the contents of the particular block. A particular block with a disabled attribute may, for example, be rendered grey to indicate that a collaborative user has limited access to that particular block. This indication may be applied to the content contained in the particular block, to the background or border of the block, or a combination thereof.

Figure 11:
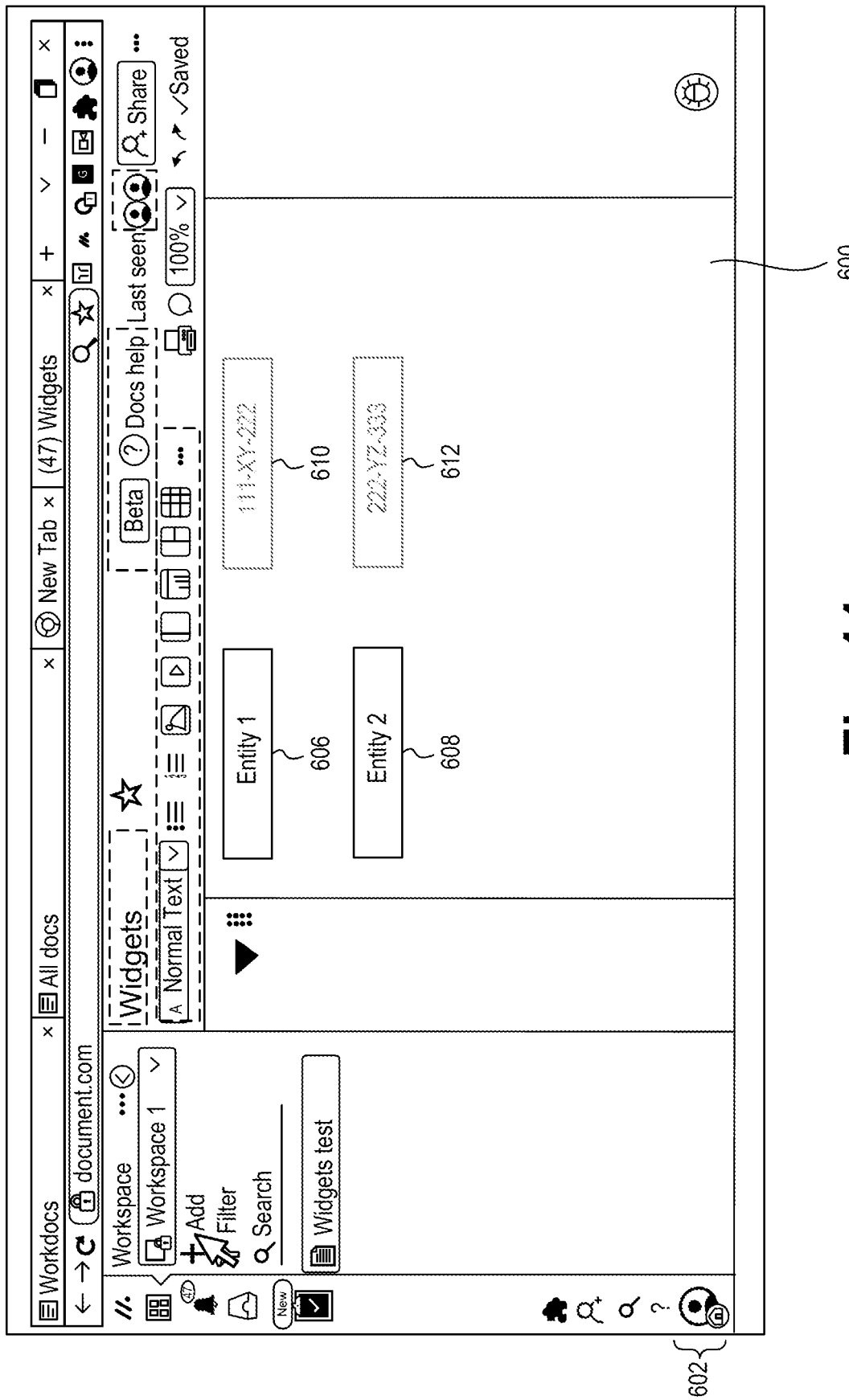
FIG. 11 illustrates one example of an electronic word processing document containing blocks having associated block-based permissions permitting viewing but preventing editing, consistent with some embodiments of the present disclosure.

For example, referring again to the electronic word processing document 600 illustrated in FIG. 6, the entity or document author 602 may define block-based permissions for blocks of text 610 and 612 that allow only team members in a human resources department to view these blocks 610 and 612. The document author 602 may further define these permissions to prevent even team members in the human resources department from editing the blocks of text 610 and 612. If document author 602 shares the document 600 with a team member in the human resources department and the team member accesses the document 600, the blocks of text 610 and 612 may be disabled and rendered grey as shown, for example, in FIG. 11, such that the team member may neither edit nor select the text in the blocks 610 and 612.

Figure 12:
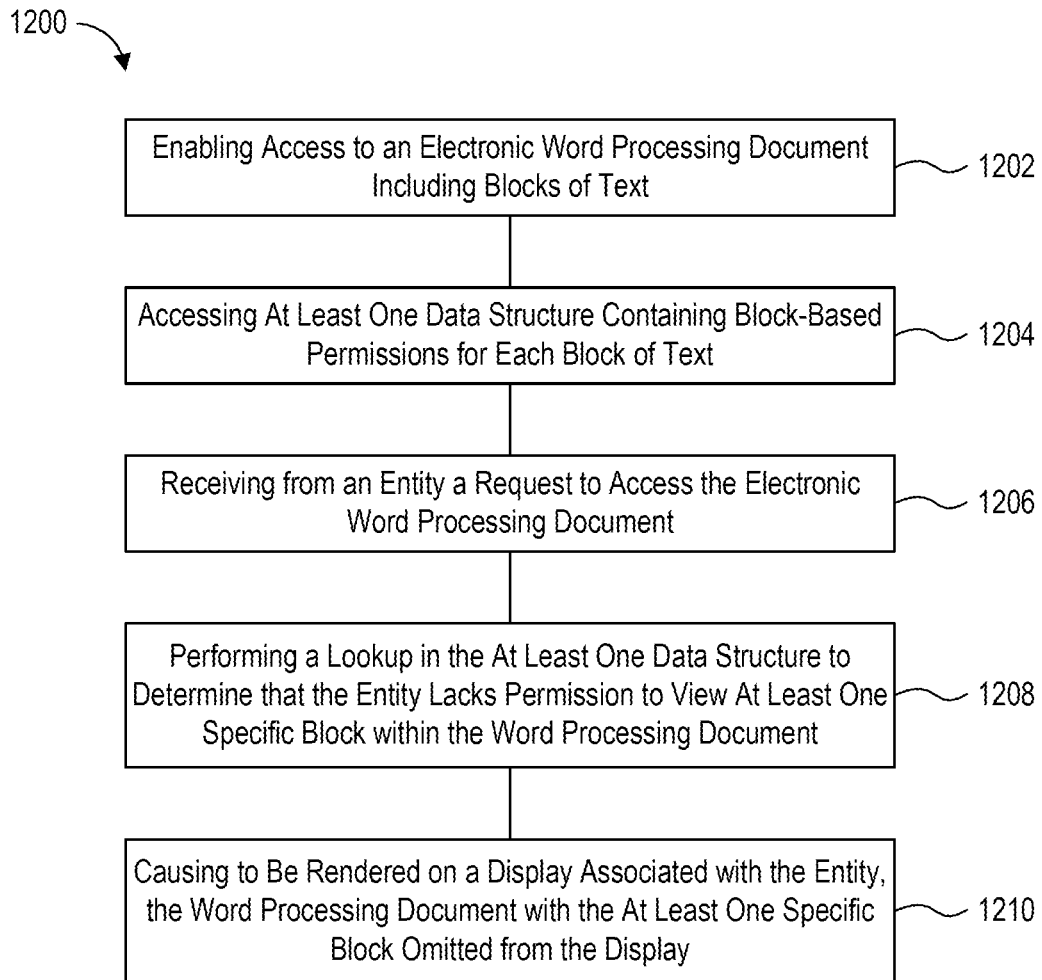
FIG. 12 illustrates a block diagram of an exemplary method performed by a processor of a computer readable medium containing instructions, consistent with some embodiments of the present disclosure, consistent with some embodiments of the present disclosure.

FIG. 12 illustrates a block diagram for an exemplary method for setting granular permissions for shared electronic documents, consistent with some embodiments of the present disclosure. Method 1200 may begin with process block 1202 by enabling access to an electronic word processing document including blocks of text, wherein each block of text has an associated address, as previously discussed. At block 1204, method 1200 may include accessing at least one data structure containing block-based permissions for each block of text, and wherein the permissions include at least one permission to view an associated block of text, as previously discussed. At block 1206, method 1200 may include receiving from an entity a request to access the electronic word processing document, consistent with the disclosure discussed above. At block 1208, method 1200 may include performing a lookup in the at least one data structure to determine that the entity lacks permission to view at least one specific block within the word processing document, as previously discussed. At block 1210, method 1200 may include causing to be rendered on a display associated with the entity, the word processing document with the at least one specific block omitted from the display, consistent with the disclosure above.

Aspects of this disclosure may involve enabling a plurality of mobile communications devices to be used in parallel to comment on presentation slides within a deck. For ease of discussion, a system is described below, with the understanding that aspects of the system apply equally to non-transitory computer readable media, methods, and devices. A presentation, as used herein, may refer to any circumstance or scenario where one or more presenters and audience members transmit and display information on one or more display devices. For example, a presentation may occur when a presenter causes a display of information relating to an electronic file on a screen in a room, or on multiple screens associated with audience members over a network. In another example, a presentation may occur during a video conference or broadcast presentation (e.g., over a network and displayed in a web browser) where at least one presenter may be able to communicate with a group of audience members located in a common space or dispersed and communicatively coupled over one or more networks. A network may refer to any type of wired or wireless electronic networking arrangement used to exchange data, such as the Internet, a private data network, a virtual private network using a public network, a Wi-Fi network, a LAN, or WAN network, and/or other suitable connections, as described above. Furthermore, a presentation may include information associated with presentation slides within a deck, which, as used herein, may refer to a single page of information that may be part of a collection of pages (i.e., a deck) shared by at least one presenter. Presentation slides (also referred to herein as "slides") within a deck may be stored as one or more digital presentation files that provide for input, editing, formatting, display, and output of text, graphics, widgets, objects, tables, links, animations, dynamically updated elements, or any other data object that may be used in conjunction with the digital file. Such presentation files may be generated with any presentation program, such as ClearSlide™, Presi™, LibreOffice Impress™, Powtoon™, GoAnimate™, Camtasia™, Slideshare™, or any other software capable of producing presentation slides. Furthermore, presentation slides within a deck may be configurable to be displayed or presented in a visual form, such as on a screen or other surface, through a projection, or in a virtual space. This may occur, for example, via a display screen of a computing device, such as a PC, laptop, tablet, projector, cell phone, or personal wearable device. Presentation slides within a deck may also be displayed or presented virtually though AR or VR glasses, or through a holographic display. Other mechanisms of presenting or displaying the presentation slides within a deck may also be used to enable the audience to visually comprehend the presented information.

A plurality of mobile communications devices, as used herein, may refer to at least two portable devices capable of transmitting, capturing, or receiving voice, video, data, and/or any other information or combination thereof. For example, mobile communications devices may include mobile phones, smartphones, handheld PCs, tablets, personal digital assistants (PDAs), laptops, smartwatches, virtual reality or extended reality glasses, a combination thereof, or any other electronic device that can transmit and/or receive voice, video, data, and/or other information. In some embodiments, a plurality of mobile communications devices may include a digital camera or an optical scanner for capturing graphical codes from presentation slides within a deck. In other embodiments, mobile communications devices may include an interface enabling user input of comments on presentation slides within a deck. The plurality of mobile communication devices may also include display screens, touchscreens, keyboards, buttons, microphones, touchpads, a combination thereof, or any other hardware or software component that may receive user inputs. Enabling a plurality of mobile communications devices to be used in parallel to comment on presentation slides within a deck, as used herein, may refer to at least two mobile communications devices (e.g., associated with audience members) that may operate simultaneously and add information regarding specific pages of an electronic file, such as adding a comment on presentation slides within a deck. A comment, as used herein, may refer to a response, an observation, a remark, an opinion, or any other form of feedback that may be transmitted and associated with a particular presentation slide within a deck. Comments may include text (e.g., alphanumerics), symbols, icons, emojis, images, or any other digital data object. For example, a mobile communications device associated with an audience member may transmit a comment (e.g., the data underlying the comment) that text within a presentation slide contains a typo. In another example, a mobile communications device associated with another audience member may transmit a comment with a thumbs-up icon for a particular presentation slide. As explained in further detail below, comments on a presentation slide within a deck may be associated with a link (e.g., a graphical indicator).

By way of example, FIG. 2 illustrates a block diagram of an exemplary computing architecture, consistent with some embodiments of the present disclosure. A computing device 100 may be associated with a presenter who is presenting presentation slides within a deck to audience members. User devices 220-1 to 220-*m* may be mobile communications devices associated with the audience members. The audience members may use their respective user devices 220-1 to 220-*m* to transmit comments over a network 210 to the computing device 100 associated with the presenter.

Some disclosed embodiments may include receiving from a first of a plurality of mobile communications devices, a first instance of a first graphical code captured from a first slide during a presentation, or a decryption of the first instance of the first graphical code, and an associated first comment on the first slide. A first graphical code, as used herein, may refer to a visible representation of a link that may be activatable to locate, access, and/or retrieve information from a specific location in memory (e.g., a repository). A first graphical code may be a machine-scannable image or code. An electronic document may include one or more graphical codes that may be associated with particular locations within the electronic document. For example, an electronic document may include a first graphical code on a first page and a second graphical code on a second page. Each graphical code may correspond to each respective page such that activating a graphical code may access a particular location in a repository storing data associated with the particular location within the electronic document. In some embodiments, the first graphical code may include at least one of a bar code or a QR code. A bar code, as used herein, may refer to a machine-readable code in the form of a pattern of parallel lines of varying widths. The bar code may also include numbers. A bar code may be a one-dimensional or linear bar code or a two-dimensional bar code, such as a data matrix or Aztec code. A QR code, as used herein, may refer to a machine-readable code consisting of an array of black and white squares. A QR code may be static or dynamic (e.g., updating over time). Furthermore, a first graphical code may be associated with a first slide. For example, a first graphical code may be embedded in a first slide or may be displayed in any other location of a window of a presentation program when the first slide within a deck is displayed.

A first instance of a first graphical code captured from a first slide, as used herein, may refer to a single presentation of the first graphical code associated with the first slide, which may then be scanned by any computing device (e.g., a mobile communications device) with a digital camera, QR code reader, bar code reader, or any other suitable optical scanning device. Scanning may involve capturing and either storing or reading information contained in a first graphical code. In an exemplary embodiment, a first of the plurality of mobile communications devices may be a smartphone associated with an audience member who uses the smartphone's digital camera to scan the first graphical code, such as a QR code, that may be embedded in a first slide. The smartphone device may then be operated to receive an input indicative of a first comment (discussed in detail below) and receive a pairing with the first graphical code captured from the first slide which may then transmit the data of the first comment over a network to the at least one processor.

A decryption of the first instance of the first graphical code, as used herein, may refer to a conversion of data associated with the first graphical code (e.g., a picture of the graphical code) captured by a computing device (e.g., a first of the plurality of mobile communications devices) into its original format (e.g., a link or file path). The original format of the first graphical code may be a plain text memory location, such as a repository. For example, a first of the plurality of mobile communications devices may be a mobile phone associated with an audience member who uses the mobile phone's digital camera to scan the first graphical code, such as a bar code, that may be embedded in a first slide. The mobile phone may then decrypt the first graphical code to transform the first graphical code into a plain text memory location (e.g., a repository or other storage location) associated with the first slide. The decryption of the first instance of the first graphical code and an associated first comment (discussed in detail below) may then be transmitted over a network to the at least one processor.

An associated first comment, as used herein, may refer to a comment linked, connected, joined, or coupled to either a first graphical code (corresponding to the first slide) captured from a first slide or a decryption of the first graphical code. As previously discussed, a comment may include text (e.g., alphanumerics), symbols, icons, emojis, images, or any other digital data object. In an exemplary embodiment, a first of the plurality of mobile communications devices may be a tablet associated with an audience member who uses the tablet's digital camera to scan the first graphical code, such as a QR code, that may be embedded in a first slide. The tablet may or may not then decrypt the first graphical code to transform the first graphical code into a plain text memory location (e.g., a repository or other storage location) associated with the first slide. The tablet may receive a first comment on the first slide from the audience member interacting with any of the tablet's interface components, such as a touchscreen or keyboard, and associate the first comment with the first graphical code or the decryption of the first graphical code. Associating the first comment with the first graphical code or the decryption of the first graphical code may be carried out by the at least one processor or a processor on the client device (e.g., the tablet). In the former scenario, the tablet may scan and subsequently decrypt the QR code, which may, for example, cause an interface (e.g., a new window) to be rendered on the tablet's display screen that may receive input (e.g., a first comment) and automatically store the received input with the underlying data associated with the QR code. In the latter scenario, the tablet may scan but not decrypt the QR code (e.g., capture an image of the QR code), and the client device may then associate an input (e.g., a first comment) with an image of the QR code. The tablet may transmit the image of the QR code (e.g., the first graphical code) captured from the first slide or the decryption of the first graphical code and the associated first comment over a network to the at least one processor. The at least one processor may then decrypt the image of the QR (e.g., to determine a repository location or to activate a link) to locate where to store the associated comment in a repository.

As used herein, receiving from a first of the plurality of mobile communications devices, a first instance of a first graphical code captured from a first slide during a presentation and an associated first comment on the first slide may refer to the at least one processor receiving a transmission of data and/or information, including an image of the first graphical code captured from a first slide (e.g., without decryption) and an associated first comment, over a network (e.g., a wired network or wireless network) from a first of the plurality of communications devices. In some embodiments, receiving may involve accepting instructions from other computing devices on a shared network (e.g., a presenter's device and an audience member's device on the same network in the same room) or across a remote network (e.g., audience member devices sending instructions remotely from home to a presenter's device during a conference call presentation). The at least one processor may then decrypt the image of the first graphical code received from a first of the plurality of mobile communications devices to determine a particular location in memory (e.g., a repository) to store the associated first comment. In some embodiments, after receiving an associated first comment on the first slide and decrypting the received first graphical code, the at least one processor may store the associated first comment in a first repository associated with the first slide of the presentation. This may occur as an additional step carried out by the at least one processor or alternatively, may be included in the instructions executed by the at least one processor when it receives a first instance of a first graphical code captured from a first slide during a presentation and an associated first comment on the first slide. Furthermore, in some embodiments, the at least one processor may assign descriptive metadata to an associated first comment to indicate that the associated first comment is comment-based data, which may facilitate the at least one processor in locating the associated second comment when performing a lookup and/or aggregating associated comments, as discussed in detail below.

As used herein, receiving from a first of the plurality of mobile communications devices, a decryption of the first instance of the first graphical code and an associated first comment on the first slide may refer to the at least one processor receiving a transmission of data and/or information, including a decryption of the first instance of the first graphical code (e.g., in the form of data or a link to access a data source location) and an associated first comment, over a network (e.g., a wired network or wireless network) from a first of the plurality of communications devices. In some embodiments, after receiving a decryption of the first instance of the first graphical code and an associated first comment on the first slide, the at least one processor may store the associated first comment in a first repository associated with the first slide of the presentation as a result of interpreting the decrypted first graphical code to locate and access the first repository. This may occur as an additional step carried out by the at least one processor or alternatively, may be included in the instructions executed by the at least one processor when it receives a first instance of a first graphical code captured from a first slide during a presentation and an associated first comment on the first slide. In addition, in some embodiments, the at least one processor may assign descriptive metadata to an associated first comment to indicate that the associated first comment is comment-based data, which may facilitate the at least one processor in locating the associated first comment when performing a lookup and/or aggregating associated comments, as discussed in detail below.

Figure 13:
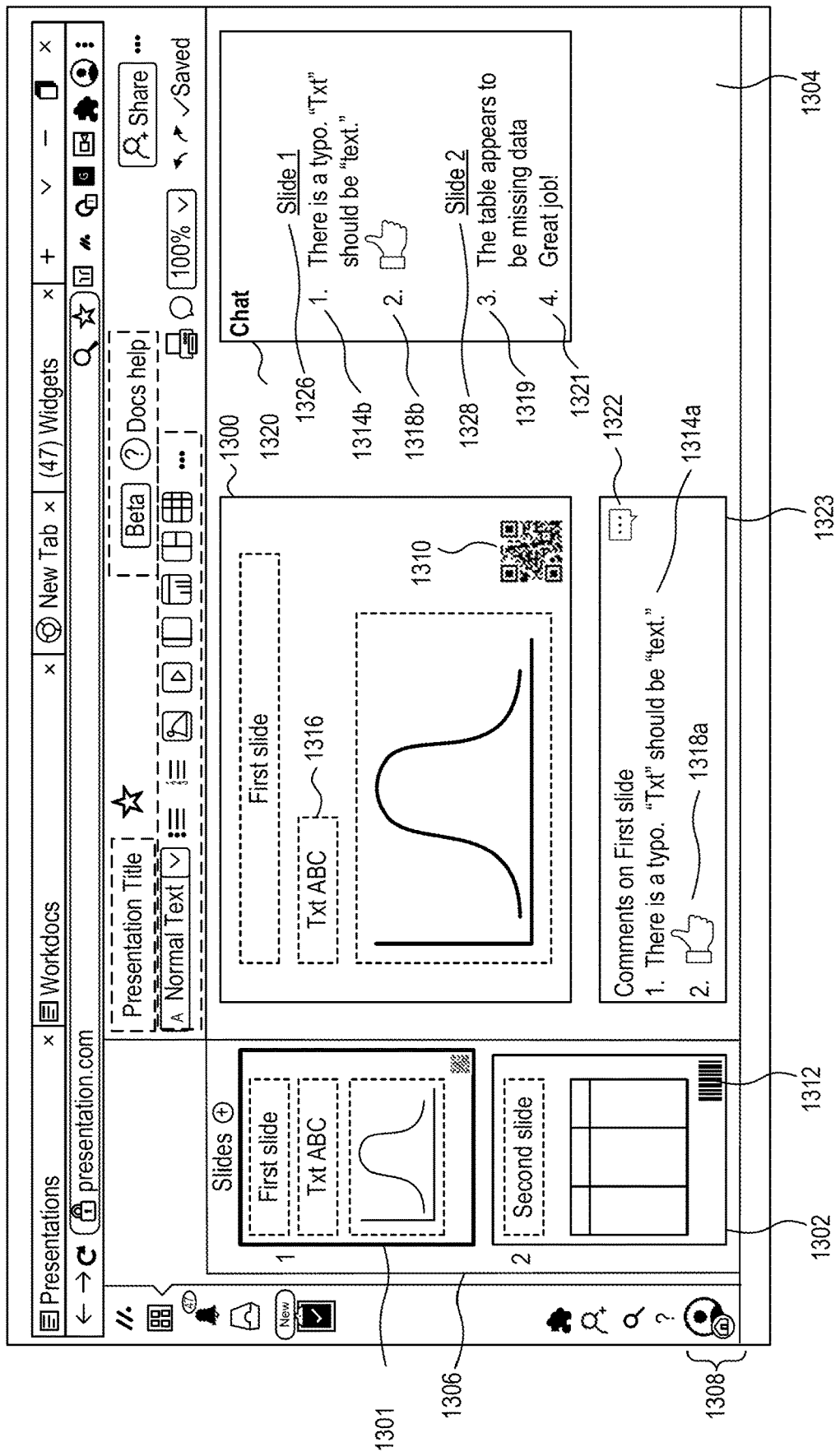
FIG. 13 illustrates an example of presentation slides, each containing a graphical code, consistent with some embodiments of the present disclosure.

By way of example, FIG. 13 illustrates an example of presentation slides, each containing a graphical code, consistent with some embodiments of the present disclosure. A first slide 1301 and a second slide 1302 may together be part of a deck 1306, which may be presented in a presentation interface 1304. The presentation interface 1304 may include an area 1306 that displays each of the slides in a deck as thumbnails for the first slide 1301 and for the second slide 1302. Additionally, the presentation interface 1304 may include an indication of a presenter 1308. The presenter 1308 may be presenting the first slide 1301 and second slide 1302 via the presentation interface 1304 on a computing device (e.g., computing device 100 of FIGS. 1 and 2). In this example, the presenter 1308 is currently presenting the first slide 1300 (on a main presenting window pane corresponding to thumbnail of first slide 1301). The first slide 1300 may include a graphical code 1310, which in this example is a QR code. During the presentation of the first slide 1300, a first of the plurality of mobile communications devices (e.g., user device 220-1 of FIG. 2), which may be a smartphone associated with an audience member who may scan the first graphical code 1310 on the first slide 1300 with the smartphone's digital camera. Once scanned, the smartphone may or may not decrypt the first graphical code 1310. The smartphone may receive a first comment from the audience member who may generate the comment by interacting with any of the smartphone's interface components, such as a touchscreen, keyboard, or microphone. The first comment may be associated with the first graphical code 1310 or a decryption of the first graphical code 1310. The smartphone may then transmit the image of the first graphical code 1310 or a decryption of the first graphical code 1310 (or otherwise activate a link or any other address decrypted from the first graphical code) and the associated first comment to the at least one processor over Wi-Fi, BLUETOOTH™, BLUETOOTH LE™ (BLE), Wi-Fi, near field communications (NFC), radio waves, wired connections, or other suitable communication channels that provide a medium for exchanging data and/or information with the at least one processor. Once the first graphical code 1310 is decrypted (either by the first of the plurality of communication devices or by the at least one processor) to indicate a specific memory location, the associated first comment may be stored in the specific memory location—a first repository (e.g., repository 230-1 or in a repository located in the computing device 100 of FIG. 2) associated with the first slide 1300.

Aspects of this disclosure may further include receiving from a second of the plurality of mobile communications devices, a second instance of the first graphical code captured from the first slide during the presentation or a decryption of the second instance of the first graphical code, and an associated second comment on the first slide. Receiving from a second of the plurality of mobile communications devices, a second instance of a first graphical code captured from a first slide during a presentation and an associated second comment on the first slide may involve capturing an image of the first graphical code as discussed in detail above, which may be carried out similarly to the discussion above for the first of the plurality of mobile communications devices. Likewise, receiving from a second of the plurality of mobile communications devices, a decryption of the second instance of the first graphical code and an associated second comment on the first slide may involve decrypting and interpreting data associated with the first graphical code, which may be carried out similarly to the discussion above for the first of the plurality of mobile communications devices.

Referring again to FIG. 13, a first slide 1300 may include a graphical code 1310, which again in this example is a QR code. During a presentation of the first slide 1300, a second of the plurality of mobile communications devices (e.g., user device 220-2 of FIG. 2), which may be a tablet associated with an audience member who may scan the first graphical code 1310 on the first slide 1300 with the tablet's digital camera. Once scanned, the tablet may or may not decrypt the first graphical code 1310. The smartphone may receive a second comment from the audience member who may generate the comment by interacting with any of the tablet's interface components, such as a touchscreen or keyboard. The second comment may be associated with the first graphical code 1310 or a decryption of the first graphical code. The tablet may then transmit the first graphical code 1310 or a decryption of the first graphical code 1310 (or otherwise activate a link or any other address decrypted from the first graphical code) and the associated second comment to the at least one processor over Wi-Fi, BLUETOOTH™, BLUETOOTH LE™ (BLE), Wi-Fi, near field communications (NFC), radio waves, wired connections, or other suitable communication channels that provide a medium for exchanging data and/or information with the at least one processor. Once the first graphical code 1310 is decrypted (either by the second of the plurality of communication devices or by the at least one processor) to indicate a specific memory location, the associated second comment may be stored in the specific memory location—a first repository (e.g., repository 230-1 or in a repository located in the computing device 100 of FIG. 2) associated with the first slide 1300.

Aspects of this disclosure may further include receiving from a third of the plurality of mobile communications devices, a first instance of a second graphical code captured from a second slide during the presentation or a decryption of the first instance of the second graphical code, and an associated third comment on the second slide. The term "third" (and later "fourth") as used herein is simply meant to distinguish one or more mobile communications devices from other devices, such as the first and second devices and is not meant to imply a particular fraction. Receiving from a third of the plurality of mobile communications devices, a first instance of a second graphical code captured from a second slide during a presentation and an associated third comment on the second slide may involve capturing an image of the second graphical code similar to capturing an image of the first graphical code as discussed in detail above, which may be carried out similarly to the discussion above for the first of the plurality of mobile communications devices. Likewise, receiving from a third of the plurality of mobile communications devices, a decryption of the first instance of the second graphical code and an associated third comment on the second slide may involve decrypting and interpreting data associated with the second graphical code, which may be carried out similarly to the discussion above for the first of the plurality of mobile communications devices.

Referring again to FIG. 13, a second slide 1302 may include a graphical code 1312, which in this example is a linear bar code. During a presentation of the second slide 1402 (shown in FIG. 13 as a thumbnail in area 1306), a third of the plurality of mobile communications devices (e.g., user device 220-3 of FIG. 2 (shown as 220-n as any number of additional user devices)), which may be a laptop that may be associated with an audience member and that may be coupled to a code scanner via a USB or BLUETOOTH™ connection. The audience member may scan the second graphical code 1312 on the second slide 1302 (when second slide 1302 is presented in the main window pane or as a thumbnail) with the code scanner. Once scanned and transmitted to the laptop, the laptop may or may not decrypt the second graphical code 1312. The laptop may receive a third comment from the audience member who may generate the comment by interacting with any of the laptop's interface components, such as a keyboard or mouse. The third comment may be associated with the second graphical code 1312 or a decryption of the second graphical code 1312. The laptop may then transmit the second graphical code 1312 or a decryption of the second graphical code 1312 (or otherwise activate a link or any other address decrypted from the second graphical code) and the associated third comment to the at least one processor over Wi-Fi, BLUETOOTH™, BLUETOOTH LE™ (BLE), Wi-Fi, near field communications (NFC), radio waves, wired connections, or other suitable communication channels that provide a medium for exchanging data and/or information with the at least one processor. Once the second graphical code 1312 is decrypted (either by the third of the plurality of communication devices or by the at least one processor) to indicate a specific memory location, the associated third comment may be stored in the specific memory location—a second repository (e.g., repository 230-1 or in a repository located in the computing device 100 of FIG. 2) associated with the second slide 1302.

Some disclosed embodiments may further include receiving from a fourth of the plurality of mobile communications devices, a second instance of the second graphical code captured from the second slide during the presentation or a decryption of the second instance of the second graphical code, and an associated fourth comment on the second slide. Receiving from a fourth of the plurality of mobile communications devices, a second instance of a second graphical code captured from a second slide during a presentation and an associated fourth comment on the second slide may involve capturing an image of the second graphical code similar to capturing an image of the first graphical code as discussed in detail above, which may be carried out similarly to the discussion above for the first of the plurality of mobile communications devices. Likewise, receiving from a fourth of the plurality of mobile communications devices, a decryption of the second instance of the second graphical code and an associated fourth comment on the second slide may involve decrypting and interpreting data associated with the second graphical code, which may be carried out similarly to the discussion above for the first of the plurality of mobile communications devices.

Receiving instances of graphical codes or decryptions of graphical codes from the plurality of mobile communications devices may occur simultaneously and at any time. For example, any number of devices may capture the first graphical code and associate a comment, as discussed earlier, when the first slide is actively being presented or at a later time after the first slide is presented (e.g., when the presenter moves on to presenting the second slide or even after the presentation is concluded). Even while some devices are receiving inputs for comments for the first slide, other devices during the same presentation may receive inputs at the same time for comments for the second slide. By associating comments with either an instance of a graphical code or a decryption of a graphical code, the processor may quickly receive and store all of the comments to the respective locations in the repository for each particular slide in a deck of slides in a presentation.

Referring again to FIG. 13, a second slide 1302 may include a graphical code 1312, which again in this example is a linear bar code. During a presentation of the second slide 1402 (shown in FIG. 13 as a thumbnail in area 1306), a fourth of the plurality of mobile communications devices (e.g., user device 220-4 of FIG. 2 (shown as 220-*n* as any number of additional user devices)), which may be a smartwatch that may be associated with an audience member who may scan the second graphical code 1312 on the second slide 1302 with the smartwatch's digital camera. Once scanned, the smartwatch may or may not decrypt the second graphical code 1312. The smartwatch may receive a fourth comment from the audience member who may generate the comment by interacting with any of the smartwatch's interface components, such as buttons or a touchscreen. The fourth comment may be associated with the second graphical code 1312 or a decryption of the second graphical code 1312. The smartwatch may then transmit the second graphical code 1312 or a decryption of the second graphical code 1312 (or otherwise activate a link or any other address decrypted from the second graphical code) and the associated fourth comment to the at least one processor over Wi-Fi, BLUETOOTH™, BLUETOOTH LE™ (BLE), Wi-Fi, near field communications (NFC), radio waves, wired connections, or other suitable communication channels that provide a medium for exchanging data and/or information with the at least one processor. Once the second graphical code 1312 is decrypted (either by the fourth of the plurality of communication devices or by the at least one processor) to indicate a specific memory location, the associated fourth comment may be stored in the specific memory location—a second repository (e.g., repository 230-1 or in a repository located in the computing device 100 of FIG. 2) associated with the second slide 1302.

Aspects of this disclosure may further include performing a lookup associated with the first graphical code, to identify a first repository associated with the first slide of the presentation. Performing a lookup associated with the first graphical code, as used herein, may refer to an action, process, or instance of retrieving, accessing, and/or searching for data and/or information in a memory location identified by the decrypted first graphical code. The lookup may locate (i.e., identify) a first repository storing data associated with the first slide of the presentation. As used herein, a first repository associated with the first slide of the presentation may refer to a storage medium or specific location in a storage medium where data and/or information associated with the first slide of the presentation is stored. Data and/or information associated with the first slide of the presentation may include objects, text, comments, charts, graphs, graphical user interfaces, videos, animations, iframes, and/or any other representations of data or information associated with the first slide. A first repository may be a relational database, a data warehouse, a data mart, an operational data store, shared data store, cloud storage, or any other central location in which data and/or information associated with the first slide is stored and managed. Furthermore, a first repository may be a remote repository accessible through a network or may be a local repository hosted by a computing device associated with one or more presenters. In some exemplary embodiments, the at least one processor may automatically perform a lookup in response to the at least one processor receiving a first and/or second instance of the first graphical code (or a decryption of the first and/or second instance of the first graphical code) and an associated first and/or second comment on the first slide from the first or second of the plurality of mobile communications devices, respectively, as discussed above. In other exemplary embodiments, one or more presenters may manually instruct the at least one processor to perform the lookup. For example, a presenter may select with an input device (such as a mouse) an interactive component of the presentation interface to initiate the performing a lookup step. The at least one processor may perform an additional lookup, for example, in a data structure containing permissions, to determine whether the presenter has permission to initiate the performing a lookup step.

By way of example, FIG. 2 illustrates a block diagram of an exemplary computing architecture, consistent with some embodiments of the present disclosure. The at least one processor may interpret a decrypted first graphical code (such as the first graphical code 1310 of FIG. 13) to identify a first repository (remote repository 230-1 or in a repository located in the computing device 100) associated with a first slide of the presentation to retrieve, access, and/or search for data and/or information contained in the first repository.

Aspects of this disclosure may further include aggregating the first comment and the second comment in the first repository. Aggregating the first comment and the second comment in the first repository may involve locating, gathering, compiling, collecting, combining, associating, and/or organizing the first comment and second comment and storing the data associated with both in memory in the same location or in associated locations (e.g., in the first repository). Associated locations may be disbursed within a server, a collection of collocated servers, or distributed servers. Thus, a repository, as used herein, does not necessarily mean that all related data is stored in the same location.

For example, the at least one processor may perform a lookup within the first repository to search and locate the first and second comments and then associate the first comment with the second comment, as discussed in below. The at least one processor may locate the first comment and second comment, for example, based on descriptive metadata assigned to each comment indicating that the comments are comment-based data and both associated with the first slide. In some embodiments, after locating the first comment and second comment in the first repository, the at least one processor may associate or link the first and second comments by, for example, assigning a common code, address, or other designation to the first comment and the second comment to indicate that both comments are associated with data from the first slide. In other embodiments, the at least one processor may sort or organize the first comment and second comment within the first repository in a manner that will enable efficient retrieval for displaying or further processing of the first and second comments when the processor receives instructions to transmit all data regarding the first slide (e.g., instructions from a presenter requesting to access and view all of the comments associated with the first slide).

Some disclosed embodiments may further include performing a lookup associated with a second graphical code, to identify a second repository associated with a second slide of a presentation. Performing a lookup associated with the second graphical code, to identify a second repository associated with the second slide of the presentation may be carried out similarly to the discussion above for performing a lookup associated with the first graphical code, but to identify a second repository associated with the second slide of the presentation. In some embodiments, the first repository and the second repository may be distinct repositories, and in other embodiments, the first repository and second repository may be separate dedicated memory spaces in the same repository (e.g., the same repository location or a common file, as discussed in detail below). Furthermore, in some embodiments, performing the lookup associated with the second graphical code may be carried out following performing the lookup associated with the first graphical code in response to a single instruction (e.g., the presenter sends instructions to view all comments associated with the first and second slides to cause the processor to perform a lookup of both the first and second graphical code). In other embodiments, performing the lookup associated with the second graphical code may be carried out only after the processor receives a second set of instructions to perform the lookup associated with the second graphical code, independently from the instructions to perform the lookup associated with the first graphical code, as described above.

By way of example, FIG. 2 illustrates a block diagram of an exemplary computing architecture, consistent with some embodiments of the present disclosure. The at least one processor may read a decrypted second graphical code (such as the second graphical code 1312 of FIG. 13) to identify a second repository (remote repository 230-1 or in a repository located in the computing device 100) associated with a second slide of the presentation to retrieve, access, and/or search for data and/or information contained in the second repository.

Some disclosed embodiments may further include aggregating the third comment and the fourth comment in the second repository. Aggregating the third comment and the fourth comment in the second repository may be carried out similarly to the discussion above for aggregating the first comment and the second comment in the first repository.

In some embodiments, a first repository and a second repository may constitute separate portions of a common file. A common file, as used herein, may refer to a single collection of digital data associated with presentation slides within a deck, stored as a unit in a local or remote repository. A common file may also be stored in a disbursed manner, across servers in one or more locations. Separate portions of a common file may refer to subsections of a local or remote repository associated with the common file. For example, a single local or remote repository associated with a common file may be divided into two or more subsections. One subsection within the local or remote repository may store data and/or information associated with the first slide of the presentation, and another subsection within the local or remote repository may data and/or information associated with the second slide of the presentation.

By way of example, FIG. 2 illustrates a block diagram of an exemplary computing architecture, consistent with some embodiments of the present disclosure. A common file may, for example, be stored in a remote repository 230-1 or in a repository located in the computing device 100. If the common file is stored in a remote repository 230-1 for example, the repository 230-1 may include separate areas or subsections, such that data and/or information associated with a first slide of the presentation is stored separately from data and/or information associated with a second slide of the presentation.

Aspects of this disclosure may further include displaying to a presenter of a deck, a first comment and a second comment in association with a first slide. A presenter of the deck, as used herein, may refer to an entity who may be an author or owner of a presentation file or any other electronic document that may be presented. An entity may refer to an individual, a device, a team, an organization, a group, a department, a division, a subsidiary, a company, a contractor, an agent or representative, or any other thing with independent and distinct existence. A presenter of the deck may be an entity that was given access to the deck through permission settings or an activatable link. Displaying to a presenter of the deck, the first comment and the second comment, as used herein, may include retrieving the first and second comments from at least one repository, and causing the information in the first and second comments to be rendered on a display associated with a presenter, such as on a screen, other surface, through a projection, or in a virtual space associated with the presenter of a deck. This may occur via a display screen associated with the presenter's computing device (e.g., PC, laptop, tablet, projector, cell phone, or personal wearable device), which may or may not be the same computing device used to present the deck. The first comment and the second comment may also be presented virtually through AR or VR glasses, or through a holographic display. Other mechanisms of presenting may also be used to enable the presenter of the deck to visually comprehend the first comment and the second comment. Furthermore, displaying to a presenter of the deck, the first comment and the second comment may occur in real-time during the presentation, at the conclusion of the presentation, or in response to the presenter requesting a display of the first comment and the second comment. The first comment and the second comment may be arranged on a display associated with a presenter according to timestamps, which may be stored as metadata, associated with each comment. The timestamps may or may not be displayed in conjunction with their respective comment. Additionally, the first and second comment may only be viewable to a presenter of the deck or may also be viewable to one or more of the audience members.

Displaying to a presenter of the deck, the first comment and the second comment in association with the first slide may refer to displaying the first comment and the second comment in connection with or together with the first slide via any methods previously discussed. In some embodiments, the first comment and the second comment may be displayed on the first slide in a rendered display, or next to each other in a co-presentation. In other embodiments, the first comment and the second comment may be displayed in any other area of a presentation program interface (e.g., a comment box displayed below the first slide, a new window, or a pop-up) when the first slide within a deck is displayed. In further embodiments, the first comment and the second comment may be displayed on a device distinct from the device used to present the first slide via a presentation program. For example, the first and second comment may be displayed on a first computing device (e.g., a tablet) or VR/AR glasses associated with the presenter when the presenter accesses or selects the first slide via a presentation program on a second computing device (e.g., a PC). Displaying to a presenter of the deck, the first comment and the second comment in association with the first slide may further involve a presenter accessing the deck by retrieving the deck from a storage medium, such as a local storage medium or a remote storage medium. A local storage medium may be maintained, for example, on a local computing device, on a local network, or on a resource such as a server within or connected to a local network. A remote storage medium may be maintained in the cloud, or at any other location other than a local network. In some embodiments, accessing the deck may retrieving the deck from a web browser cache. Additionally, or alternatively, accessing the deck may include accessing a live data stream of the deck from a remote source. In some embodiments, accessing the deck may include logging into an account having a permission to access the deck. For example, accessing the deck may be achieved by interacting with an indication associated with the deck, such as an icon or file name, which may cause the system to retrieve (e.g., from a storage medium) a particular deck associated with the indication.

Referring again to FIG. 13, a presenter 1308 may be presenting a deck via a presentation interface 1304 on a computing device (e.g., computing device 100 of FIGS. 1 and 2). The deck may include a first slide 1300, which the presenter 1308 may be presenting. The first slide 1300 may include a graphical code 1310, which in this example is a QR code.

A first of the plurality of mobile communications devices (e.g., user device 220-1 of FIG. 2) may be a smartphone associated with an audience member who may scan the first graphical code 1310 on the first slide 1300 with the smartphone's digital camera. Once scanned, the smartphone may or may not decrypt the first graphical code 1310. The smartphone may receive a first comment 1314a from the audience member. The first comment 1314a may be text reading "There is a typo. 'Txt' should be 'Text,'" referring to the text string 1316 on the first slide 1300. The smartphone may then transmit the first graphical code 1310 (or a decryption of the first graphical code 1310) and the associated first comment 1314a to the at least one processor (e.g., processing circuitry 110 of computing device 110 of FIG. 1) over Wi-Fi, BLUETOOTH™, BLUETOOTH LE™ (BLE), Wi-Fi, near field communications (NFC), radio waves, wired connections, or other suitable communication channels that provide a medium for exchanging data and/or information with the at least one processor. Once the first graphical code 1310 is decrypted (either by the first of the plurality of communication devices or by the at least one processor) to indicate a specific memory location, the associated first comment 1314a may be stored in the specific memory location—a first repository (e.g., repository 230-1 or in a repository located in the computing device 100 of FIG. 2) associated with the first slide 1300.

A second of the plurality of mobile communications devices (e.g., user device 220-2 of FIG. 2), which may be a tablet associated with an audience member who may scan the first graphical code 1310 on the first slide 1300 with the tablet's digital camera. Once scanned, the tablet may or may not decrypt the first graphical code 1310. The tablet may receive a second comment 1318a from the audience member. The second comment 1318a may be a thumbs up icon (e.g., an emoji). The tablet may then transmit the first graphical code 1310 (or a decryption of the first graphical code 1310) and the associated second comment 1318a to the at least one processor (e.g., processing circuitry 110 of computing device 110 of FIG. 1) over Wi-Fi, BLUETOOTH™, BLUETOOTH LE™ (BLE), Wi-Fi, near field communications (NFC), radio waves, wired connections, or other suitable communication channels that provide a medium for exchanging data and/or information with the at least one processor. Once the first graphical code 1310 is decrypted (either by the second of the plurality of communication devices or by the at least one processor) to indicate a specific memory location, the associated second comment 1318a may be stored in the specific memory location—a first repository (e.g., repository 230-1 or in a repository located in the computing device 100 of FIG. 2) associated with the first slide 1300.

The presenter 1308 may select an icon 1322 in the presentation interface 1304 to instruct the at least one processor (e.g., processing circuitry 110 of computing device 110 of FIG. 1) to collect all of the comments received regarding the first slide 1300, which may cause the at least one processor to perform a lookup and aggregate the first comment 1314a and second comment 1318a. In response to performing a lookup and aggregating the first comment 1314a and the second comment 1318a, the at least one processor may then display to the presenter of the deck the first comment 1314*a* and the second comment 1318*a* in comment box 1323, which may or may not also be visible to one or more audience members.

Aspects of this disclosure may further include displaying to the presenter of the deck, the third comment and the fourth comment in association with the second slide. Displaying to the presenter of the deck, the third and the fourth comment in association with the second slide may be carried out similarly to the discussion above for displaying to the presenter of the deck, the first and the second comment in association with the first slide.

Referring again to FIG. 13, a presenter 1308 may be presenting a deck via a presentation interface 1304 on a computing device (e.g., computing device 100 of FIGS. 1 and 2). The deck may include a second slide 1302 (shown in FIG. 13 as a thumbnail in area 1306). The second slide 1302 may include a graphical code 1312, which in this example is a linear bar code.

A third of the plurality of mobile communications devices (e.g., user device 220-3 of FIG. 2 (shown as 220-*n* as any number of additional user devices)), which may be a mobile phone associated with an audience member who may scan the second graphical code 1312 on the second slide 1302 (when presented by the presenter 1308) with the mobile phone's digital camera. Once scanned, the mobile phone may or may not decrypt the second graphical code 1312. The mobile phone may receive a third comment 1319 (shown here in a chat box 1320, which is explained in detail below and may or may not be included in the presentation interface 1304) from the audience member. The third comment 1319 may be text reading "The table appears to be missing data." The mobile phone may then transmit an image of the second graphical code 1312 (or a decryption of the second graphical code 1312) and the associated third comment 1319 to the at least one processor (e.g., processing circuitry 110 of computing device 110 of FIG. 1) over Wi-Fi, BLUETOOTH™, BLUETOOTH LE™ (BLE), Wi-Fi, near field communications (NFC), radio waves, wired connections, or other suitable communication channels that provide a medium for exchanging data and/or information with the at least one processor. Once the second graphical code 1312 is decrypted (either by the third of the plurality of communication devices or by the at least one processor) to indicate a specific memory location, the associated third comment 1319 may be stored in the specific memory location—a second repository (e.g., repository 230-1 or in a repository located in the computing device 100 of FIG. 2) associated with the second slide 1302.

A fourth of the plurality of mobile communications devices (e.g., user device 220-4 of FIG. 2 (shown as 220-*n* as any number of additional user devices)) may be a smartwatch (or any other device) associated with an audience member who may scan the second graphical code 1312 on the second slide 1302 (when presented by the presenter 1308) with the smartwatch's digital camera. Once scanned, the smartwatch may or may not decrypt the second graphical code 1312. The smartwatch may receive a fourth comment 1321 (shown here in a chat box 1320, which is explained in detail below and may or may not be included in the presentation interface 1304) from the audience member. The fourth comment 1321 may be text reading "Great job!" The smartwatch may then transmit an image of the second graphical code 1312 (or a decryption of the second graphical code 1312) and the associated fourth comment 1321 to the at least one processor (e.g., processing circuitry 110 of computing device 110 of FIG. 1) over Wi-Fi, BLUETOOTH™, BLUETOOTH LE™ (BLE), Wi-Fi, near field communications (NFC), radio waves, wired connections, or other suitable communication channels that provide a medium for exchanging data and/or information with the at least one processor. Once the second graphical code 1312 is decrypted (either by the second of the plurality of communication devices or by the at least one processor) to indicate a specific memory location, the associated fourth comment 1321 may be stored in the specific memory location—a second repository (e.g., repository 230-1 or in a repository located in the computing device 100 of FIG. 2) associated with the second slide 1302.

When the presenter 1308 presents the second slide 1302, the presenter 1308 may select an icon similar to activatable icon 1322 in the presentation interface 1304 to instruct the at least one processor (e.g., processing circuitry 110 of computing device 110 of FIG. 1) to perform a lookup and aggregate the third comment 1319 and fourth comment 1321. In response to performing a lookup and aggregating the third comment and the fourth comment, the at least one processor may then display to the presenter of the deck the third comment 1319 and the fourth comment 1321 in a comment box similar to comment box 1323, which may or may not also be visible to one or more audience members.

In some embodiments, the at least one processor may be configured to display in real time to a presenter during a presentation at least one of a first comment, a second comment, a third comment, and a fourth comment. Displaying comments to a presenter in real time during a presentation may include the at least one processor rendering (via any methods previously discussed for displaying to a presenter of the deck the first comment and second comment) at least one of the first comment, the second comment, the third comment, or the fourth comment at the same time while the presenter is transmitting information from an electronic file (e.g., a presentation slide deck to an audience member in the same room, or via an associated computing device of at least one audience member that is on a remote network). This may occur within milliseconds, seconds, or another predetermined interval of the at least one processor receiving from one of the plurality of mobile communications devices a graphical code and an associated comment, or a decryption of a graphical code and an associated comment. For example, the at least one processor may receive from a second of the plurality of mobile communications devices, a second instance of a first graphical code captured from a first slide during a presentation and an associated second comment. The at least one processor may then perform additional processing operations, such as any of the processing operations previously discussed and discussed further below. The at least one processor, in this example, may then display to the presenter the associated second comment while the presenter is presenting the first slide (or a subsequent slide if the at least one processor receives from the second of the plurality of the mobile communications devices, the first graphical code and the associated second comment after the presenter has advanced the deck to a subsequent slide). The associated second comment may be displayed in association with the first slide, as previously discussed, or may be displayed in a chat, as discussed in detail below.

Referring again to FIG. 13, a presenter 1308 may be presenting a deck via a presentation interface 1304 on a computing device (e.g., computing device 100 of FIGS. 1 and 2). The deck may include a first slide 1300, which the presenter 1308 is currently presenting. The first slide 1300 may include a graphical code 1310, which in this example is a QR code. A first of the plurality of mobile communications devices (e.g., user device 220-1 of FIG. 2), which may be a smartphone associated with an audience member who may scan the first graphical code 1310 on the first slide 1300 with the smartphone's digital camera. Once scanned, the smartphone may or may not decrypt the first graphical code 1310. The smartphone may receive a first comment 1314a from the audience member. The first comment 1314a may be text reading "There is a typo. 'Txt' should be 'Text,'" referring to the text string 1316 on the first slide 1300. The smartphone may then transmit the first graphical code 1310 (or a decryption of the first graphical code 1310) and the associated first comment 1314a to the at least one processor (e.g., processing circuitry 110 of computing device 110 of FIG. 1) over Wi-Fi, BLUETOOTH™, BLUETOOTH LE™ (BLE), Wi-Fi, near field communications (NFC), radio waves, wired connections, or other suitable communication channels that provide a medium for exchanging data and/or information with the at least one processor. Once the first graphical code 1310 is decrypted (either by the first of the plurality of communication devices or by the at least one processor) to indicate a specific memory location, the associated first comment 1314a may be stored in the specific memory location—a first repository (e.g., repository 230-1 or in a repository located in the computing device 100 of FIG. 2) associated with the first slide 1300. The at least one processor may then retrieve from memory and output signals to cause a display to render information to the presenter 1308, such as information from the associated first comment 1314a, either in a comment box 1323 or a chat box 1320 or any other visual rendering of this information. In this example, other comments (e.g., a second comment 1318a) would not be displayed in the comment box 1323 or in the chat box 1320, as the system has not yet received other comments. The at least one processor may perform the operations described in this example in milliseconds, seconds, or based on a predetermined interval, such that the first comment 1314a is displayed to the presenter 1308 in real-time or near real-time.

In some other embodiments, at least one processor may be further configured to aggregate a first comment, a second comment, a third comment, and a fourth comment into a common electronic word processing document. A common electronic word processing document may refer to any digital file that may provide for input, editing, formatting, display, and output of text (e.g., alphanumerics) and other content, such as graphics, widgets, objects, tables, links, animations, dynamically updated elements, or any other data object that may be used in conjunction with the digital file. A common electronic word processing document may not be limited to only digital files for word processing but may include any other processing document such as presentation slides, tables, databases, graphics, sound files, video files or any other digital document or file. Furthermore, an electronic word processing document may be a collaborative document or a non-collaborative document. A collaborative electronic word processing document may, for example, be generated in or uploaded to a common online platform (e.g., a website) to enable multiple members of a team to simultaneously view and edit the document. A non-collaborative electronic word processing document, as used herein, may refer to any document that only a single entity may modify, prepare, and edit at a time. The single entity may share the non-collaborative document with other entities (e.g., an end-user or audience) to enable the other entities to view or edit the same document. Aggregating the first comment, the second comment, the third comment and the fourth comment into a common electronic word processing document, as used herein, may refer to locating and retrieving the underlying data of the first comment, the second comment, the third comment, and the fourth comment, and storing these comments in a common electronic word processing document. The at least one processor may execute instructions, such as code in source code format, binary code format, executable code format, or any other suitable format of code, to locate, retrieve, and store the first comment the second comment, the third comment, and the fourth comment in a common electronic word processing document. This may involve the at least one processor accessing the first repository associated with the first slide of the presentation to locate and retrieve the first comment and the second comment and accessing the second repository associated with the first slide of the presentation to locate and retrieve the third comment and the fourth comment. In some embodiments, the at least one processor may locate the first comment, the second comment, the third comment, and the fourth comment based on descriptive metadata assigned to each comment indicating that the comments are comment-based data. The at least one processor may then store the retrieved first comment, second comment, third comment, and fourth comment in the common electronic word processing document. In some embodiments, common electronic word processing document may be a new document generated by the at least one processor. In other embodiments, the common electronic word processing document may be an existing document. For example, the at least one processor may migrate the first comment, the second comment, the third comment, and the fourth document from one file location (e.g., the presentation file) to another file location (e.g., an existing common electronic word processing document file). Furthermore, the common electronic word processing document may display the identical first, second, third, and fourth comments, may display a summary or altered version of these comments, or may display the identical comment for some comments and a summary or altered version for others. Additionally, the common electronic word processing document may or may not include additional information, such as, for example, headings identifying the slide from which the first, second, third, or fourth comment is associated with and/or timestamps referencing the time at which the at least one processor received the respective comment. Furthermore, the first comment, the second comment, the third comment, and the fourth comment may be organized within the common electronic word processing document in any manner. For example, the first and second comment may be displayed in one column of a table, while the third and fourth comment may be displayed in a second column of the same table. In another example, the first and second comment may be included in a first page of the common electronic word processing document, while the third and fourth comment may be displayed in a second page of the common electronic word processing document. In yet another example, the comments may be arranged in chronological order according to timestamps, which may be stored as metadata associated with each comment.

Figure 14:
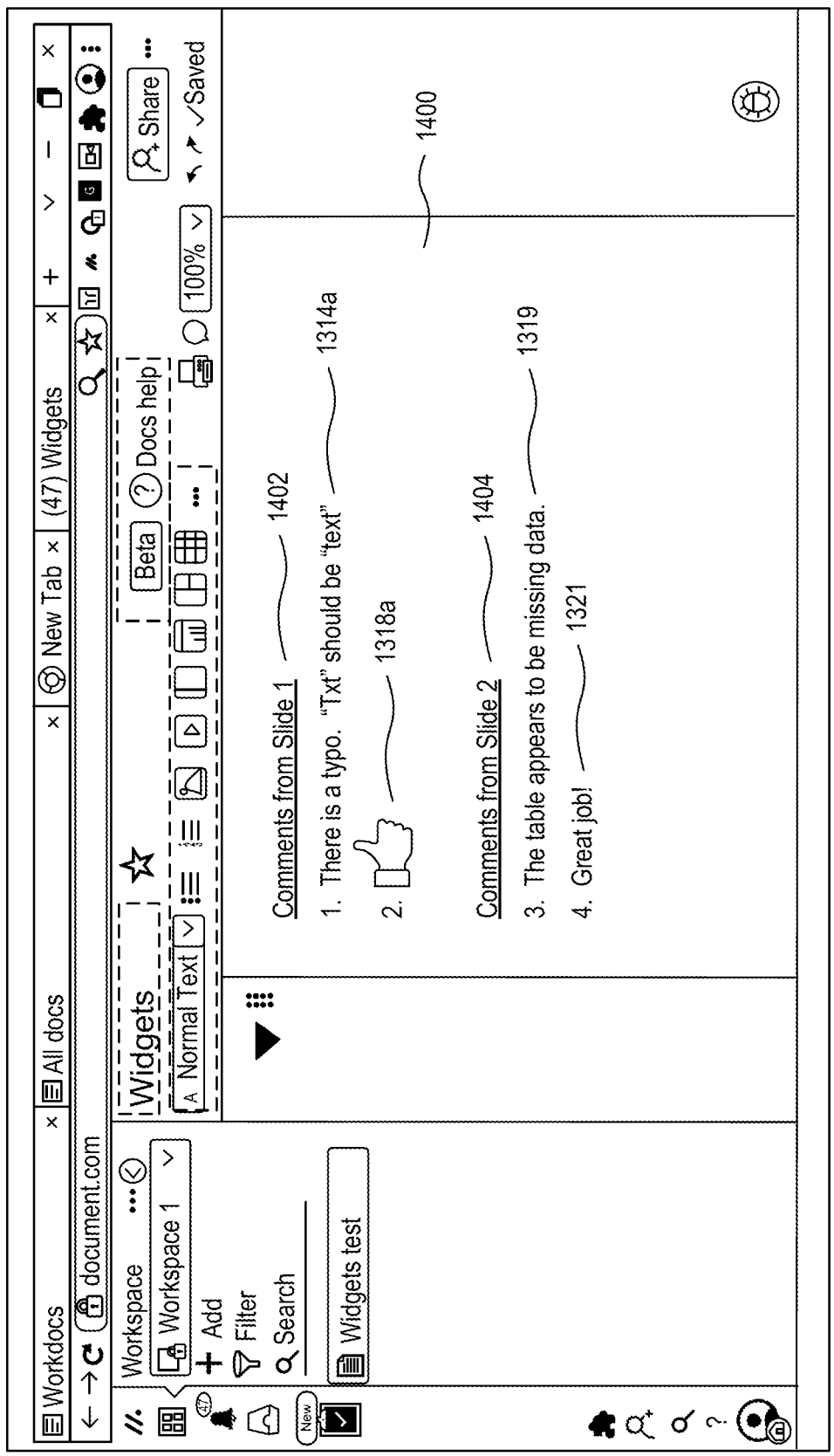
FIG. 14 illustrates an example of an electronic word processing document presenting comments on presentation slides within a deck, consistent with some embodiments of the present disclosure.

By way of example, FIG. 14 illustrates an example of an electronic word processing document 1400 presenting comments 1314a, 1318a, 1319, and 1321 on presentation slides 1300 and 1302 (from FIG. 13), consistent with some embodiments of the present disclosure. The electronic word processing document 1400 may display comments first comment 1314a, the second comment 1318a, the third comment 1319, and the fourth comment 1321, corresponding to comments on slides 1300 and 1302 that the at least one processor received from a respective one of the plurality of mobile communications devices. The electronic word processing document may include heading 1402, "Comments from Slide 1," and heading 1404, "Comments from Slide 2." The first comment 1314*a* and the second comment 1318*a* from the first slide 1300 may be displayed under heading 1402, and the third comment 1319 and the fourth comment 1321 may be displayed under heading 1404.

In other embodiments, at least one processor may be further configured to present a first comment, a second comment, a third comment, and a fourth comment in a chat during a presentation. A chat during a presentation, as used herein, may refer to a dedicated portal for exchanges of messages between one or more entities during the presentation in real-time or real-near time, which may be rendered in at least a portion of a screen to present the messages exchanged during a time frame. The messages may include the first comment, the second comment, the third comment, and the fourth comment received by the at least one processor from the respective mobile communications devices. The messages may further include other comments, such as comments from one or more presenters of the presentation slides within a deck and/or further comments received by the at least one processor from one or more audience members over a network (e.g., a wired network or wireless network). Presenting the first comment, the second comment, the third comment and the fourth comment in a chat during the presentation may involve the at least one processor displaying (via any method previously discussed for displaying to a presenter of the deck the first comment and second comment) a chat interface containing the information associated with each comment during the presentation. The chat interface may be visible to one or more presenters, one or more audience members, a combination thereof, or all presenters and all audience members. In some embodiments, the chat interface may be a chat box embedded in a presentation interface presenting the slides within a deck. In other embodiments, the chat interface may be a pop-up, a new window, or any other presentation of messages that include at least the first comment, the second comment, the third comment, and the fourth comment. Furthermore, presenting the first comment, the second comment, the third comment, and the fourth comment in a chat during the presentation may occur in real or near-real time. For example, the at least one processor may display in a chat interface a first comment within milliseconds, seconds, or another predetermined interval of receiving the first of the plurality of mobile communications devices. In some embodiments, the first comment, the second comment, third comment, and fourth comment (and any other messages) may be arranged in the chat interface in chronological order according to a timestamp associated with the respective comment or message. The timestamp may be metadata representing the time at which the at least one processor received the respective comment or message. The timestamps may or may not also be displayed with their respective comment or message in the chat interface. In further embodiments, the chat interface may include headings identifying the slide from which the first, second, third, or fourth comments are associated with. Furthermore, in some embodiments, the at least one processor may be configured to display each of the first comment, second comment, third comment, and fourth comment (and any other messages) in the chat interface for a predetermined time. For example, at least one processor may display a comment or message for ten seconds, at which point the comment or message may disappear from the chat interface. In other embodiments, the at least one processor may continually display a comment or message in a chat interface until receiving an instruction, via an interaction from an entity, to close the presentation file, or to clear or delete one or more comments or messages from the chat interface. In yet further embodiments, the at least one processor may store the chat in a repository for later retrieval by an entity, such as a presenter.

Referring again to FIG. 13, the presentation interface 1304 may include a chat box 1320 rendered on a display. In this example, the presenter 1308 may be presenting the first slide 1300. As previously discussed, the at least one processor (e.g., processing circuitry 110 of computing device 110 of FIG. 1) may receive from a first of a plurality of mobile communications devices a first instance of a first graphical code 1310 (or a decryption of the first graphical code 1310) and an associated first comment 1314*b*. Once the at least one processor receives the first comment 1314*b*, it may display this comment 1314*b* in the comment box 1320 under the heading 1326, "Slide 1." Similarly, while the presenter 1308 is presenting the first slide 1300, the at least one processor may subsequently receive and display a second comment 1318*b* in the comment box 1320 under the heading 1326, "Slide 1." When the presenter 1308 advances slides within the deck to present the second slide 1302, the chat box 1320 may still be displayed in the presentation interface 1304. The at least one processor may then receive from a third of a plurality of mobile communications devices a first instance of a second graphical code 1312 (or a decryption of the second graphical code 1312) and an associated third comment 1319. Once the at least one processor receives the third comment 1319, it may display this comment 1319 in the comment box 1320 under the heading 1328, "Slide 2." Similarly, while the presenter 1308 is presenting the second slide 1302, the at least one processor may subsequently receive and display a fourth comment 1321 in the comment box 1320 under the heading 1328, "Slide 2."

In some further embodiments, at least one processor may be configured to cause a first portion of a chat containing a first comment and a second comment to be co-presented in association with a first slide and to cause a second portion of the chat containing a third comment and a fourth comment to be co-presented in association with a second slide. Causing a first portion of the chat containing the first comment and the second comment to be co-presented in association with the first slide may involve displaying (via any method previously discussed for displaying to a presenter of the deck the first comment and second comment) the first comment and second comment in a chat interface when the first slide within the deck is displayed at the same time. This may occur during the presentation (i.e., while the presenter is presenting information from the first slide) or may occur after the presentation when the presenter or other entity access a deck containing the first slide and selects the first slide for display. When another slide (e.g., the second slide) within a deck is displayed, the co-presentation of the first comment and the second comment may or may not disappear from the chat interface, such as to only display comments associated with the other slide (e.g., the second slide). Causing a second portion of the chat containing the third comment and the fourth comment to be co-presented in association with the second slide may be carried out similarly to the discussion above for the first portion of the chat.

Referring again to FIG. 13, a presenter 1308 may present a first slide 1300 via a presentation interface 1304. The presentation interface 1304 may include a chat box 1320. The at least one processor (e.g., processing circuitry 110 of computing device 110 of FIG. 1) may display a first portion of the chat interface 1320 containing a co-presentation of a first comment 1314b and a second comment 1318b, received from a first and second of the mobile communications devices respectively, under a heading 1326, "Slide 1." In this example, a third comment 1319 and a fourth comment 1321 under a heading 1328, "Slide 2," may not be visible as the at least one processor may have not yet received these comments. When the presenter 1308 advances slides within the deck to present a second slide 1302, the at least one processor may display a second portion of the chat interface 1320 containing a co-presentation of a third comment 1319 and a fourth comment 1321, received from a third and fourth of the mobile communications devices respectively, under a heading 1328, "Slide 2." While the second slide 1302 is displayed, the co-presentation of the first comment 1314b and the second comment 1318b under the heading 1326, "Slide 1," may or may not be displayed with the co-presentation of the third comment 1319 and the fourth comment 1321, under the heading 1328, "Slide 2," in the chat box 1320.

Figure 15:
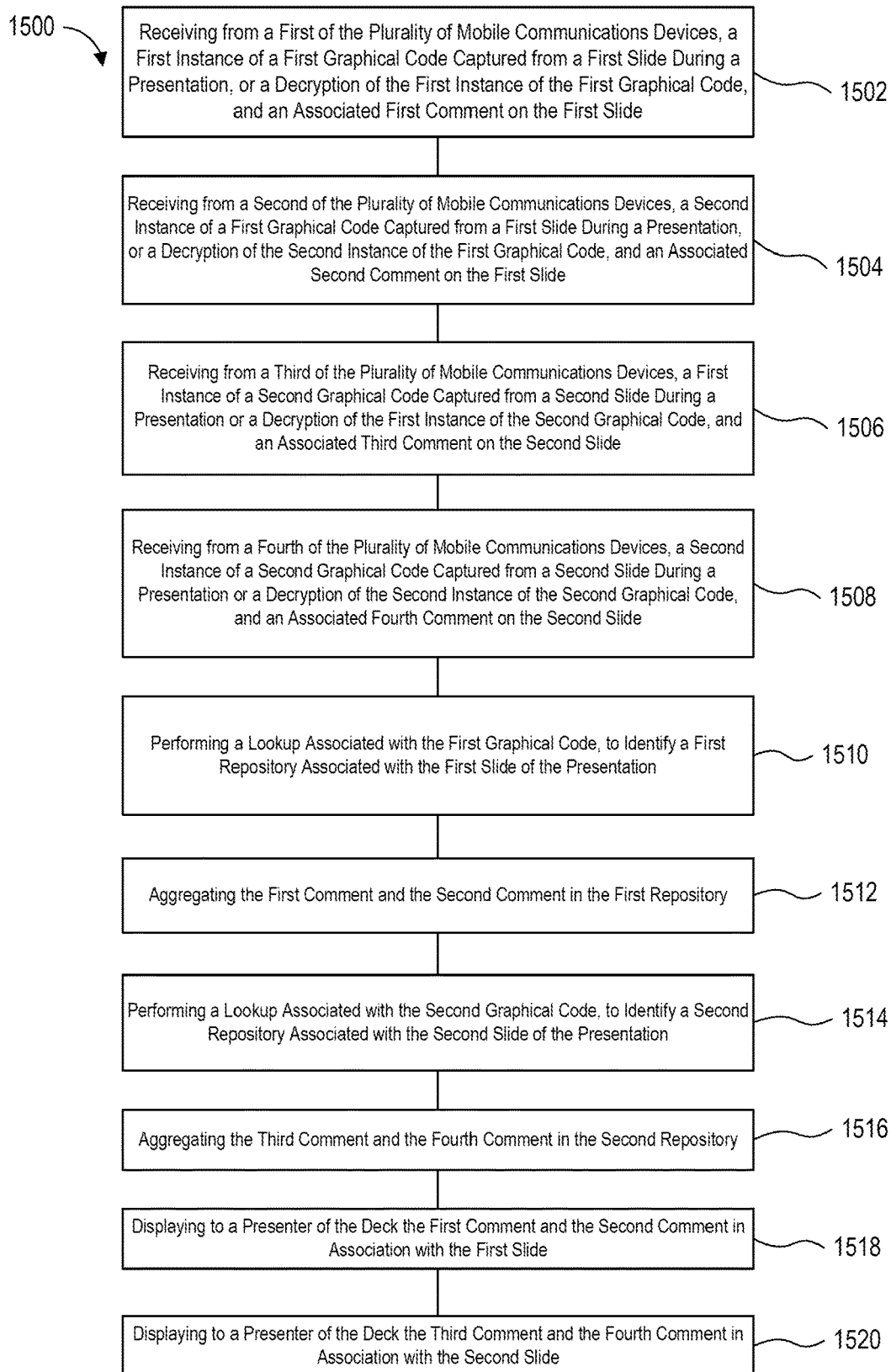
FIG. 15 illustrates a block diagram of an exemplary method performed by a processor of a computer readable medium containing instructions, consistent with some embodiments of the present disclosure.

FIG. 15 illustrates a block diagram for an exemplary method for enabling a plurality of mobile communications devices to be used in parallel to comment on presentation slides within a deck. Method 1500 may begin with process block 1502 by receiving from a first of the plurality of mobile communications devices, a first instance of a first graphical code captured from a first slide during a presentation, or a decryption of the first instance of the first graphical code, and an associated first comment on the first slide, as previously discussed. At block 1504, method 1500 may include receiving from a second of the plurality of mobile communications devices, a second instance of a first graphical code captured from a first slide during a presentation, or a decryption of the second instance of the first graphical code, and an associated second comment on the first slide, consistent with the disclosure above. At block 1506, method 1500 may include receiving from a third of the plurality of mobile communications devices, a first instance of a second graphical code captured from a second slide during a presentation or a decryption of the first instance of the second graphical code, and an associated third comment on the second slide, as previously discussed. At block 1508, method 1500 may include receiving from a fourth of the plurality of mobile communication devices, a second instance of a second graphical code captured from a second slide during a presentation or a decryption of the second instance of the second graphical code, and an associated fourth comment on the second slide, consistent with the disclosure above. At block 1510, method 1500 may include performing a lookup associated with the first graphical code, to identify a first repository associated with the first slide of the presentation, consistent with the disclosure above. At block 1512, method 1500 may include aggregating the first comment and the second comment in the first repository, as previously discussed. At block 1514, method 1500 may include performing a lookup associated with the second graphical code, to identify a second repository associated with the second slide of the presentation, consistent with the disclosure above. At block 1516, method 1500 may include aggregating the third comment and the fourth comment in the second repository, consistent with the disclosure above. At block 1518, method 1500 may include displaying to a presenter of the deck the first comment and the second comment in association with the first slide, consistent with the disclosure above. At block 1520, method 1500 may include displaying to a presenter of the deck the third comment and the fourth comment in association with the second slide, as discussed above.

Aspects of this disclosure may relate to a system for tagging, extracting, and consolidating information from electronically stored files. For ease of discussion, a system is described below, with the understanding that aspects of the system apply equally to non-transitory computer readable media, methods, and devices. As used herein, electronically stored files may refer to collections of data stored as units in memory, such as a local memory on a user device, a local network repository, a remote repository, or any other data storage device or system. Electronically stored files may be configured to store text data, image data, video data, audio data, metadata, a combination thereof, or any other data type. Non-limiting examples of electronically stored files may include document files, spreadsheet files, database files, presentation files, image files, audio files, video files, or any other collection of data stored as a unit in memory. Information, as used herein, may refer to any data associated with one or more electronically stored files. Information may include alphanumerics, words, text strings, sentences, paragraphs, graphics, audio, video, widgets, objects, tables, charts, links, animations, dynamically updated elements, a combination thereof, or any other data object in an electronically stored file. Information may also include metadata associated with a data object or an electronically stored file, the position of a data object, a heading associated with a data object, or any other characteristic that may be associated with a data object or an electronically stored file. In some embodiments, information may be organized in document portions, as described in detail below.

As used herein, tagging may include associating one or more characteristics (also referred to herein as "tags") with information in an electronically stored file. Characteristics, as used herein, may refer to any text (e.g., alphanumerics), codes, colors, shapes, audio, graphics, or any other data object or metadata that may identify or describe some or all of the information in an electronically stored file. For example, characteristics may identify or describe the information, an author or authors of the information, a status associated with the information (e.g., urgency and/or due date of a project), a date or time at which the information was generated, a location of a computing device when an author associated with the computing device generated the information, or any other feature, attribute, property, or quality of the information associated with an electronic word processing document. The characteristics may be stored as data and/or metadata in a data structure associated with the electronically stored file. A data structure, as used herein, may include any collection of data values and relationships among them. The data structure may be maintained on one or more of a server, in local memory, or any other repository suitable for storing any of the data that may be associated with information from the electronically stored file. Furthermore, tagging may occur manually by a user or may occur automatically by the system. For example, an electronically stored file may include one or more text strings related to brand awareness, and the system may enable a user to select the text strings and tag them with a characteristic, such as the text "marketing," which may be stored as metadata in a data structure associated with the electronically stored file. In another example, a user may generate a table in a collaborative electronic word processing document, and the system may automatically tag the table with a characteristic, such as the user's name, which may be stored as metadata and text data viewable in the document.

Extracting may refer to a process of obtaining or retrieving information from one or more information sources, such as any storage medium associated with electronically stored files, portions of a single electronically stored file, platforms, applications, live data feeds, or a combination thereof. Extracting may occur automatically, such as at a predetermined interval, or may occur in response to a user request. The system may extract information sharing one or more common characteristics. For example, an electronically stored file may contain information in the form of several data objects each having an associated characteristic. Some data objects may share a common characteristic, "soccer," and other data objects share a common characteristic, "basketball." The system may, for example, receive a request to extract the data objects sharing the common characteristic "soccer," from one or more data structures associated with the electronically stored file. In some embodiments, once information is extracted, the system may be configured to further process and/or store the extracted information.

As used herein, consolidating may refer to the process of combining and storing, or other aggregating information in a common location, such as in a common file. Consolidating may occur automatically, such as in response to an extracting step, or may occur in response to a user request with consolidation instructions. The common file may be any file type, as discussed above with reference to electronically stored files. A common file may include information extracted from one or more information sources, as well as other information. In some embodiments, the common file containing consolidated information may be configured to display or present at least some of the extracted information, which may be identical to the extracted information or may be shortened, abbreviated, modified, expressed in a synonymous or related manner, or otherwise differing manner while maintaining a related meaning to the extracted information. For example, the system may extract data objects with a common tag "soccer" and data objects with a common tag "basketball" from an electronically stored file and consolidate these data objects in a common file. The system may then associate document segments sharing the common tag "soccer" and document segments sharing the common tag "basketball." In response to receiving a request to open the common file, the system may display the file contents such that the associated document segments are grouped together.

Figure 16:
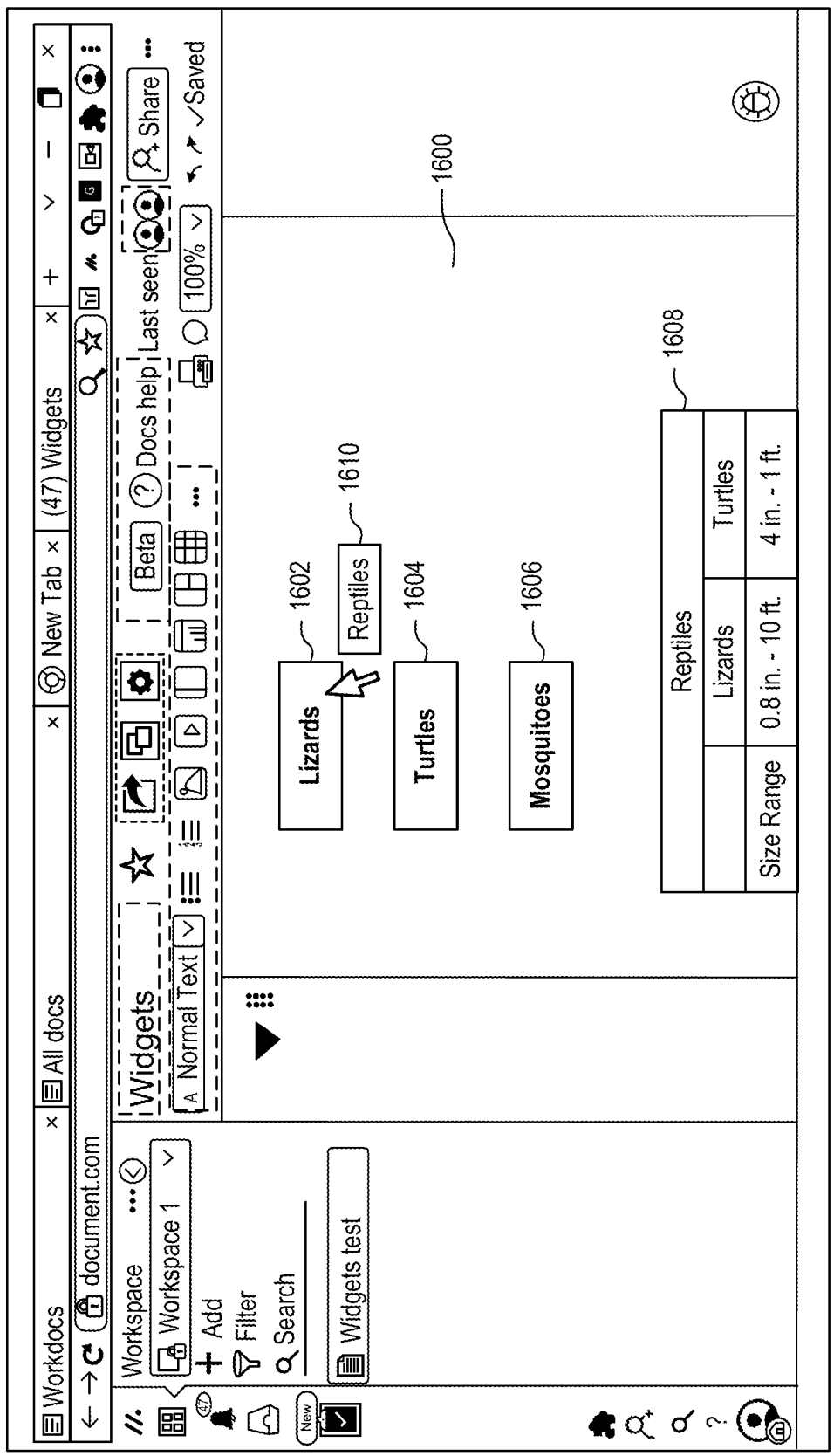
FIG. 16 illustrates one example of an electronically stored file containing tagged information, consistent with some embodiments of the present disclosure.
Figure 17:
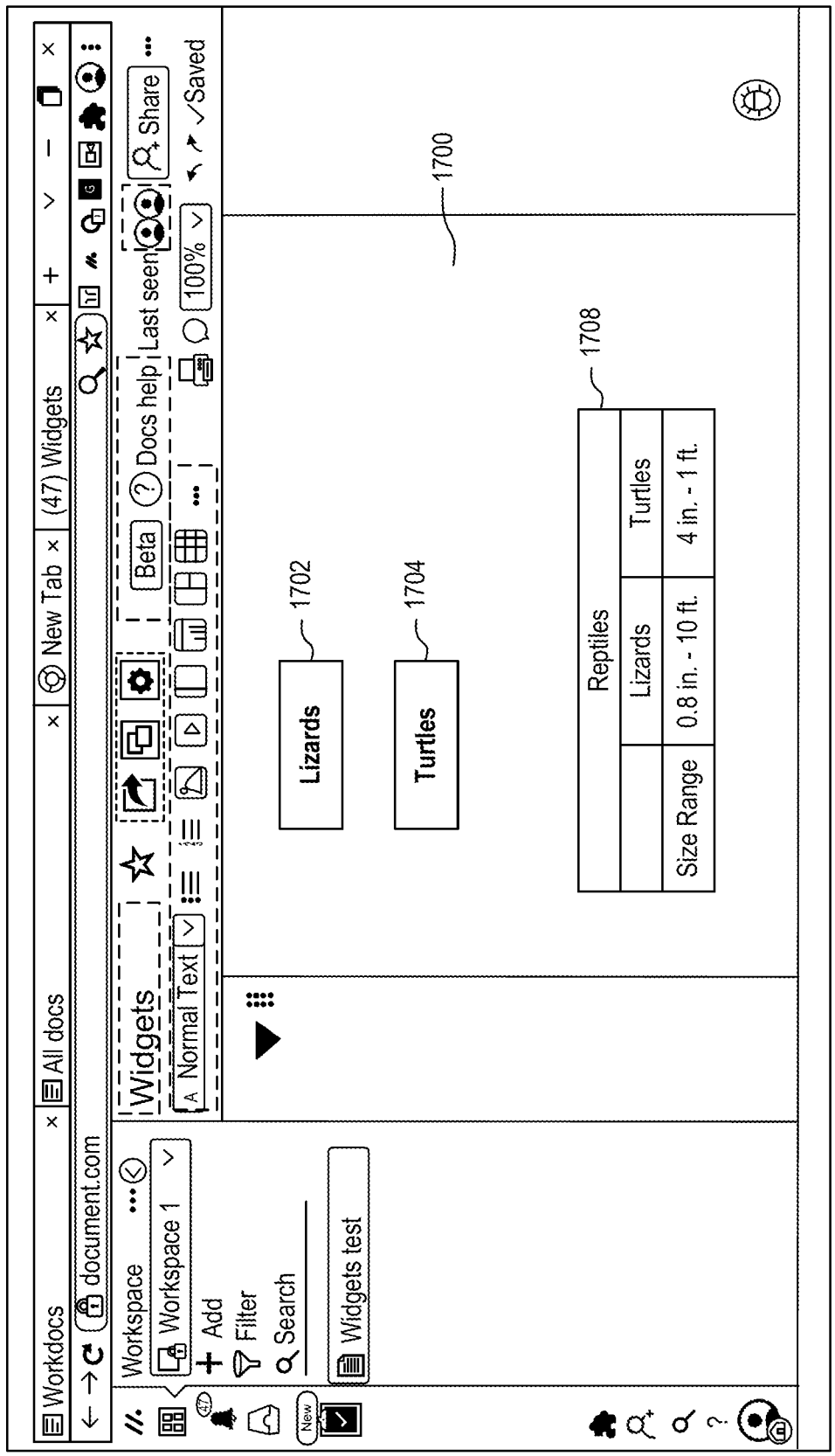
FIG. 17 illustrates one example of an electronically stored file containing information extracted from an electronically stored file, consistent with some embodiments of the present disclosure.

By way of example, FIG. 16 illustrates an example of an electronically stored file containing tagged information. The electronically stored file may be rendered on a display presenting an electronic word processing document 1600. The document 1600 may display information, such as objects 1602 to 1608. Objects 1602 to 1606 may be text strings including the words "Lizards," "Turtles," and "Mosquitoes," respectively, and object 1608 may be a table titled "Reptiles." The system may conclude based on a contextual determination that objects 1602, 1604, and 1608 include information related to reptiles and associate a common tag "reptiles" with those objects. Similarly, the system may conclude based on a contextual determination that object 1606 includes information related to insects and associate a tag "insects" with this object. The system may store each tag as metadata in memory, such as in one or more repositories (e.g., 230-1 through 230-*n* in FIG. 2). Alternatively, or additionally, each tag may be displayed in the document 1600, such as, for example, a mouseover text 1610, which may be rendered in response to a cursor hover or any other interaction with object 1602 containing the word "Lizards." The system may then extract and consolidate information sharing one or more common tags. For example, FIG. 17 illustrates an example of an electronically stored file containing information sharing the common tag "reptiles" extracted and consolidated from the electronic word processing document 1600 illustrated in FIG. 16. The electronically stored file may be an electronic word processing document 1700 or any other type of electronically stored filed, as discussed above. The document 1700 may include objects 1702, 1704, and 1708, each of which were tagged with the common characteristic "reptiles."

Some disclosed embodiments may include presenting to an entity viewing at least one source document a tag interface for enabling selection and tagging of document segments with at least one characteristic associated with each document segment. As used herein, an entity may refer to an individual, a device, a team, an organization, a group, a department, a division, a subsidiary, a company, a contractor, an agent or representative, or any other thing with independent and distinct existence. A source document, as used herein, may refer to any digital file in which information may be stored with and retrieved from. The information associated with a source document may include text, graphics, widgets, objects, tables, links, animations, dynamically updated elements, a combination thereof, or any other data object that may be used in conjunction with the digital file. The source document may further provide for input, editing, formatting, display, and output of information. Source documents are not limited to only digital files for word processing but may include any other processing document such as presentation slides, tables, databases, graphics, sound files, video files or any other digital document or file. Source documents may be collaborative documents or non-collaborative documents. A collaborative document, as used herein, may refer to any source document that may enable simultaneous viewing and editing by multiple entities. A collaborative document may, for example, be generated in or uploaded to a common online platform (e.g., a website) to enable multiple members of a team to contribute to preparing and editing the document. A non-collaborative document, as used herein, may refer to any source document that only a single entity may modify, prepare, and edit at a time. An entity viewing at least one source document, as used herein, may refer to any entity examining, observing, reading, looking at, inspecting, or otherwise accessing a source document from an associated computing device with a display configured to present information from the source document. An entity may view a source document display screen associated with the entity's computing device, such as a PC, laptop, tablet, projector, cell phone, or personal wearable device. An entity may also view a source document through a projection, an AR or VR display, or any other means enabling the entity to visually comprehend the information displayed in the source document.

Document segments, as used herein, may include at least some of the parts or sections into which a source document may be divided. Each document segment may include a visual display of information, such as text (e.g., alphanumerics), graphics, widgets, icons, tables, links, animations, dynamic elements, a combination thereof, or any other item or object that may be displayed in a segment of a source document. Moreover, each document segment may have associated metadata, such as descriptive metadata, structural metadata, administrative metadata, reference metadata, statistical metadata, legal metadata, or a combination thereof. Furthermore, each document segment may have an associated address that may identify a specific memory location, such as in a repository. In some exemplary embodiments, an associated address may be, for example, a fixed-length sequence of digits displayed and manipulated as unsigned integers that enables the system to store information associated with a document segment at a particular location designated by the associated address. Document segments may be manually defined by an entity according to preference or may be automatically defined by the system. For example, an entity may select any information and assign it as a document segment. Alternatively, the system may, for example, define document segments as information separated by a carriage return, information in separate columns, information in separate pages of a source document, similar data objects grouped together, or information grouped together in any other manner. Document segments may further be configured to enable an entity to alter the order or layout in which the segments appear in a source document.

A tag interface, as used herein, may refer to interactive features of a web page, a mobile application, a software interface, or any graphical user interface (GUI) that may enable interactions between an entity and information presented on a display of an associated computing device, for the purpose of enabling selection and tagging of document segments with at least one characteristic associated with each document segment. In some embodiments, a tag interface may be integrated in a software application presenting a source document, such as by embedding the tag interface in the application presenting a source document (e.g., as an add-on or add-in, or any other extension). In other embodiments, a tag interface may part of a stand-alone application that may be accessed from, for example, a link in the interface presenting a source document. The interactive features of a tag interface may include, for example, checkboxes, radio buttons, dropdown lists, windows, buttons, drop-down buttons, pop-up windows, text fields, a combination thereof, or any other elements with which an entity can interact. An entity may interact with the interactive elements of a tag interface by using any input device, such as a mouse, keyboard, touchscreen, microphone, camera, touchpad, scanner, switch, joystick, or any other appropriate input device. Presenting to an entity viewing at least one source document a tag interface, as used herein, may refer to displaying a tag interface on a display (physical or virtual) of a computing device associated with an entity. This may occur, for example, by outputting one or more signals configured to result in the display of a tag interface. A tag interface may be displayed, for example, on a computing device, such as a PC, laptop, tablet, projector, cell phone, or personal wearable device. A tag interface may also be displayed virtually through AR or VR glasses, as described herein. Other mechanisms of displaying may also be used to enable an entity to visually comprehend information associated with a tag interface. Presenting a tag interface and at least one source document to an entity may involve rendering this information in a display in response to the processor receiving instructions for accessing the at least one source document. Accessing the at least one source document may include retrieving the at least one source document from a storage medium, such as a local storage medium or a remote storage medium. A local storage medium may be maintained, for example, on a local computing device, on a local network, or on a resource such as a server within or connected to a local network. A remote storage medium may be maintained in the cloud, or at any other location other than a local network. In some embodiments, accessing the at least one source document may include retrieving the at least one source document from a web browser cache. Additionally or alternatively, accessing the at least one source document may include accessing a live data stream of the at least one source document from a remote source. In some embodiments, accessing the at least one source document may include logging into an account having a permission to access the document. For example, accessing the at least one source document may be achieved by interacting with an indication associated the at least one source document, such as an icon or file name, which may cause the system to retrieve (e.g., from a storage medium) a particular electronic word processing document associated with the indication.

Enabling selection, as used herein, may refer to allowing an entity to choose one or more document segments of information rendered on a display. In exemplary embodiments, an interface presenting the source document may enable selecting one or more document segments by highlighting, clicking, or touching the information in the one or more document segments with an input device, such as a mouse or touchscreen. In some other exemplary embodiments, an interface presenting the source document may enable selecting one or more document segments by typing, dragging, dropping, or using any mechanism to show a selection. The selection may involve any amount of information displayed in an electronic document such as a single character, a sentence, a paragraph, a page, or any combination thereof. Further, the selection may involve multiple selections from different portions of the same electronic document.

As used herein, enabling tagging of document segments with at least one characteristic associated with each document segment may refer to the processor providing the capability of associating one or more characteristics with each document segment, consistent with the disclosure above regarding tagging information from an electronically stored file. Tagging may occur manually by an entity or may occur automatically by the system. A characteristic (or tag) may include text, (e.g., alphanumerics), a color, a shape, audio, a graphic, or any other data object or metadata or any combination thereof that may identify or describe a document segment. For example, a characteristic may identify or describe the information in a document segment, an author or authors of the information in a document segment, a status associated with the information in a document segment (e.g., urgency and/or due date of a project), a date or time at which the information in a document segment was generated, a location of a computing device when an author associated with the computing device generated the information in a document segment, or any other feature, attribute, property, or quality of the information associated with a document segment. A characteristic (or tag) may be stored as data and/or metadata in a data structure associated with the tagged document segment. An electronic document may include any number of document segments, where each segment may be associated with one or more tags that may differ from the tags with other document segments in the same electronic document.

In an exemplary embodiment, an entity accessing a source document via a software application may be presented with information contained in the source document with an embedded tag interface may select one or more document segments, as explained above. A selected document segment may, for example, include information related to a specific project. The entity may tag the selected document segment with a characteristic associated with the document segment by using an input device to interact with interactive features of the tag interface. For example, the entity may select a due date from a date picker to tag the selected document segment with selected due date. The due date may be stored in a data structure (e.g., a repository) associated with the document segment and may be maintained as metadata and/or displayed as text, graphic, or other data object in the source document. In addition, the entity may, for example, tag a selected document segment with a color selected from a color palate, such that text displayed in the selected document segment is highlighted with the selected color.

In another exemplary embodiment, the processor may automatically tag selected document segments with at least one characteristic associated with each document segment according to user preferences. For example, an entity may interact with interactive features of the tag interface to instruct the processor to tag all document segments, and/or all document segments generated at a subsequent time, with at least one characteristic, such as a description of the information in a document segment based on contextual determination, or a date and/or time at which an entity generated or lasted edited the information in a document segment.

In some embodiments, an at least one characteristic may include a plurality of characteristics chosen from the group consisting of entities associated with document segments, descriptions associated with the document segments, time frames associated with the document segments, and locations associated with the document segments. As used herein, entities associated with the document segments may refer to entities (as described earlier) connected to document segments or otherwise having some relation to the document segments. An entity may be connected to a document segment, for example, if the document segment includes information identifying the entity, such as a name, an address, or an image. Furthermore, an entity may be connected to a document segment, for example, if the entity generated, edited, or accessed the information in the document segment, or otherwise has ownership of the information in the document segment or permissions to access the document or segments thereof. As used herein, descriptions associated with the document segments may refer to a type, kind, or class of information in connection with the document segments. For example, a description associated with a document segment may be the type of information in the document segment, such as text, a table, a chart, or any other data object. A description associated with a document segment may also, for example, be a summary or overview of the information in the document segment, such as "sports," "engineering projects," or "finances." Time frames associated with the document segments, as used herein, may refer to dates, times, or a periods of time associated with the document segments. For example, a time frame associated with a document segment may be a date on and/or time at which the information in the document segment was generated or last edited. A time frame associated with a document segment may also, for example, be a period of time that represents when a project associated with the information in the document segment must be completed and/or the time spent generating, inputting, and/or editing the information in the document segment. Locations associated with the document segments, as used herein, may refer to a particular place or position (e.g., geographical or digital/electronic) identified by information contained in document segments or a particular place or position of entities associated with in the document segments. For example, a location associated with a document segment may be Switzerland if the document segment contains text of an address in Switzerland. A location associated with a document segment may also, for example, be a location of a computing device (e.g., an IP address or a geographical location) when an entity associated with the computing device first or last generated, edited, or accessed the information in document segments.

Figure 18:
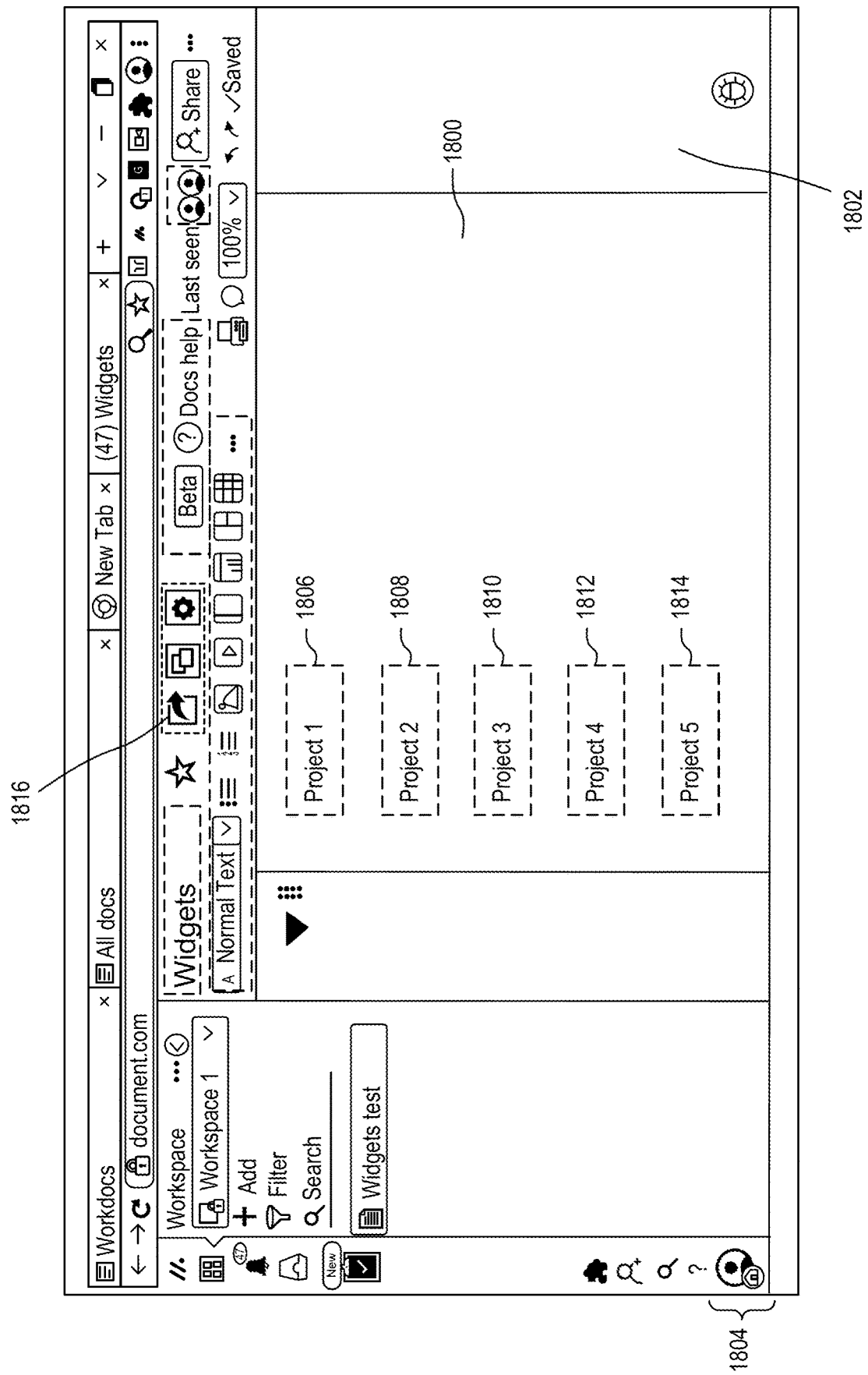
FIG. 18 illustrates one example of a source document presented by editing interface, which includes an embedded tag interface for enabling selection and tagging of document segments with characteristics associated with each document segment, consistent with some embodiments of the present disclosure.

By way of example, FIG. 18 illustrates one example of a source document 1800 presented by editing interface 1802, which includes an embedded tag interface for enabling selection and tagging of document segments with characteristics associated with each document segment. The document 1800 may include an indication of an entity 1804 accessing the document 1800 via an editing interface 1802, which may include an embedded tag interface. The document 1800 may include document segments 1806 to 1814, each related to a distinct project. The entity 1804 may select, for example, document segment 1806 containing the text "Project 1" by clicking any portion of document 1806 (or any other interaction such as a cursor hover) with an input device. The entity may then select icon 1816, which is an interactive feature of the tag interface embedded into the editing interface 1802, to open a pop-up window enabling the entity 1804 to tag the selected document segment 1806 with one or more characteristics associated with the selected document segment 1806.

Figure 19:
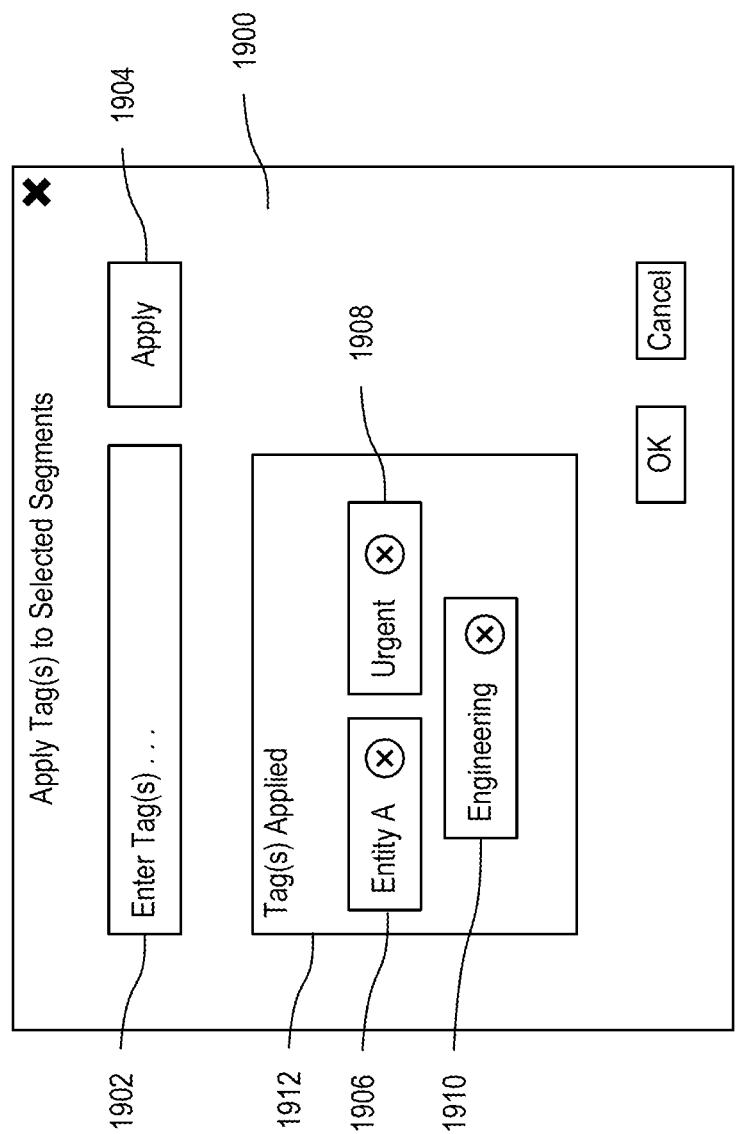
FIG. 19 illustrates one example of a tag interface feature for enabling tagging of document segments with one or more characteristics associated with each document segment, consistent with some embodiments of the present disclosure.

By way of example, FIG. 19 illustrates one example of a tag interface feature, such as pop-up window 1900, for enabling tagging document segment 1806 of FIG. 18 with one or more characteristics associated with each document segments. The pop-up window 1900 may include an input box 1902 in which entity 1804 (from FIG. 18) may input, text. For example, the entity 1804 may input "Entity A," which may be an entity associated with the document segment 1806 (e.g., Entity A may be responsible for completing "Project 1" from document segment 1806). The entity 1804 may then select an "Apply" button 1904 to tag the document segment 1806 with the characteristic "Entity A." The entity 1804 may similarly a tag document segment 1806 with additional characteristics, such as "Urgent," which may indicate the priority associated the document segment 1806, and "Engineering," which may be a description associated with document segment 1806 (e.g., "Project 1" from document segment 1806 is an engineering project). The tags 1906 to 1910 associated with document segment 1806 may be presented in a rendering of a display box 1906 of the pop-up window 1900. The entity 1804 may similarly tag the other document segments 1808 to 1814 (from FIG. 18) with at least one characteristic associated with each document segment. In response to receiving the applied tags, the system may store each tag in a data structure (e.g., in storage 130, repository 230-1, repository 230-n of FIGS. 1 and 2) associated with each respective document segment. In addition, each applied tag may be metadata associated with its corresponding document segment and/or may be a data object displayed in the source document.

Figure 20:
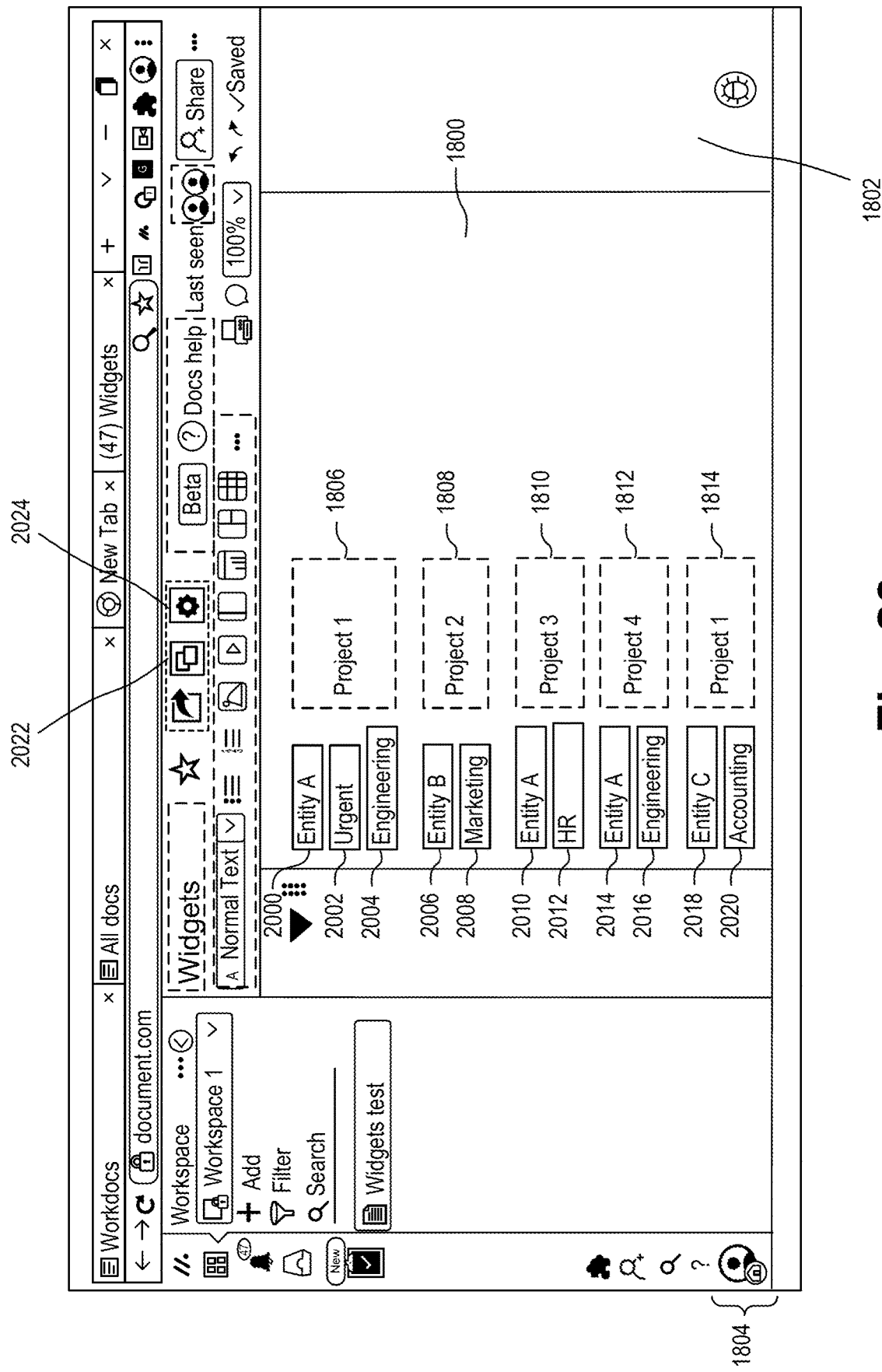
FIG. 20 illustrates one example of a source document with displayed tags associated with document segments, consistent with some embodiments of the present disclosure.

FIG. 20 illustrates one example of a source document 1800 (from FIG. 18) with tags 2000 to 2020 associated with document segments 1806 to 1814. The tags 2000 to 2020 may be displayed in a margin of the source document 1800 next to their associated document segment (e.g., a co-presentation). For example, tags 2000 to 2004 may be associated with document segment document segment 1806, and tags 2006 to 2008 may be associated with document segment 1808. The tags 2000 to 2020 may be rendered continuously, or may be rendered in response to an interaction with an activatable element, such as a setting (e.g., toggling on and off) or a visual indication of a document segment (e.g., document segment 1806). The tags 2000 to 2020 may become hidden in response to an instruction to remove their renderings from the display, which may be received by an input from a user, or from a lack of instruction over a period of time (e.g., a time out threshold).

Some disclosed embodiments may further include identifying tagged segments within an at least one source document. Tagged segments, as used herein, may refer to document segments of a source document that have at least one characteristic (or tag) associated with the document segments. If a document segment does not have at least one characteristic associated with it, the processor may assign a characteristic or tag to that document segment with information to indicate that the document segment lacks at least one characteristic, which as a result may also be considered a tagged segment. Identifying tagged segments within the at least one source document, may refer to an action, process, or instance of retrieving or searching in a data structure associated with document segments of one or more source documents to determine which document segments of a source document have at least one associated tag. For example, identifying tagged segments within the at least one source document may involve retrieving an address associated with a specific document segment in a source document, where the associated address may include an access point for a data structure containing information relating to the specific document segment and the source document. The system may then perform a lookup in the data structure to determine whether the specific document segment has at least one associated tag. Identifying tagged segments in one or more source documents may occur based on a predetermined interval, in response to a trigger activating a consolidation rule (discussed in detail below), in response to receiving an instruction from an entity (e.g., an entity interacting with a tag interface feature), in response to receiving an indication of a new tag associated with one or more document segments, and/or in response to receiving an indication of a modification to or deletion of an existing tag associated with one or more document segments.

Referring again to FIG. 20, the at least one processor may identify the tagged segments 1806 to 1814 by retrieving an associated address for each document segment 1806 to 1814 in the source document 1800. The at least one processor may then perform a lookup in a data structure (e.g., in storage 130, repository 230-1, repository 230-n of FIGS. 1 and 2) at access points determined by each address associated with the document segments 1806 to 1814 to determine that that each document segment 1806 to 1814 is a tagged segment.

Aspects of this disclosure may further include accessing a consolidation rule containing instructions for combining tagged segments. A consolidation rule, as used herein, may refer to an automation or logical rule for combining and storing at least some or all of the tagged segments, such as in a common document file (e.g., a tagged-based consolidation document, as discussed in detail below). The storing may occur at a common location, or some or all aspects of the tagged segments may be stored in a disbursed manner for later consolidation. In some embodiments, a consolidation rule may involve combining and storing all tagged segments. In other embodiments, a consolidation rule may involve combining and storing document segments tagged with one or more specific characteristics (e.g., document segments tagged with "urgent," with "urgent" and "engineering," or with "urgent" or "engineering"). In other embodiments, a consolidation rule may involve combining and storing all tagged segments. Additionally, a consolidation rule may associate document segments sharing common tags, as discussed in detail below. A consolidation rule may include default set of instructions that may be automatically associated with a source document or may be defined by an entity via a logical sentence structure, logical template, or any other manner of defining a process that responds to a trigger or condition. In some embodiments, an entity may access a consolidation interface to define a consolidation rule, as described in further detail below. As used herein, instructions for combining the tagged segments may refer to code in source code format, binary code format, executable code format, or any other suitable format of code that is associated with a logical rule that when executed by one or more processors, may cause the system to join, unite, associate at least some tagged segments in a common location, such as a common document file. As used herein, accessing a consolidation rule may refer to the processor performing a lookup and retrieving a consolidation rule from a data structure over a network connection or local connection. For example, a consolidation rule may be in a data structure stored in the form of a storage medium, such as a local storage medium or a remote storage medium, as discussed previously above. A local storage medium may be maintained, for example, on a local computing device, on a local network, or on a resource such as a server within or connected to a local network. A remote storage medium may be maintained in the cloud, or at any other location other than a local network. By way of example, the system may access the consolidation rule from a data structure (e.g., in storage 130, repository 230-1, repository 230-n of FIGS. 1 and 2) containing instructions for combining at least some tagged segments.

Some disclosed embodiments may further include implementing a consolidation rule to associate document segments sharing common tags. Implementing the consolidation rule, as used herein, may refer to executing the consolidation rule, as described above, containing instructions to combine and store at least some tagged segments in a common location, such as information in a common document file (e.g., a tagged-based consolidation document, as discussed in detail below), and associate document segments sharing common tags. Implementing the consolidation rule may occur in response to one or more triggering events (i.e., when a condition satisfies a threshold such as when a status is marked "complete"). For example, a consolidation rule may monitor one or more source documents for certain conditions to trigger the execution of the consolidation rule. In some embodiments, a tag interface may include an interactive icon feature that when interacted with (e.g., by an entity clicking or hovering over the icon with a cursor) may trigger the execution of a consolidation rule. In other embodiments, tagging a document segment with a characteristic, and/or a modifying or deleting an existing tagged segment, may trigger the execution of a consolidation rule. In further embodiments, identifying tagged segments within one or more source documents, as explained above, may trigger the execution of a consolidation rule. Document segments sharing common tags, as used herein, may refer to document segments associated with identical, similar, or related tags. For example, a consolidation rule may include instructions to combine and store document segments that share a tag "soccer." In another example, a consolidation rule may include instructions to combine and store document segments that share either a tag "soccer" or a tag "basketball." In yet another example, a consolidation rule may include instructions to combine and store document segments that share both a tag "soccer" and a tag "basketball" The processor may also have a consolidation rule that may include instructions to combine document segments that share "soccer" and "basketball" tags because the processor may automatically recognize the information in each tag to be associated with sports. Associating document segments sharing common tags may refer to linking, connecting, joining, or coupling information or data associated with document segments sharing common tags. In one example, a consolidation rule may include instructions to combine and store document segments sharing a common "urgent" tag, and the document segments sharing the common "urgent" tag may be associated by linking the document segments, or by assigning a common code, address, or other designation to the document segments in a non-transitory computer-readable medium. In another example, a consolidation rule may include instructions to combine and store document segments sharing both common tags "soccer" and "basketball," and document segments sharing both common tags "baseball" and "rugby" because each of these tags relate to sports. The document segments sharing the common tags "soccer" and "basketball" may be associated by linking the document segments, or by assigning a common code, address, or other designation to the document segments in a non-transitory computer-readable medium; and the document segment sharing the common tags "baseball" and "rugby" may be similarly associated.

Returning again to FIG. 20, a consolidation rule associated with the source document 1800 may include a set of instructions that, when executed, combine and store all tagged segments 1806 to 1814, and associate the document segments 1806 to 1814 sharing common tags. In response to the entity 1804 selecting an icon 2022 of the tag interface, the system may execute the consolidation rule. The system may access the consolidation rule from a data structure (e.g., in storage 130, repository 230-1, repository 230-n of FIGS. 1 and 2) associated with the source document 1800 to carry out specific consolidation actions according to the consolidation rule. For example, the consolidation rule may include a logical rule to associate the document segments for "project 1" 1806, "project 2" 1810, and "project 3" 1812 based on a logical rule that each of these document segments are tagged with an "Entity A" tag 2000, 2010, and 2014.

Aspects of this disclosure may further include outputting for display at least one tagged-based consolidation document grouping together commonly tagged document segments. A tagged-based consolidation document, as used herein, may refer to a file that is configurable to store information and data from the document segments sharing common tags. A tagged-based consolidation document may further provide for input, editing, formatting, display, and output of information, including information associated with the commonly tagged document segments from the one or more source documents. A tagged-based consolidation document is not limited to only digital files for word processing but may include any other processing document such as presentation slides, tables, databases, graphics, sound files, video files or any other digital document or file. In some embodiments, the at least one tagged-based source document may be a new document generated by the at least one processor when a consolidation rule is implemented. In other embodiments, the at least one tagged-based source document may be an existing document, which may be one or more source documents. For example, a consolidation rule may include migrating information associated with the document segments sharing common tags from one file location (e.g., a source document file) to another file location (e.g., an existing document file). Outputting for display at least one tagged-based consolidation document, as used herein, may refer to producing, delivering, or otherwise transmitting one or more signals configured to result in the presentation of at least one tagged-based consolidation document on a screen, other surface, through a projection, or in a virtual space. Outputting for display at least one tagged-based consolidation document may occur in response to implementing the consolidation rule or may occur in response to receiving a request to open a tagged-based consolidation document. Furthermore, outputting for display at least one tagged-based consolidation document may occur, for example, on one or more of a touchscreen, a monitor, AR or VR display, or any other means previously discussed and discussed further below. The at least one tagged-based consolidation document may be presented, for example, via a display screen associated with an entity's computing device, such as a PC, laptop, tablet, projector, cell phone, or personal wearable device. The at least one tagged-based consolidation document may also be presented virtually through AR or VR glasses, or through a holographic display. Other mechanisms of presenting may also be used to enable the entity to visually comprehend the presented information. The at least one tagged-based consolidation document may appear as a new window, as a pop-up, or in other manner for presenting the document on a display associated with an entity. As used herein, grouping together commonly tagged document segments may refer to the process of assembling, arranging, aggregating, or organizing document segments in a manner in which commonly tagged segments may be displayed as a collection of document segments. In one example, grouping together commonly tagged document segments may involve displaying one group of commonly tagged segments in a first list and a second group of commonly tagged segments in a second list. In another example, grouping together commonly tagged document segments may include displaying one group of commonly tagged segments on a first presentation slide and a second group of commonly tagged segments on a second presentation slide. In yet another example, grouping together commonly tagged document segments may include displaying one group of commonly tagged segments in cells of a first table column and displaying a second group of commonly tagged segments in cells of a second table column.

Figure 21:
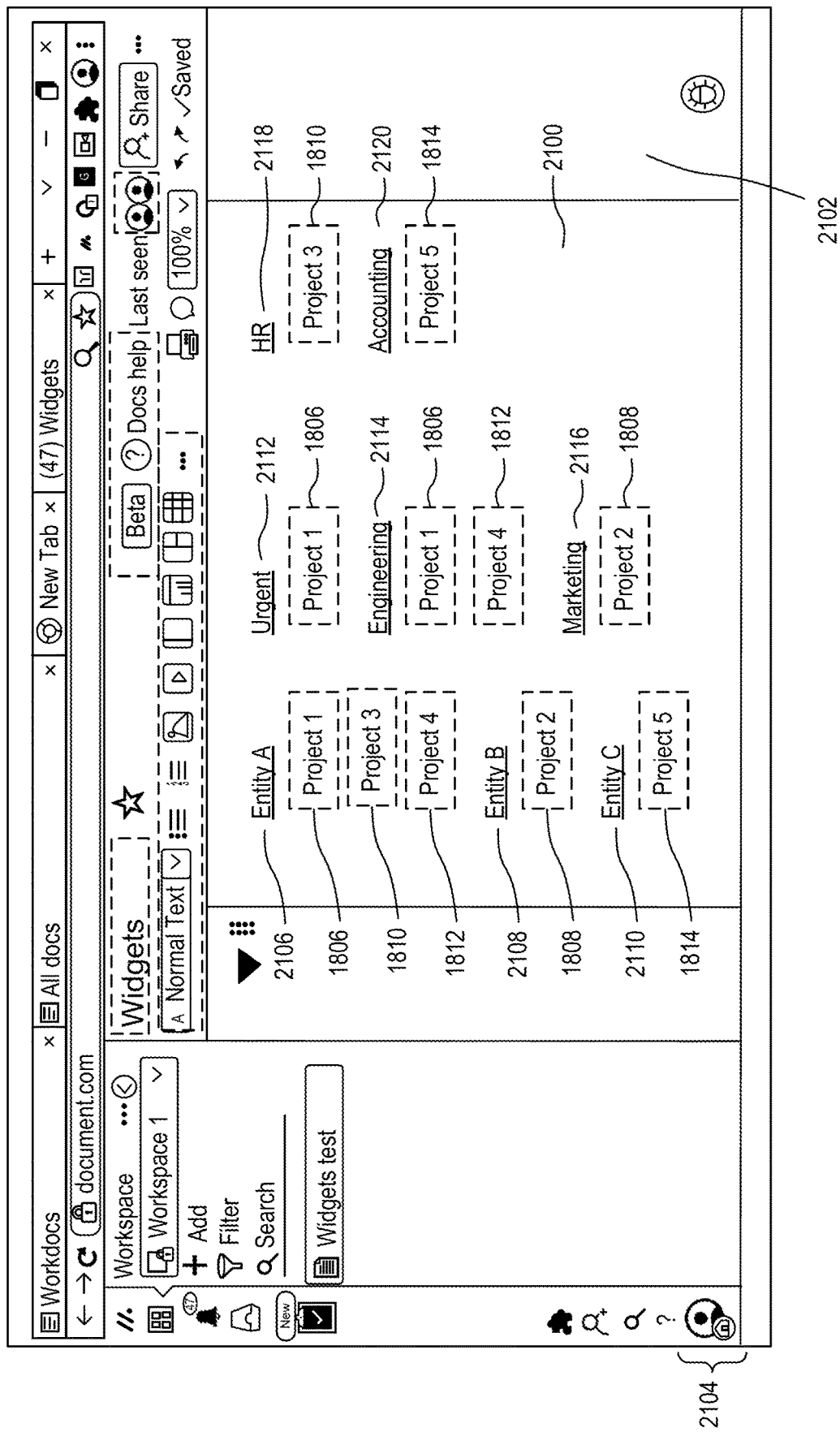
FIG. 21 illustrates one example of a tagged-based consolidation document grouping together commonly tagged documents segments from a source document, consistent with some embodiments of the present disclosure.

By way of example, FIG. 21 illustrates an example of a tagged-based consolidation document 2100 grouping together commonly tagged documents segments 1806 to 1814 from the source document 1800 illustrated in FIGS. 18 and 20. The tagged-based consolidation document may include headings 2106 to 2120 representing each of the tags associated with document segments 1806 to 1814 from the source document 1800 illustrated in FIGS. 18 and 20. The tagged-based consolidation document may further include document segments sharing common tags below each heading 2106 to 2120. For example, tagged segments 1806, 1810, and 1812 each share a common tag "Entity A" and therefore are grouped together below the "Entity A" heading 2106. Similarly, for example, tagged segments 1806 and 1812 each share a common tag "Engineering" and therefore are grouped together below the "Engineering" heading 2114. The processor may group document segments based on one or more tags according to any consolidation rule and may re-render a display to consolidate and group the document segments into other organizations in response to receiving a new consolidation rule.

In some embodiments, an at least one source document may include a plurality of source documents, and a tagged-based consolidation document may include document segments from a plurality of source documents. A plurality of source documents, as used herein, may refer to at least two distinct source documents. Document segments from the plurality of source documents, as used herein, may refer to at least one document segment from each of the plurality of source documents. For example, each of the plurality of source documents may include one or more tagged segments, and a consolidation rule hosted by a platform may combine and store at least some of the tagged segments and associate the combined and stored document segments sharing common tags, consistent with the above disclosure. In some embodiments, the processor may map the plurality of source documents to a consolidation rule either automatically (e.g., by detecting the plurality of source documents available in a repository or workspace), or manually (e.g., a user selects the particular plurality of source documents that the consolidation rule may apply to). Similarly, the consolidation rule may be mapped to a single source document that may be associated with other source documents, to thereby map the other source documents automatically to the consolidation rule.

Returning again to FIG. 20, source document 1800 may be an example of one source document. By way of example, FIG. 22 may be an example of a second source document 2200. The second source document 22 may include document segments 2202 and 2204. Document segment 2202 may include a graph and a chart and may have been tagged with characteristics "urgent" and "finance." Document segment 2204 may include a table and may have been tagged with a characteristic "marketing." In response to receiving the applied tags, the system may store each tag as metadata in a data structure (e.g., in storage 130, repository 230-1, repository 230-n of FIGS. 1 and 2) associated with each respective document segment. An entity may access a consolidation interface (not pictured but discussed in detail below) to define a consolidation rule associated with the source documents 1800 and 2200 that may include a set of instructions that, when executed, combine and store document segments tagged with both characteristics "engineering" and "urgent" in a new document (e.g., the tagged-based consolidation document in FIG. 23, discussed below). The consolidation rule may be implemented in response to a trigger, such as in response to an entity selecting an icon 2022 (from FIG. 20) or an icon 2206 (from FIG. 22) of the tag interface.

Figure 22:
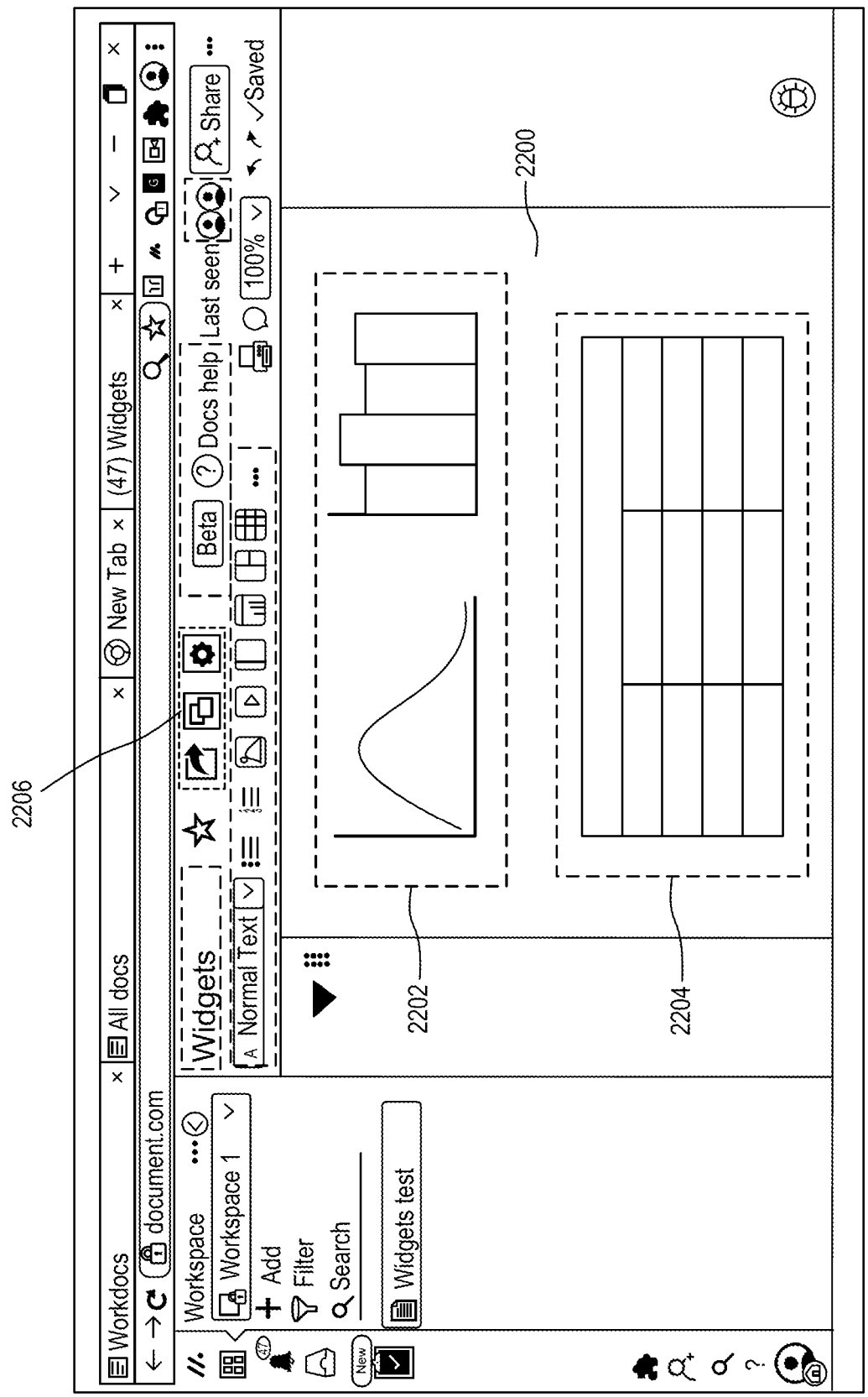
FIG. 22 illustrates one example of a second source document with tags maintained as metadata, consistent with some embodiments of the present disclosure.
Figure 23:
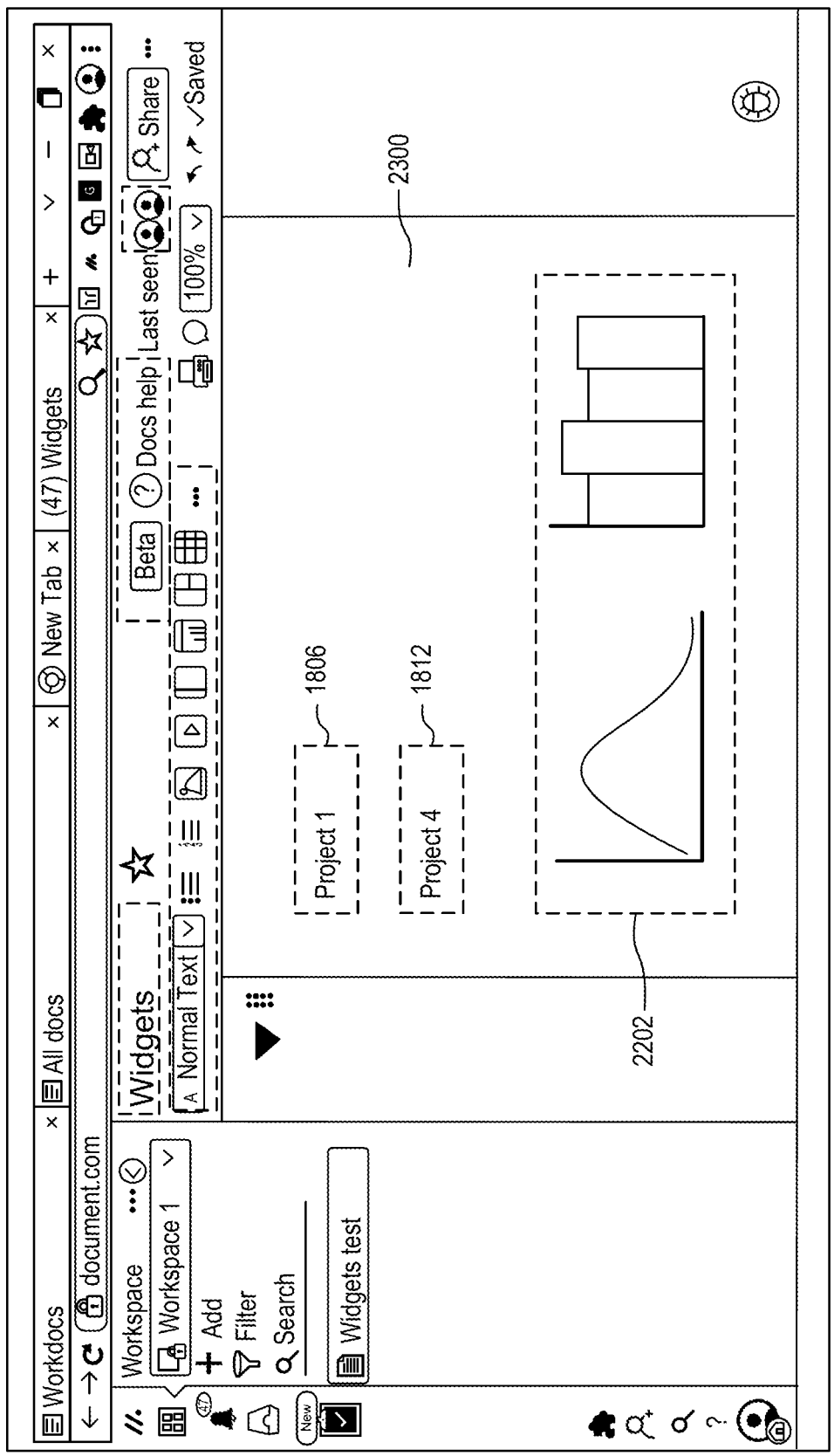
FIG. 23 illustrates one example of a tagged-based consolidation document including document segments from a plurality of source documents, consistent with some embodiments of the present disclosure.

By way of example, FIG. 23 illustrates one example of a tagged-based consolidation document 2300 including document segments from a plurality of source documents 1800 (from FIGS. 18 and 20) and 2200 (from FIG. 22). The tagged-based consolidation document 2300 includes document segments sharing the common tags "engineering" and "urgent," namely document segments "Project 1" 1806 and "Project 4" 1812 from the source document 1800 (from FIGS. 18 and 20) and document segment 2202 from the source document 2200 (from FIG. 22).

In additional embodiments, the at least one tagged-based consolidation document may include at least one heading of an associated tag, and associated tag segments beneath the at least one heading. A heading of an associated tag, as used herein, may refer to a label referencing the information contained in a tag that document segments may share in common with each other. In some embodiments, a heading of an associated tag may be the exact tag shared by document segments. For example, one or more document segments may share the common tag "Germany," and a heading of an associated tag may be "Germany." In another example, one or more document segments may share the common tags "Germany" and a shape, such as a square, and a heading of an associated tag may be "Germany" and a square. In other embodiments, a heading of an associated tag may differ from the tag shared by document segments. For example, a common code may link them. One or more document segments may share common "Urgent" tags, with text in the document segments highlighted in yellow, and a heading of an associated "Urgent" tag highlighted in yellow. In another example, one or more document segments may share common tags "Urgent" or "Engineering," with a heading of an associated tag labeled "Engineering Projects and Urgent Projects." As used herein, associated tag segments beneath the at least one heading may refer to displaying document segments sharing common tags below, beside, or otherwise surrounding a heading of an associated tag. For example, a heading of an associated tag may be displayed at the top of a vertical list, and document segments sharing a tag associated with the heading may be displayed below the heading. In another example, a heading of an associated tag may be displayed in a cell of a table, and document segments sharing a tag associated with the heading may be displayed in cells of a column or row containing the heading. In yet another example, a heading of an associated tag may be displayed as a title of a presentation slide, and document segments sharing a tag associated with the heading may be displayed in the body of the presentation slide.

Returning again to FIG. 21, the tagged-based consolidation document 2100 may include headings of an associated tag 2106 to 2120. For example, document segments "Project 1" 1806, "Project 3" 1810, and "Project 4" 1812 (from FIGS. 18 and 20) were tagged with a common characteristic "Entity A," and are displayed beneath a heading of an associated tag "Entity A" 2106.

In some exemplary embodiments, the consolidation rule may include a transmissions component for transmitting the tagged-based consolidation document to at least one designated entity. A transmissions component, as used herein, may refer to an instruction, associated with the consolidation rule, to send or transfer information from one device to another device. For example, a transmissions component associated with a consolidation rule may involve sending an email to at least one designated entity with the tagged-based consolidation document as an attachment to the email. In other embodiments, the transmissions component may involve sending a notification to indicate that the tagged-based consolidation document has been generated, but store the tagged based consolidation document in a repository for later retrieval by at least one designated entity. At least one designated entity, as used herein, may refer to any entity that is assigned to receive transmitted information. A designated entity may automatically selected by the system or may be manually selected by another entity. For example, the system may configure the consolidation rule to transmit information to other workflow participants (i.e., other members of a team cooperating via a common online platform), or an entity may, for example, input an external address associated with a designed entity to which information may be transmitted. As used herein, transmitting the tagged-based consolidation document may refer to sending or transferring the tagged-based consolidation document from one device to another device (e.g., a computer, smartphone, or tablet) associated with at least one designated entity. Transmitting the tagged-based consolidation document may involve transmitting the document itself or transmitting a link to access the document, for example, via a web application. Furthermore, transmitting the tagged-based consolidation document may be carried out through a local or remote network and/or through wired or wireless connections. Transmitting the tagged-based consolidation document may also occur within the platform that hosts the consolidation rule. Such transmitting may occur directly or indirectly.

Direct transmission may occur if the transmission mechanism is incorporated into the consolidation rule itself. Indirect transmission may occur if the consolidation rule links to a proprietary or third-party communications platform (e.g., email, SMS, or other communications application), and through the link relays information to the communications platform for transmission.

In some exemplary embodiments, the at least one processor may be further configured to present a consolidation interface for enabling definition of the consolidation rule. A consolidation interface, as used herein, may refer to interactive features of a web page, a mobile application, a software interface, or any graphical user interface (GUI) that enable interactions between an entity and a device, for the purpose of enabling definition of the consolidation rule. In some embodiments, a consolidation interface may be integrated in the tag interface, which may be embedded in a software application presenting a source document, a previously discussed. In other embodiments, a consolidation interface may part of a stand-alone application that may be accessed from, for example, a link in the interface presenting a source document. As used herein, presenting a consolidation interface may refer to displaying a consolidation interface on a screen of a computing device associated with an entity. This may occur, for example, by outputting one or more signals configured to result in the display of a consolidation interface. A consolidation interface may be displayed, for example, on a computing device, such as a PC, laptop, tablet, projector, cell phone, or personal wearable device. A consolidation interface may also be displayed virtually through AR or VR glasses. Other mechanisms of displaying may also be used to enable an entity to visually comprehend information associated with a consolidation interface. As used herein, enabling definition of the consolidation rule may refer to permitting an entity to generate and customize a consolidation rule by interacting with interactive features of the consolidation interface. In some embodiments, a consolidation interface may present a logical sentence structure or logical template (e.g., automations) and/or other interactive features, such as radio buttons, checkboxes, input boxes, and/or drop-down menus.

Returning again to FIG. 20, the source document 1800 may be presented by editing interface 1802, which includes an embedded tag interface. The embedded tag interface may include an incorporated consolidation interface. For example, an entity 1804 accessing the source document 1800 may select icon 2024 to open a pop-up window enabling the entity 1804 to access tagging preferences and consolidation preferences and define consolidation rules.

Figure 24:
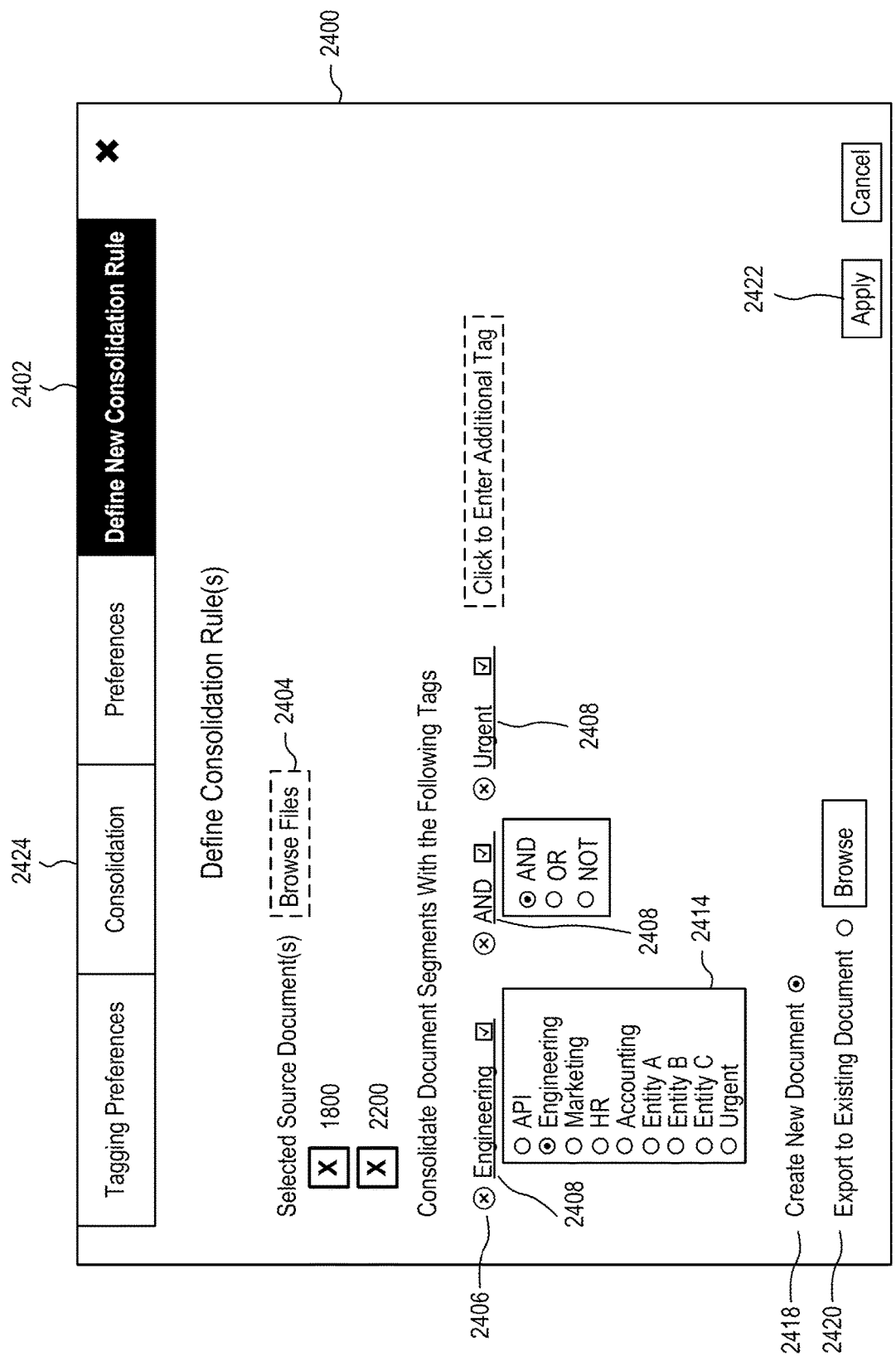
FIG. 24 illustrates one example of a consolidation interface for enabling definition of a consolidation rule, consistent with some embodiments of the present disclosure.

By way of example, FIG. 24 illustrates one example of such a pop-up window 2400 containing a consolidation interface for enabling definition of a consolidation rule. In this example, the entity 1804 may select the "Define New Consolidation Rule" tab 2402. The pop-up window 2400 may include a "Browse Files" button enabling the entity 1804 to select one or more source documents to include in a consolidation rule. In this example, the entity 1804 has selected source document 1800 (from FIGS. 18 and 20) and source document 2200 (from FIG. 22). The pop-up window 2400 may also include logical template 2406 that may enable the entity 1804 to define which tags to include in the consolidation rule. The logical template 2406 may include fill-in-the-blank components 2408 to 2412 that include drop-down menus. For example, fill-in-the-bank component 2408 may include a drop-down menu 2414 that may contain each of the tags assigned to document segments in the selected source documents 1800 and 2200 (e.g., by performing a lookup of all tagged detected in the source document and presenting the tags in the drop down menu); whereas fill-in-the-blank component 2410 may include a drop-down menu 2416 that may include Boolean commands. In this example, the entity 1804 used the logical template 2406 to consolidate document segments from the source documents 1800 and 2200 that share the common tags "Engineering" and "Urgent." Furthermore, the pop-up window 2400 may include radio buttons 2418 and 2420 that enable the entity 1804 to consolidate these documents segments in a new document or in an existing document. In this example, the entity 1804 has selected ratio button 2418 corresponding to "Create New Document." The entity 1804 may then selected an "Apply" button 2422 to apply the consolidation rule. In response to receiving the consolidation rule, the system may display this consolidation rule and previously defined consolidation rules in a window displayed when the "Consolidation Preferences" tab 2424 is selected.

Returning to FIG. 23, the tagged-based consolidation document 2300 may be one example of a tagged-based consolidation document generated by implementation of the consolidation rule defined via the consolidation interface in FIG. 24. The tagged-based consolidation document 2300 includes document segments sharing the common tags "engineering" and "urgent," namely document segments 1806 and 1812 from the source document 1800 (from FIGS. 18 and 20) and document segment 2202 from the source document 2200 (from FIG. 22).

In further exemplary embodiments, a consolidation interface may permit generation of the consolidation rule in a manner permitting consolidation of document segments based on more than one of the plurality of the characteristics. As used herein, permitting generation of the consolidation rule may be carried out consistent with the disclosure above for enabling definition of the consolidation rule. As used herein, permitting consolidation of document segments based on more than one of the plurality of the characteristics may refer to combining and storing document segments tagged with more than one characteristic, as previously discussed. For example, a consolidation interface may enable an entity to select document segments tagged with both "soccer" and "basketball," or documents segments tagged with "soccer" or "basketball." In another example, a consolidation interface may enable an entity to select document segments tagged with both "soccer" and "basketball," and document segments tagged with "baseball" and "rugby." In this example, the consolidation rule may associate document segments sharing the common tags "soccer" and "basketball" and associate the document segments sharing the common tags "baseball" and "rugby." A tagged-based consolidation document may then group together the document segments sharing the common tags "soccer" and "basketball" and the document segments sharing the common tags "baseball" and "rugby."

Returning again to FIG. 24, the consolidation interface illustrated in pop-up window 2400 may enable consolidation of document segments based on more than one of the plurality of characteristics. For example, the pop-up window 2400 may include a logical template 2406 that may enable selection of more than one characteristic, such as "Engineering" and "Urgent," as illustrated.

Figure 25:
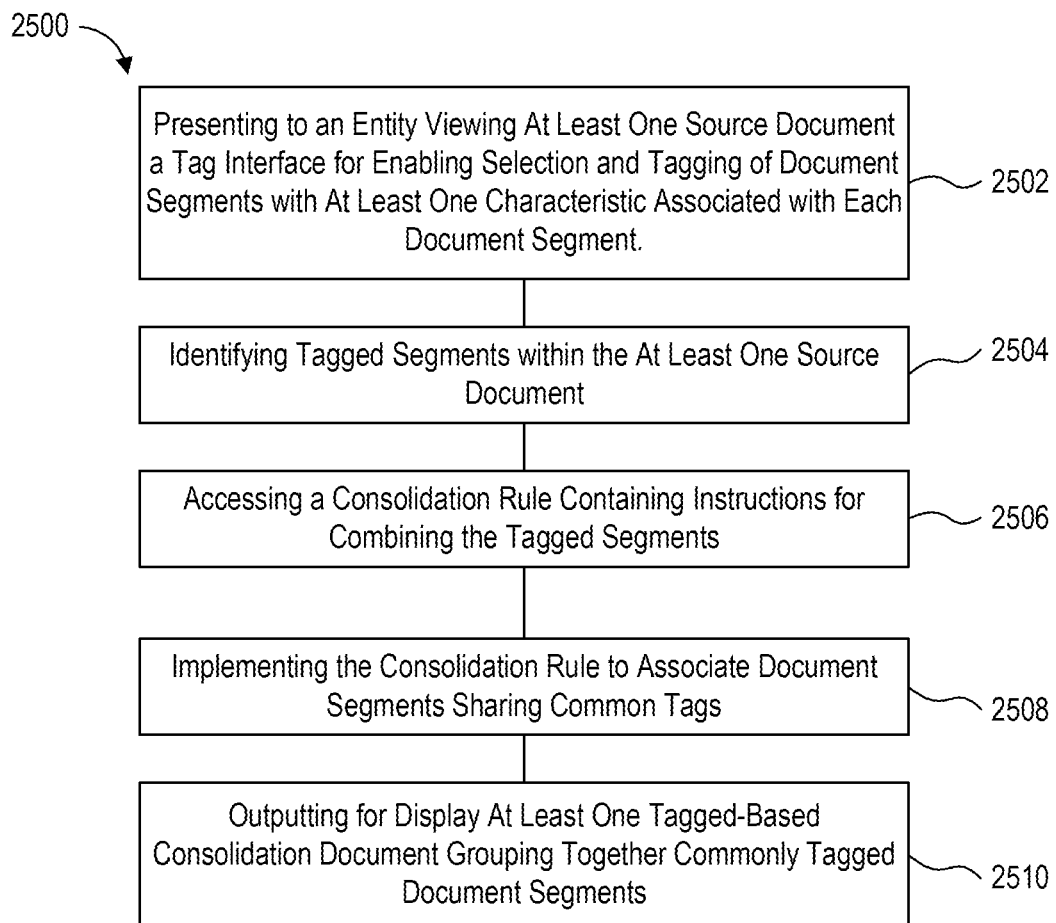
FIG. 25 illustrates a block diagram of an exemplary method performed by a processor of a computer readable medium containing instructions, consistent with some embodiments of the present disclosure.

By way of example, FIG. 25 illustrates a block diagram for an exemplary method for tagging, extracting, and consolidating information from electronically stored files, consistent with some embodiments of the present disclosure. Method 2500 may begin with process block 2502 by presenting to an entity viewing at least once source document a tag interface for enabling selection and tagging of document segments with at least one characteristic associated with each document segment, as previously discussed. At block 2504, method 2500 may include identifying tagged segments within the at least one source document, consistent with the disclosure discussed above. At block 2506, method 2500 may include accessing a consolidation rule containing instructions for combining the tagged segments, consistent with the disclosure above. At block 2508, method 2500 may include implementing the consolidation rule to associate document segments sharing common tags, as previously discussed. At block 2510, method 2500 may include outputting for display at least one tagged-based consolidation document grouping together commonly tagged document segments, consistent with the disclosure above.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Disclosed embodiments may include any one of the following bullet-pointed features alone or in combination with one or more other bullet-pointed features, whether implemented as a method, by at least one processor, and/or stored as executable instructions on non-transitory computer-readable media:

enabling access to an electronic word processing document including blocks of text;
wherein each block of text has an associated address;
accessing at least one data structure containing block-based permissions for each block of text;
wherein the permissions include at least one permission to view an associated block of text;
receiving from an entity a request to access the electronic word processing document;
performing a lookup in the at least one data structure to determine that the entity lacks permission to view at least one specific block within the electronic word processing document;
causing to be rendered on a display associated with the entity, the electronic word processing document with the at least one specific block omitted from the display;
wherein the electronic word processing document includes graphical objects, and wherein the block-based permissions include restrictions on viewing the graphical objects;
wherein the at least one data structure is configured to maintain identities of document authors;
wherein the document authors are enabled to define the block permissions;
wherein the electronic word processing document is a collaborative document;
receiving an added block from an editing entity;
enabling the editing entity to set block permissions for the added block;
permitting the editing entity to set a permission blocking an author of the document from viewing the added block;
wherein the data structure includes separate permissions for viewing and editing;
performing a look up of viewing and editing permissions associated with a particular collaborative user who, for a particular block, has viewing permissions and lacks editing permissions;
rendering the particular block on a display associated with the collaborative user in a manner permitting viewing of the particular block while preventing editing of the particular block;
wherein each address includes at least one of a block-associated tag, block-associated metadata, or a block-associated location;
wherein an absence of a recorded permission in the at least one data structure for a particular block constitutes an unrestricted permission for the particular block;
receiving from a first of the plurality of mobile communications devices, a first instance of a first graphical code captured from a first slide during a presentation, or a decryption of the first instance of the first graphical code, and an associated first comment on the first slide;
receiving from a second of the plurality of mobile communications devices, a second instance of the first graphical code captured from the first slide during the presentation or a decryption of the second instance of the first graphical code, and an associated second comment on the first slide;
receiving from a third of the plurality of mobile communications devices, a first instance of a second graphical code captured from a second slide during the presentation or a decryption of the first instance of the second graphical code, and an associated third comment on the second slide;
receiving from a fourth of the plurality of mobile communications devices, a second instance of the second graphical code captured from the second slide during the presentation or a decryption of the second instance of the second graphical code, and an associated fourth comment on the second slide;
performing a lookup associated with the first graphical code, to identify a first repository associated with the first slide of the presentation;
aggregating the first comment and the second comment in the first repository;
performing a lookup associated with the second graphical code, to identify a second repository associated with the second slide of the presentation;
aggregating the third comment and the fourth comment in the second repository;
displaying to a presenter of the deck the first comment and the second comment in association with the first slide;
displaying to the presenter of the deck, the third comment and the fourth comment in association with the second slide;
wherein the first graphical code includes at least one of a bar code and a QR code;
wherein the first repository and the second repository constitute separate portions of a common file;
displaying in real time to the presenter during the presentation at least one of the first comment, the second comment, the third comment, and the fourth comment;
aggregating the first comment, the second comment, the third comment, and the fourth comment into a common electronic word processing document;
presenting the first comment, the second comment, the third comment, and the fourth comment in a chat during the presentation;
causing a first portion of the chat containing the first comment and the second comment to be co-presented in association with the first slide;
causing a second portion of the chat containing the third comment and the fourth comment to be co-presented in association with the second slide;
presenting to an entity viewing at least one source document a tag interface for enabling selection and tagging of document segments with at least one characteristic associated with each document segment;
identifying tagged segments within the at least one source document;
accessing a consolidation rule containing instructions for combining the tagged segments;
implementing the consolidation rule to associate document segments sharing common tags;
outputting for display at least one tagged-based consolidation document grouping together commonly tagged document segments;
presenting a consolidation interface for enabling definition of the consolidation rule;
wherein the at least one characteristic includes a plurality of characteristics chosen from the group consisting of entities associated with the document segments, descriptions associated with the document segments, time frames associated with the document segments, and locations associated with the document segments;
wherein the consolidation interface permits generation of the consolidation rule in a manner permitting consolidation of document segments based on more than one of the plurality of the characteristics;

wherein the at least one tagged-based consolidation document includes at least one heading of an associated tag, and associated tagged segments beneath the at least one heading;

wherein the at least one source document includes a plurality of source documents and wherein the tagged-based consolidation document includes document segments from the plurality of source documents; and wherein the consolidation rule includes a transmissions component for transmitting the tagged-based consolidation document to at least one designated entity.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A granular permissions system for shared electronic documents, the system comprising:

a memory storing instructions; and at least one processor configured to execute the instructions to perform operations including:

enabling access to an electronic collaborative word processing document including a plurality of blocks of text, wherein each block of text has an associated address;

accessing at least one data structure containing identities of document authors and block-based permissions for each block of text, wherein the document authors are enabled to define the block-based permissions, and wherein the block-based permissions include at least one permission to view an associated block of text;

receiving from a first entity a request to access the electronic collaborative word processing document;

performing a first lookup in the at least one data structure to determine that the first entity lacks permission to view at least one specific block of text within the electronic collaborative word processing document;

causing to be rendered on a display associated with the first entity, the electronic collaborative word processing document with the at least one specific block of text omitted from the display;

receiving, from a second entity simultaneously editing the electronic collaborative word processing document, an added block of text and an associated block-based permission for the added block of text;

performing a second lookup in the at least one data structure to determine whether the first entity lacks permission to view the added block of text; and based on the second lookup, omitting the added block of text from being rendered on the display associated with the first entity.

2. The system of claim 1, wherein the electronic collaborative word processing document includes graphical objects, and wherein the block-based permissions include restrictions on viewing the graphical objects.

3. The system of claim 1, wherein the operations further include permitting the first entity or the second entity to set a permission blocking at least one of the document authors of the electronic collaborative word processing document from viewing the added block of text.

4. The system of claim 1, wherein the at least one data structure includes separate permissions for viewing and editing, wherein the operations further include performing a look up of viewing and editing permissions associated with a particular collaborative user who, for a particular block of text, has viewing permissions and lacks editing permissions, and wherein the operations further include the particular block of text on a display associated with the collaborative user in a manner permitting viewing of the particular block of text while preventing editing of the particular block of text.

5. The system of claim 1, wherein each address includes at least one of a block-associated tag, block-associated metadata, or a block-associated location.

6. The system of claim 1, wherein an absence of a recorded block-based permission in the at least one data structure for a particular block of text constitutes an unrestricted permission for the particular block of text.

7. The system of claim 1, wherein the document authors are enabled to alter an arrangement of the plurality of blocks of text in the electronic word processing document.

8. The system of claim 1, wherein the plurality of blocks of text are defined as content separated by a carriage return.

9. The system of claim 1, wherein the operations further include:
receiving a selection of content within the electronic word processing document; and
in response to receiving the selection of the content, defining the selected content as a new block of text.

10. The system of claim 1, wherein the at least one specific block of text omitted from the display is redacted on the rendered electronic word processing document.

11. The system of claim 1, wherein each address includes a block-associated tag defined by at least one of the document authors.

12. The system of claim 11, wherein the operations further include:
performing a lookup in the at least one data structure to determine blocks of text that the first entity has permission to view;
accessing a consolidation rule containing instructions for combining the blocks of text that the first entity has permission to view;
implementing the consolidation rule to associate blocks of text sharing common block-associated tags that the first entity has permission to view; and
outputting for display at least one consolidation document grouping together the blocks of text sharing common block-associated tags that the first entity has permission to view.

13. The system of claim 1, wherein each address includes a block-associated tag, wherein the operations further include determining a category of information in each block of text, and wherein the operations further include assigning each block-associated tag based on the determined category of information in each block of text.

14. The system of claim 1, wherein the block-based permissions applies to entities based on the associated block type.

15. The system of claim 1, wherein the operations further include automatically assigning a default permission to view at least one of the associated blocks of text based on predefined types of users.

16. The system of claim 1, wherein omitting the added block of text from being rendered on the display of the first user includes not transmitting display signals for the added block of text to the display associated with the first user.

17. A non-transitory computer readable medium containing instructions that when executed by at least one processor, cause the at least one processor to perform operations for setting granular permissions for shared electronic documents, the operations comprising:
enabling access to an electronic collaborative word processing document including a plurality of blocks of text, wherein each block of text has an associated address;
accessing at least one data structure containing identities of document authors and block-based permissions for each block of text, wherein the document authors are enabled to define the block-based permissions, and wherein the block-based permissions include at least one permission to view an associated block of text;
receiving from a first entity a request to access the electronic collaborative word processing document;
performing a first lookup in the at least one data structure to determine that the first entity lacks permission to view at least one specific block of text within the electronic collaborative word processing document;
causing to be rendered on a display associated with the first entity, the electronic collaborative word processing document with the at least one specific block of text omitted from the display;
receiving, from a second entity simultaneously editing the electronic collaborative word processing document, an added block of text and an associated block-based permission for the added block of text;
performing a second lookup in the at least one data structure to determine whether the first entity lacks permission to view the added block of text; and based on the second lookup, omitting the added block of text from being rendered on the display associated with the first entity.

18. The non-transitory computer readable medium of claim 17, wherein the electronic collaborative word processing document includes graphical objects, and wherein the block-based permissions include restrictions on viewing the graphical objects.

19. The non-transitory computer readable medium of claim 17, wherein the operations further comprise permitting the first entity or the second entity to set a permission blocking at least one of the document authors of the electronic word processing document from viewing the added block of text.

20. The non-transitory computer readable medium of claim 17, wherein the at least one data structure includes separate permissions for viewing and editing, wherein the operations further comprise performing a look up of viewing and editing permissions associated with a particular collaborative user who, for a particular block of text, has viewing permissions and lacks editing permissions, and wherein the operations further comprise rendering the particular block of text on a display associated with the collaborative user in a manner permitting viewing of the particular block of text while preventing editing of the particular block of text.

21. The non-transitory computer readable medium of claim 17, wherein each address includes at least one of a block-associated tag, block-associated metadata, or a block-associated location.

22. The non-transitory computer readable medium of claim 17, wherein an absence of a recorded block-based permission in the at least one data structure for a particular block of text constitutes an unrestricted permission for the particular block of text.

23. A method for setting granular permissions for shared electronic documents, the method comprising:
enabling access to an electronic collaborative word processing document including a plurality of blocks of text, wherein each block of text has an associated address;
accessing at least one data structure containing identities of document authors and block-based permissions for each block of text, wherein the document authors are enabled to define the block-based permissions, and wherein the block-based permissions include at least one permission to view an associated block of text;
receiving from a first entity a request to access the electronic collaborative word processing document;
performing a first lookup in the at least one data structure to determine that the first entity lacks permission to view at least one specific block of text within the electronic collaborative word processing document;
causing to be rendered on a display associated with the first entity, the electronic collaborative word processing document with the at least one specific block of text omitted from the display;
receiving, from a second entity simultaneously editing the electronic collaborative word processing document, an added block of text and an associated block-based permission for the added block of text;
performing a second lookup in the at least one data structure to determine whether the first entity lacks permission to view the added block of text; and
based on the second lookup, omitting the added block of text from being rendered on the display associated with the first entity.

24. The method of claim 23, wherein the electronic collaborative word processing document includes graphical objects, and wherein the block-based permissions include restrictions on viewing the graphical objects.

* * * * *